(12) United States Patent
Kasada

(10) Patent No.: US 10,477,072 B2
(45) Date of Patent: *Nov. 12, 2019

(54) MAGNETIC TAPE HAVING CHARACTERIZED MAGNETIC LAYER AND HEXAGONAL FERRITE POWDER

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,916

(22) Filed: Jun. 13, 2017

(65) Prior Publication Data

US 2017/0372738 A1 Dec. 28, 2017

(30) Foreign Application Priority Data

Jun. 22, 2016 (JP) .................. 2016-123205

(51) Int. Cl.
*G11B 5/708* (2006.01)
*H04N 1/52* (2006.01)
*H04N 1/405* (2006.01)
*H04N 1/58* (2006.01)

(52) U.S. Cl.
CPC .............. *H04N 1/52* (2013.01); *H04N 1/405* (2013.01); *H04N 1/4053* (2013.01); *H04N 1/58* (2013.01)

(58) Field of Classification Search
None
See application file for complete search history.

(56) References Cited

U.S. PATENT DOCUMENTS

| 3,966,686 A | 6/1976 | Asakura et al. |
| 4,112,187 A | 9/1978 | Asakura et al. |
| 4,425,404 A | 1/1984 | Suzuki et al. |
| 4,693,930 A | 9/1987 | Kuo et al. |

(Continued)

FOREIGN PATENT DOCUMENTS

| DE | 101 46 429 A1 | 3/2002 |
| GB | 2495356 A | 4/2013 |

(Continued)

OTHER PUBLICATIONS

US 10,186,293 B2, 01/2019, Kasada (withdrawn)*

(Continued)

*Primary Examiner* — Kevin M Bernatz
(74) *Attorney, Agent, or Firm* — Sughrue Mion, PLLC

(57) ABSTRACT

A magnetic tape is provided in which ferromagnetic powder included in a magnetic layer is ferromagnetic hexagonal ferrite powder having an activation volume less than or equal to 1,600 nm$^3$. The magnetic layer includes one or more components selected from a fatty acid and a fatty acid amide, and an abrasive. The C—H derived C concentration calculated from the C—H peak area ratio of C1s spectra obtained by X-ray photoelectron spectroscopic analysis performed on the surface of the magnetic layer at a photoelectron take-off angle of 10 degrees is greater than or equal to 45 atom %. Also, the tilt cos θ of the ferromagnetic hexagonal ferrite powder with respect to the surface of the magnetic layer acquired by cross section observation performed by using a scanning transmission electron microscope is 0.85 to 1.00.

16 Claims, 2 Drawing Sheets

(56) References Cited

U.S. PATENT DOCUMENTS

| | | | |
|---|---|---|---|
| 4,746,569 A | 5/1988 | Takahashi et al. | |
| 4,825,317 A | 4/1989 | Rausch | |
| 5,242,752 A | 9/1993 | Isobe et al. | |
| 5,419,938 A | 5/1995 | Kagotani et al. | |
| 5,445,881 A | 8/1995 | Irie | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A | 3/1998 | Inaba et al. | |
| 5,786,074 A | 7/1998 | Soui | |
| 5,827,600 A | 10/1998 | Ejiri et al. | |
| 5,835,314 A | 11/1998 | Moodera et al. | |
| 6,099,957 A | 8/2000 | Yamamoto et al. | |
| 6,183,606 B1 | 2/2001 | Kuo et al. | |
| 6,207,252 B1* | 3/2001 | Shimomura | G11B 5/70 428/141 |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,461 B1 | 12/2004 | Yamagata et al. | |
| 6,893,746 B1 | 5/2005 | Kirino et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 6,994,925 B2 | 2/2006 | Masaki | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,279,739 B2 | 10/2012 | Kanbe et al. | |
| 8,524,108 B2 | 9/2013 | Hattori | |
| 8,535,817 B2* | 9/2013 | Imaoka | G11B 5/70 428/844 |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,311,946 B2 | 4/2016 | Tanaka et al. | |
| 9,495,985 B2 | 11/2016 | Biskeborn et al. | |
| 9,530,444 B2 | 12/2016 | Kasada | |
| 9,542,967 B2 | 1/2017 | Sekiguchi et al. | |
| 9,564,161 B1 | 2/2017 | Cherubini et al. | |
| 9,601,146 B2 | 3/2017 | Kasada et al. | |
| 9,704,425 B2 | 7/2017 | Zhang et al. | |
| 9,704,525 B2* | 7/2017 | Kasada | G11B 5/7013 |
| 9,704,527 B2 | 7/2017 | Kasada | |
| 9,711,174 B2* | 7/2017 | Kasada | G11B 5/71 |
| 9,721,605 B2* | 8/2017 | Oyanagi | G11B 5/71 |
| 9,721,606 B2* | 8/2017 | Kasada | G11B 5/8404 |
| 9,721,607 B2 | 8/2017 | Tada et al. | |
| 9,748,026 B2 | 8/2017 | Shirata | |
| 9,773,519 B2 | 9/2017 | Kasada et al. | |
| 9,779,772 B1 | 10/2017 | Kasada et al. | |
| 9,837,104 B1 | 12/2017 | Biskeborn | |
| 9,837,116 B2* | 12/2017 | Ozawa | G11B 5/00813 |
| 9,959,894 B2 | 5/2018 | Omura | |
| 9,972,351 B1 | 5/2018 | Kaneko et al. | |
| 9,978,414 B1* | 5/2018 | Kaneko | G11B 5/3909 |
| 9,984,710 B2* | 5/2018 | Kasada | G11B 5/68 |
| 9,984,712 B1 | 5/2018 | Ozawa et al. | |
| 9,984,716 B1* | 5/2018 | Kaneko | G11B 5/70 |
| 10,008,230 B1 | 6/2018 | Ozawa et al. | |
| 10,026,430 B2 | 7/2018 | Kasada et al. | |
| 10,026,433 B2 | 7/2018 | Kasada | |
| 10,026,434 B2* | 7/2018 | Oyanagi | G11B 5/70 |
| 10,026,435 B2 | 7/2018 | Kasada et al. | |
| 10,062,403 B1 | 8/2018 | Kasada et al. | |
| 10,074,393 B2 | 9/2018 | Kaneko et al. | |
| 10,134,433 B2* | 11/2018 | Kasada | G11B 5/70 |
| 10,170,144 B2 | 1/2019 | Ozawa et al. | |
| 2001/0038928 A1* | 11/2001 | Nakamigawa | G11B 5/70 428/832.2 |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0170498 A1* | 9/2003 | Inoue | G11B 5/735 428/845.4 |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1* | 2/2006 | Kuse | G11B 5/708 428/844 |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0073816 A1 | 3/2010 | Komori et al. | |
| 2010/0081011 A1 | 4/2010 | Nakamura | |
| 2010/0134929 A1 | 6/2010 | Ito | |
| 2010/0227201 A1 | 9/2010 | Sasaki et al. | |
| 2010/0246073 A1 | 9/2010 | Katayama | |
| 2011/0003241 A1* | 1/2011 | Kaneko | C08G 73/0206 430/7 |
| 2011/0051280 A1 | 3/2011 | Karp et al. | |
| 2011/0052908 A1 | 3/2011 | Imaoka | |
| 2011/0077902 A1 | 3/2011 | Awezec et al. | |
| 2011/0151281 A1 | 6/2011 | Inoue | |
| 2011/0244272 A1 | 10/2011 | Suzuki et al. | |
| 2012/0045664 A1* | 2/2012 | Tanaka | G11B 5/71 428/840.2 |
| 2012/0152891 A1 | 6/2012 | Brown et al. | |
| 2012/0177951 A1 | 7/2012 | Yamazaki et al. | |
| 2012/0183811 A1 | 7/2012 | Hattori et al. | |
| 2012/0196156 A1* | 8/2012 | Suzuki | G11B 5/70 428/844 |
| 2012/0243120 A1 | 9/2012 | Harasawa et al. | |

(56) References Cited

U.S. PATENT DOCUMENTS

| | | | |
|---|---|---|---|
| 2012/0244387 A1 | 9/2012 | Mori et al. | |
| 2012/0251845 A1 | 10/2012 | Wang et al. | |
| 2013/0029183 A1 | 1/2013 | Omura | |
| 2013/0084470 A1 | 4/2013 | Hattori et al. | |
| 2013/0088794 A1 | 4/2013 | Cherubini et al. | |
| 2013/0256584 A1* | 10/2013 | Yamazaki | H01F 1/01 252/62.58 |
| 2013/0260179 A1 | 10/2013 | Kasada et al. | |
| 2013/0279040 A1* | 10/2013 | Cideciyan | H03M 13/13 360/53 |
| 2013/0286510 A1 | 10/2013 | Rothermel et al. | |
| 2014/0011055 A1 | 1/2014 | Suzuki et al. | |
| 2014/0130067 A1 | 5/2014 | Madison et al. | |
| 2014/0139944 A1 | 5/2014 | Johnson et al. | |
| 2014/0272474 A1 | 9/2014 | Kasada | |
| 2014/0295214 A1 | 10/2014 | Tada et al. | |
| 2014/0342189 A1 | 11/2014 | Tachibana et al. | |
| 2014/0366990 A1 | 12/2014 | Lai et al. | |
| 2014/0374645 A1 | 12/2014 | Kikuchi et al. | |
| 2015/0043101 A1 | 2/2015 | Biskeborn et al. | |
| 2015/0098149 A1 | 4/2015 | Bates et al. | |
| 2015/0111066 A1 | 4/2015 | Terakawa et al. | |
| 2015/0123026 A1 | 5/2015 | Masada et al. | |
| 2015/0302879 A1 | 10/2015 | Holmberg et al. | |
| 2015/0380036 A1 | 12/2015 | Kasada et al. | |
| 2016/0061447 A1 | 3/2016 | Kobayashi | |
| 2016/0064025 A1 | 3/2016 | Kurokawa et al. | |
| 2016/0092315 A1* | 3/2016 | Ashida | G06F 11/1469 707/684 |
| 2016/0093321 A1 | 3/2016 | Aoshima et al. | |
| 2016/0093322 A1 | 3/2016 | Kasada et al. | |
| 2016/0093323 A1 | 3/2016 | Omura | |
| 2016/0180875 A1 | 6/2016 | Tanaka et al. | |
| 2016/0189739 A1 | 6/2016 | Kasada et al. | |
| 2016/0189740 A1 | 6/2016 | Oyanagi et al. | |
| 2016/0247530 A1 | 8/2016 | Kasada | |
| 2016/0260449 A1 | 9/2016 | Ahmad et al. | |
| 2016/0276076 A1 | 9/2016 | Kasada | |
| 2017/0032812 A1 | 2/2017 | Kasada | |
| 2017/0053669 A1 | 2/2017 | Kasada | |
| 2017/0053670 A1 | 2/2017 | Oyanagi et al. | |
| 2017/0053671 A1 | 2/2017 | Kasada et al. | |
| 2017/0058227 A1 | 3/2017 | Kondo et al. | |
| 2017/0092315 A1 | 3/2017 | Ozawa et al. | |
| 2017/0130156 A1 | 5/2017 | Kondo et al. | |
| 2017/0178675 A1 | 6/2017 | Kasada | |
| 2017/0178676 A1* | 6/2017 | Kasada | G11B 5/70626 |
| 2017/0178677 A1 | 6/2017 | Kasada | |
| 2017/0186456 A1 | 6/2017 | Tada et al. | |
| 2017/0186460 A1 | 6/2017 | Kasada et al. | |
| 2017/0221513 A1 | 8/2017 | Hiroi et al. | |
| 2017/0221516 A1* | 8/2017 | Oyanagi | G11B 5/70 |
| 2017/0221517 A1 | 8/2017 | Ozawa et al. | |
| 2017/0249963 A1 | 8/2017 | Oyanagi et al. | |
| 2017/0249964 A1 | 8/2017 | Kasada et al. | |
| 2017/0249965 A1 | 8/2017 | Kurokawa et al. | |
| 2017/0249966 A1 | 8/2017 | Tachibana et al. | |
| 2017/0287517 A1 | 10/2017 | Hosoya et al. | |
| 2017/0337944 A1 | 11/2017 | Biskeborn et al. | |
| 2017/0355022 A1* | 12/2017 | Kaneko | G11B 5/70615 |
| 2017/0358318 A1* | 12/2017 | Kasada | G11B 5/00813 |
| 2017/0372726 A1* | 12/2017 | Kasada | G11B 5/00813 |
| 2017/0372727 A1 | 12/2017 | Kasada et al. | |
| 2017/0372736 A1* | 12/2017 | Kaneko | G11B 5/588 |
| 2017/0372737 A1 | 12/2017 | Oyanagi et al. | |
| 2017/0372739 A1* | 12/2017 | Ozawa | G11B 5/71 |
| 2017/0372740 A1 | 12/2017 | Ozawa et al. | |
| 2017/0372741 A1 | 12/2017 | Kurokawa et al. | |
| 2017/0372742 A1* | 12/2017 | Kaneko | G11B 5/584 |
| 2017/0372743 A1* | 12/2017 | Kasada | G11B 5/584 |
| 2017/0372744 A1 | 12/2017 | Ozawa et al. | |
| 2018/0061446 A1* | 3/2018 | Kasada | G11B 5/00817 |
| 2018/0061447 A1* | 3/2018 | Kasada | G11B 5/78 |
| 2018/0082710 A1 | 3/2018 | Tada et al. | |
| 2018/0137887 A1 | 5/2018 | Sekiguchi et al. | |
| 2018/0182417 A1 | 6/2018 | Kaneko et al. | |
| 2018/0182422 A1 | 6/2018 | Kawakami et al. | |
| 2018/0182425 A1 | 6/2018 | Kasada et al. | |
| 2018/0182426 A1 | 6/2018 | Ozawa et al. | |
| 2018/0182427 A1* | 6/2018 | Kasada | G11B 5/70678 |
| 2018/0182429 A1* | 6/2018 | Kasada | G11B 5/78 |
| 2018/0182430 A1 | 6/2018 | Ozawa et al. | |
| 2018/0182428 A1 | 7/2018 | Kasada et al. | |
| 2018/0240475 A1* | 8/2018 | Kasada | G11B 5/70 |
| 2018/0240476 A1 | 8/2018 | Kasada et al. | |
| 2018/0240478 A1 | 8/2018 | Kasada et al. | |
| 2018/0240479 A1 | 8/2018 | Kasada et al. | |
| 2018/0240481 A1 | 8/2018 | Kasada et al. | |
| 2018/0240488 A1 | 8/2018 | Kasada | |
| 2018/0240489 A1 | 8/2018 | Kasada et al. | |
| 2018/0240490 A1 | 8/2018 | Kurokawa et al. | |
| 2018/0240491 A1 | 8/2018 | Ozawa et al. | |
| 2018/0240492 A1 | 8/2018 | Kasada | |
| 2018/0240493 A1 | 8/2018 | Tada et al. | |
| 2018/0240494 A1 | 8/2018 | Kurokawa et al. | |
| 2018/0240495 A1 | 8/2018 | Kasada | |
| 2018/0286439 A1 | 10/2018 | Ozawa et al. | |
| 2018/0286442 A1 | 10/2018 | Ozawa et al. | |
| 2018/0286443 A1 | 10/2018 | Ozawa et al. | |
| 2018/0286444 A1 | 10/2018 | Kasada et al. | |
| 2018/0286446 A1 | 10/2018 | Ozawa et al. | |
| 2018/0286447 A1 | 10/2018 | Ozawa et al. | |
| 2018/0286448 A1 | 10/2018 | Ozawa et al. | |
| 2018/0286449 A1 | 10/2018 | Kasada et al. | |
| 2018/0286450 A1* | 10/2018 | Kasada | G11B 5/70 |
| 2018/0286451 A1 | 10/2018 | Ozawa et al. | |
| 2018/0286452 A1 | 10/2018 | Ozawa et al. | |
| 2018/0286453 A1 | 10/2018 | Kasada et al. | |
| 2018/0301165 A1 | 10/2018 | Oyanagi et al. | |
| 2018/0350398 A1 | 12/2018 | Kawakami et al. | |
| 2018/0350400 A1* | 12/2018 | Kaneko | G11B 5/70615 |
| 2018/0358042 A1 | 12/2018 | Kasada et al. | |
| 2018/0374507 A1 | 12/2018 | Kasada | |
| 2019/0027167 A1* | 1/2019 | Tada | G11B 5/00813 |
| 2019/0027168 A1 | 1/2019 | Kasada et al. | |
| 2019/0027171 A1 | 1/2019 | Kasada | |
| 2019/0027172 A1 | 1/2019 | Kasada | |
| 2019/0027174 A1 | 1/2019 | Tada et al. | |
| 2019/0027175 A1 | 1/2019 | Kurokawa et al. | |
| 2019/0027176 A1 | 1/2019 | Kurokawa et al. | |
| 2019/0027177 A1 | 1/2019 | Kasada | |
| 2019/0027178 A1 | 1/2019 | Kasada | |
| 2019/0027179 A1 | 1/2019 | Ozawa et al. | |
| 2019/0027180 A1 | 1/2019 | Kasada et al. | |
| 2019/0027181 A1 | 1/2019 | Ozawa et al. | |
| 2019/0035424 A1 | 1/2019 | Endo | |
| 2019/0051325 A1* | 2/2019 | Kasada | G11B 5/70 |
| 2019/0088278 A1* | 3/2019 | Kasada | G11B 5/714 |
| 2019/0096437 A1 | 3/2019 | Ozawa et al. | |
| 2019/0103130 A1 | 4/2019 | Kasada et al. | |
| 2019/0103131 A1 | 4/2019 | Kasada et al. | |
| 2019/0103133 A1* | 4/2019 | Ozawa | G11B 5/712 |
| 2019/0103134 A1 | 4/2019 | Kasada et al. | |
| 2019/0103135 A1 | 4/2019 | Ozawa et al. | |
| 2019/0130936 A1 | 5/2019 | Kaneko et al. | |

FOREIGN PATENT DOCUMENTS

| | | | |
|---|---|---|---|
| JP | 61-11924 A | | 1/1986 |
| JP | 61-139923 A | | 6/1986 |
| JP | 61139932 A | * | 6/1986 |
| JP | 63-129519 A | | 6/1988 |
| JP | 63-249932 A | | 10/1988 |
| JP | 64-57422 A | | 3/1989 |
| JP | 64-60819 A | | 3/1989 |
| JP | 5-258283 A | | 10/1993 |
| JP | 5-298653 A | | 11/1993 |
| JP | 7-57242 A | | 3/1995 |
| JP | 11-110743 A | | 4/1999 |
| JP | 11-175949 A | | 7/1999 |
| JP | 11-273051 A | | 10/1999 |
| JP | 2000-251240 A | | 9/2000 |
| JP | 2002-157726 A | | 5/2002 |
| JP | 2002-329605 A | | 11/2002 |

(56) References Cited

FOREIGN PATENT DOCUMENTS

| | | | |
|---|---|---|---|
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-114492 A | 4/2004 |
| JP | 2004-133997 A | 4/2004 |
| JP | 2004-185676 A | 7/2004 |
| JP | 2005-38579 A | 2/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-265555 A | 10/2007 |
| JP | 2007-273039 A | 10/2007 |
| JP | 2007-287310 A | 11/2007 |
| JP | 2007-297427 A | 11/2007 |
| JP | 2008-047276 A | 2/2008 |
| JP | 2008-243317 A | 10/2008 |
| JP | 2009-283082 A | 12/2009 |
| JP | 2010-036350 A | 2/2010 |
| JP | 2010-049731 A | 3/2010 |
| JP | 2011-048878 A | 3/2011 |
| JP | 2011-138566 A | 7/2011 |
| JP | 2011-210288 A | 10/2011 |
| JP | 2011-225417 A | 11/2011 |
| JP | 2012-038367 A | 2/2012 |
| JP | 2012-043495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |
| JP | 2016-71926 A | 5/2016 |
| JP | 2016-139451 A | 8/2016 |

OTHER PUBLICATIONS

English Translation of JP 61-139932-A (Year: 1986).*
An Office Action dated Nov. 29, 2018, which issued during the prosecution of U.S. Appl. No. 15/380,309.
An Office Action dated Nov. 29, 2018, which issued during the prosecution of U.S. Appl. No. 15/422,821.
Communication dated May 7, 2018 from the U.S. Patent and Trademark Office in U.S. Appl. No. 15/626,832.
Communication dated May 7, 2018 from the U.S. Patent and Trademark Office in U.S. Appl. No. 15/624,897.
Communication dated May 7, 2018 from the U.S. Patent and Trademark Office in U.S. Appl. No. 15/624,792.
Communication dated May 4, 2018 from the U.S. Patent and Trademark Office in U.S. Appl. No. 15/422,821.
Communication dated May 4, 2018 from the U.S. Patent and Trademark Office in U.S. Appl. No. 15/625,428.
Communication dated May 4, 2018 from the U.S. Patent and Trademark Office in U.S. Appl. No. 15/422,944.
Communication dated May 2, 2018 from the U.S. Patent and Trademark Office in U.S. Appl. No. 15/280,195.
Communication dated Dec. 6, 2016 from the U.S. Patent and Trademark Office in U.S. Appl. No. 14/757,555.
Communication dated Dec. 5, 2016 from the U.S. Patent and Trademark Office in U.S. Appl. No. 14/978,834.
Notice of Allowance dated Apr. 27, 2017, which issued during the prosecution of U.S. Appl. No. 15/052,115.
Notice of Allowance dated Jun. 2, 2017, which issued during the prosecution of U.S. Appl. No. 15/218,190.
Notice of Allowance dated Aug. 30, 2017, which issued during the prosecution of U.S. Appl. No. 15/466,143.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Aug. 28, 2018, which issued during the prosecution of U.S. Appl. No. 14/522,821.
Notice of Allowance dated Sep. 4, 2018, which issued during the prosecution of U.S. Appl. No. 15/625,428.
Communication dated Aug. 3, 2018 from the U.S. Patent and Trademark Office in U.S. Appl. No. 15/380,336.
Communication dated Aug. 23, 2018 from the U.S. Patent and Trademark Office in U.S. Appl. No. 15/614,876.
Communication dated Aug. 23, 2018 from the U.S. Patent and Trademark Office in U.S. Appl. No. 15/621,464.
Communication dated Aug. 23, 2018 from the U.S. Patent and Trademark Office in U.S. Appl. No. 15/626,720.
Office Action dated Jul. 6, 2018, which issued during the prosecution of U.S. Appl. No. 15/848,173.
Office Action dated Oct. 3, 2018, which issued during the prosecution of U.S. Appl. No. 15/280,195.
Office Action dated Oct. 15, 2018, which issued during the prosecution of U.S. Appl. No. 15/619,012.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,897.
Notice of Allowance dated Oct. 11, 2018, which issued during the prosecution of U.S. Appl. No. 15/624,792.
Notice of Allowance dated Oct. 12, 2018, which issued during the prosecution of U.S. Appl. No. 15/626,832.
Notice of Allowance dated Oct. 11, 2018, which issued during the prosecution of U.S. Appl. No. 15/380,336.
Office Action dated Oct. 9, 2018, which issued during the prosecution of U.S. Appl. No. 15/628,814.
Office Action dated Oct. 22, 2018, which issued during the prosecution of U.S. Appl. No. 15/854,439.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Sep. 27, 2018, which issued during the prosecution of U.S. Appl. No. 15/854,383.
Office Action dated Aug. 10, 2017, which issued during the prosecution of U.S. Appl. No. 14/870,618.
Notice of Allowance dated Feb. 14, 2018, which issued during the prosecution of U.S. Appl. No. 14/870,618.
Office Action dated Sep. 26, 2017 issued by the Japanese Patent Office in JP Appln. No. 2014-265723 corresponding to U.S. Appl. No. 14/870,618.
Office Action dated Sep. 26, 2017 issued by the Japanese Patent Office in JP Appln. No. 2015-249264 corresponding to U.S. Appl. No. 14/870,618.
Notice of Allowance dated Aug. 28, 2018, which issued during the prosecution of U.S. Appl. No. 15/422,821.
U.S. Appl. No. 15/280,195, Eiki Ozawa, filed Sep. 29, 2016.
U.S. Appl. No. 15/422,821, Masahito Oyanagi, filed Feb. 2, 2017.
U.S. Appl. No. 15/422,944, Eiki Ozawa, filed Feb. 2, 2017.
U.S. Appl. No. 15/619,012, Masahito Oyanagi, filed Jun. 9, 2017.
U.S. Appl. No. 15/624,897, Eiki Ozawa, filed Jun. 16, 2018.
U.S. Appl. No. 15/626,832, Eiki Ozawa, filed Jun. 19, 2017.
U.S. Appl. No. 15/625,428, Takuto Kurokawa, filed Jun. 16, 2017.
U.S. Appl. No. 15/380,336, Norihito Kasada, filed Dec. 15, 2016.
U.S. Appl. No. 15/614,876, Norihito Kasada, filed Jun. 6, 2017.
U.S. Appl. No. 15/621,464, Norihito Kasada, filed Jun. 13, 2017.
U.S. Appl. No. 15/854,439, Eiki Ozawa, filed Dec. 26, 2017.
U.S. Appl. No. 15/626,720, Norihito Kasada, filed Jun. 19, 2017.
U.S. Appl. No. 15/854,383, Norihito Kasada, filed Dec. 26, 2017.

(56) References Cited

OTHER PUBLICATIONS

U.S. Appl. No. 15/624,792, Eiki Ozawa, filed Jun. 16, 2017.
U.S. Appl. No. 15/378,907, U.S. Pat. No. No. 9,984,710.
U.S. Appl. No. 15/854,438, Allowed, Issue Fee not yet paid.
U.S. Appl. No. 15/920,563, RCE and Petition to Withdraw from Issue filed Dec. 17, 2018.
U.S. Appl. No. 15/422,944 Allowed; RCE filed Nov. 21, 2018.
U.S. Appl. No. 15/625,428, Allowed dated Dec. 4, 2018.
U.S. Appl. No. 15/854,438, Allowed; RCE filed.
U.S. Appl. No. 15/920,563, Petition to Withdraw from Issue and RCE filed.
U.S. Appl. No. 15/920,768, QPIDS filed Dec. 10, 2018.
U.S. Appl. No. 16/009,603, Pending.
Notice of Allowance, dated Dec. 2, 2016, issued by the U.S. Patent and Trademark Office in U.S. Appl. No. 14/753,227.
Office Action dated Nov. 18, 2016 from U.S. Patent & Trademark Office in U.S. Appl. No. 14/753,227.
Office Action dated Aug. 15, 2016 from U.S. Patent & Trademark Office in U.S. Appl. No. 14/753,227.
Office Action dated Feb. 4, 2016 from U.S. Patent & Trademark Office in U.S. Appl. No. 14/753,227.
Notice of Allowance, dated Jul. 12, 2017, issued by the U.S. Patent and Trademark Office in U.S. Appl. No. 15/388,864.
Office Action dated Jun. 9, 2017 from U.S. Patent & Trademark Office in U.S. Appl. No. 15/388,864.
Office Action dated Apr. 26, 2017 from U.S. Patent & Trademark Office in U.S. Appl. No. 15/388,864.
Office Action dated Jun. 7, 2018 from U.S. Patent & Trademark Office in U.S. Appl. No. 15/380,309.
Office Action dated Aug. 3, 2018 from U.S. Patent & Trademark Office in U.S. Appl. No. 15/388,911.
Office Action dated May 30, 2018 from U.S. Patent & Trademark Office in U.S. Appl. No. 15/388,911.
Office Action dated Nov. 16, 2016 which issued during the prosecution of U.S. Appl. No. 15/072,550.
Notice of Allowance dated Apr. 25, 2017 which issued during the prosecution of U.S. Appl. No. 15/072,550.
Notice of Allowance dated May 10, 2018 which issued during the prosecution of U.S. Appl. No. 15/615,871.
Notice of Allowance dated Mar. 16, 2018 which issued during the prosecution of U.S. Appl. No. 15/854,410.
Office Action dated Oct. 5, 2017, which issued during the prosecution of U.S. Appl. No. 15/241,286.
Notice of Allowance dated Mar. 21, 2018, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Notice of Allowance dated Mar. 19, 2018, which issued during the prosecution of U.S. Appl. No. 15/378,907.
Notice of Allowance dated Mar. 27, 2018, which issued during the prosecution of U.S. Appl. No. 15/241,631.
Office Action dated Jan. 27, 2015 from the Japanese Patent Office in Japanese Application No. 2013-053543.
Notice of Allowance dated Mar. 14, 2018, which issued during the prosecution of U.S. Appl. No. 15/854,474.
Office Action dated Sep. 19, 2014, which issued during the prosecution of U.S. Appl. No. 14/209,065.
Office Action dated Mar. 13, 2015, which issued during the prosecution of U.S. Appl. No. 14/209,065.
Office Action dated Jul. 6, 2015, which issued during the prosecution of U.S. Appl. No. 14/209,065.
Office Action dated Sep. 10, 2015, which issued during the prosecution of U.S. Appl. No. 14/209,065.
Office Action dated Mar. 24, 2016, which issued during the prosecution of U.S. Appl. No. 14/209,065.
Notice of Allowance dated Oct. 6, 2016, which issued during the prosecution of U.S. Appl. No. 14/209,065.
Notice of Allowance dated Mar. 21, 2018, which issued during the prosecution of U.S. Appl. No. 15/241,297.
Notice of Allowance dated Jun. 28, 2017, which issued during the prosecution of U.S. Appl. No. 15/464,991.
Office Action dated Nov. 8, 2016 from the Japanese Patent Office in Japanese Application No. 2014-199022.
Office Action dated Feb. 25, 2016, which issued during the prosecution of U.S. Appl. No. 14/867,752.
Office Action dated Oct. 19, 2016, which issued during the prosecution of U.S. Appl. No. 14/867,752.
Office Action dated Mar. 16, 2017, which issued during the prosecution of U.S. Appl. No. 14/867,752.
Office Action dated Sep. 7, 2017, which issued during the prosecution of U.S. Appl. No. 14/867,752.
Office Action dated Jan. 31, 2018, which issued during the prosecution of U.S. Appl. No. 14/867,752.
Notice of Allowance dated Apr. 5, 2018, which issued during the prosecution of U.S. Appl. No. 14/867,752.
Office Action dated Apr. 19, 2018, which issued during the prosecution of U.S. Appl. No. 15/854,438.
Notice of Allowance dated Sep. 24, 2018, which issued during the prosecution of U.S. Appl. No. 15/854,438.
Notice of Allowance dated Jul. 13, 2018, which issued during the prosecution of U.S. Appl. No. 15/920,782.
Notice of Allowance dated Aug. 9, 2018, which issued during the prosecution of U.S. Appl. No. 15/920,563.
Office Action dated Nov. 28, 2018, which issued during the prosecution of U.S. Appl. No. 15/900,144.
Office Action dated Nov. 28, 2018, which issued during the prosecution of U.S. Appl. No. 15/900,080.
Office Action dated Sep. 28, 2018, which issued during the prosecution of U.S. Appl. No. 15/854,409.
Office Action dated Oct. 15, 2018, which issued during the prosecution of U.S. Appl. No. 15/854,403.
U.S. Appl. No. 15/625,428, Pending.
U.S. Appl. No. 15/626,720, Pending.
U.S. Appl. No. 15/848,173, Pending.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Office Action dated Dec. 25, 2018 in Japanese Application No. 2015-254192.
Office Action dated Dec. 25, 2018 in Japanese Application No. 2015-245144.
Office Action dated Dec. 25, 2018 in Japanese Application No. 2015-245145.
Office Action dated Dec. 31, 2018 in U.S. Appl. No. 16/009,603.
U.S. Appl. No. 15/052,115, U.S. Pat. No. 9,704,527.
U.S. Appl. No. 15/218,190, U.S. Pat. No. 9,721,606.
U.S. Appl. No. 15/422,821, Pending.

(56) References Cited

OTHER PUBLICATIONS

U.S. Appl. No. 15/422,944, Allowed.
U.S. Appl. No. 15/466,143, U.S. Pat. No. 9,837,116.
U.S. Appl. No. 15/625,428, Allowed dated Dec. 4, 2018; RCE filed.
U.S. Appl. No. 14/978,834, U.S. Pat. No. 9,721,605.
U.S. Appl. No. 14/757,555, U.S. Pat. No. 9,711,174.
U.S. Appl. No. 15/197,046, U.S. Pat. No. 9,721,607.
U.S. Appl. No. 15/614,876, Pending.
U.S. Appl. No. 15/621,464, Pending.
U.S. Appl. No. 15/626,720, Allowed.
U.S. Appl. No. 15/854,383, Pending.
U.S. Appl. No. 15/854,507, U.S. Pat. No. 9,984,716.
U.S. Appl. No. 15/854,506, U.S. Appl. No. 10,008,230.
U.S. Appl. No. 15/848,173, Allowed.
U.S. Appl. No. 14/870,618, U.S. Pat. No. 9,959,894.
U.S. Appl. No. 14/753,227, U.S. Pat. No. 9,601,146.
U.S. Appl. No. 15/380,309, Pending.
U.S. Appl. No. 15/388,864, U.S. Pat. No. 9,773,519.
U.S. Appl. No. 15/072,550, U.S. Pat. No. 9,704,525.
U.S. Appl. No. 15/615,871, U.S. Pat. No. 10,074,393.
U.S. Appl. No. 15/854,410, U.S. Pat. No. 9,972,351.
U.S. Appl. No. 15/378,907, U.S. Pat. No. 9,984,710.
U.S. Appl. No. 15/241,631, U.S. Pat. No. 10,026,435.
U.S. Appl. No. 14/209,065, U.S. Pat. No. 9,530,444.
U.S. Appl. No. 15/854,474, U.S. Pat. No. 9,978,414.
U.S. Appl. No. 15/241,297, U.S. Pat. No. 10,026,434.
U.S. Appl. No. 15/241,286, U.S. Pat. No. 10,026,433.
U.S. Appl. No. 15/464,991, U.S. Pat. No. 9,779,772.
U.S. Appl. No. 14/867,752, U.S. Pat. No. 10,026,430.
U.S. Appl. No. 15/920,782, U.S. Pat. No. 10,134,433.
U.S. Appl. No. 15/920,563, Allowed.
U.S. Appl. No. 15/900,080, Pending.
U.S. Appl. No. 15/900,230, Pending.
U.S. Appl. No. 15/900,164, Pending.
U.S. Appl. No. 15/899,430, Pending.
U.S. Appl. No. 15/920,515, Pending.
U.S. Appl. No. 15/920,517, Pending.
U.S. Appl. No. 15/920,538, Pending.
U.S. Appl. No. 15/920,544, Pending.
U.S. Appl. No. 16/182,083, Pending (Not yet published; continuation of U.S. Appl. No. 15/920,768).
U.S. Appl. No. 15/900,106, Pending.
U.S. Appl. No. 15/900,412, U.S. Pat. No. 10,062,403.
U.S. Appl. No. 15/900,141, Pending.
U.S. Appl. No. 15/900,160, Pending.
U.S. Appl. No. 15/900,345, Pending.
U.S. Appl. No. 15/900,379, Pending.
U.S. Appl. No. 15/920,616, Pending.
U.S. Appl. No. 15/900,242, Pending.
U.S. Appl. No. 15/900,334, Pending.
U.S. Appl. No. 15/920,592, Pending.
U.S. Appl. No. 15/920,635, U.S. Pat. No. 10,170,144.
U.S. Appl. No. 16/038,339, Pending.
U.S. Appl. No. 15/624,897, Allowed; RCE filed Nov. 21, 2018.
U.S. Appl. No. 15/624,792, Allowed; RCE filed Nov. 21, 2018.
U.S. Appl. No. 15/626,832, Allowed; RCE filed Nov. 21, 2018.
U.S. Appl. No. 15/380,336, Allowed; RCE filed Nov. 21, 2018.
U.S. Appl. No. 15/854,506, U.S. Pat. No. 10,008,230.
U.S. Appl. No. 15/628,814, Pending.
U.S. Appl. No. 15/626,355, Pending.
U.S. Appl. No. 15/920,768, Allowed; RCE filed.
U.S. Appl. No. 16/009,603, Quayle Action issued (RCE filed).
U.S. Appl. No. 16/100,289, Pending.
"Introduction to TMR Magnetic Sensors", Anonymous, Mar. 12, 2015, MR Sensor Technology, pp. 1-5 (Year: 2015).
Notice of Allowance dated Aug. 27, 2018 in U.S. Appl. No. 15/920,635.
Notice of Allowance dated Mar. 13, 2019 in U.S. Appl. No. 16/100,289.
Notice of Allowance dated Mar. 5, 2019 in U.S. Appl. No. 16/009,603.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 27, 2018 in U.S. Appl. No. 15/900,334.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Mar. 5, 2019 in U.S. Appl. No. 15/443,026.
Office Action dated Mar. 6, 2019 in U.S. Appl. No. 15/854,403.
Office Action dated Mar. 7, 2019 in U.S. Appl. No. 15/854,439.
Office Action dated Nov. 19, 2018 in U.S. Appl. No. 15/900,141.
Notice of Allowance dated Mar. 18, 2019 in U.S. Appl. No. 15/626,355.
Notice of Allowance dated Mar. 18, 2019 in U.S. Appl. No. 15/628,814.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated Dec. 20, 2018 in U.S. Appl. No. 15/900,106.
Office Action dated Jan. 10, 2019 in U.S. Appl. No. 15/899,430.
Office Action dated Jan. 29, 2019 in U.S. Appl. No. 15/614,876.
Office Action dated Nov. 14, 2018 in U.S. Appl. No. 16/100,289.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Jun. 6, 2019 in U.S. Appl. No. 15/854,383.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.

(56) References Cited

OTHER PUBLICATIONS

Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Apr. 4, 2019 in U.S. Appl. No. 16/184,312.
Office Action dated Jun. 10, 2019 in U.S. Appl. No. 15/920,518.
Office Action dated Jun. 6, 2019 in U.S. Appl. No. 15/899,587.
Office Action dated May 23, 2019 in U.S. Appl. No. 15/388,911.
U.S. Appl. No. 15/280,195, Pending.
U.S. Appl. No. 15/422,821, Allowed.
U.S. Appl. No. 15/422,944, Allowed; QPIDS filed.
U.S. Appl. No. 15/619,012, Pending.
U.S. Appl. No. 15/624,897, Pending.
U.S. Appl. No. 15/624,792, Pending.
U.S. Appl. No. 15/626,832, Pending.
U.S. Appl. No. 15/625,428, Allowed.
U.S. Appl. No. 15/380,336, Pending.
U.S. Appl. No. 15/620,916, Pending.
U.S. Appl. No. 15/626,720, Allowed; QPIDS filed.
U.S. Appl. No. 15/854,439, Pending.
U.S. Appl. No. 15/848,173, Allowed; QPIDS filed.
U.S. Appl. No. 15/628,814, Allowed; RCE filed.
U.S. Appl. No. 15/690,400, Pending.
U.S. Appl. No. 15/690,906, Pending.
U.S. Appl. No. 15/626,355, Allowed; RCE filed.
U.S. Appl. No. 15/627,696, Pending.
U.S. Appl. No. 15/380,309, Allowed.
U.S. Appl. No. 15/854,438, Allowed.
U.S. Appl. No. 15/854,409, Allowed.
U.S. Appl. No. 15/900,144, Pending.
U.S. Appl. No. 15/920,518, Pending.
U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 15/920,768, Allowed.
U.S. Appl. No. 16/009,603, Allowed.
U.S. Appl. No. 16/182,083, Pending (Continuation of U.S. Appl. No. 15/920,768).
U.S. Appl. No. 16/232,165, Pending (Continuation of U.S. Appl. No. 15/854,438).
U.S. Appl. No. 16/100,289, Allowed; RCE filed.
U.S. Appl. No. 15/900,141, Allowed.
U.S. Appl. No. 15/900,345, Allowed.
U.S. Appl. No. 15/900,379, Allowed.
U.S. Appl. No. 15/920,592, Allowed.
U.S. Appl. No. 16/160,377, Pending.
U.S. Appl. No. 16/038,339, Allowed.
U.S. Appl. No. 16/184,312, Pending.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Allowed.
U.S. Appl. No. 15/422,821, Allowed; QPIDS filed.
U.S. Appl. No. 15/422,944, Patented as U.S. Pat. No. 10,347,279.
U.S. Appl. No. 15/466,143, Patented as U.S. Pat. No. 9,837,116.
U.S. Appl. No. 15/619,012, Allowed.
U.S. Appl. No. 15/624,897, Allowed.
U.S. Appl. No. 15/624,792, Allowed.
U.S. Appl. No. 15/626,832, Allowed.
U.S. Appl. No. 15/625,428, Patented as U.S. Pat. No. 10,403,318.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Allowed.
U.S. Appl. No. 15/614,876, Allowed.
U.S. Appl. No. 15/620,916, Allowed.
U.S. Appl. No. 15/621,464, Allowed.
U.S. Appl. No. 15/626,720, Patented as U.S. Pat. No. 10,347,280.
U.S. Appl. No. 15/854,383, Allowed.
U.S. Appl. No. 15/854,507, Patented as U.S. Pat. No. 9,984,716.
U.S. Appl. No. 15/854,439, Allowed.
U.S. Appl. No. 15/854,506, Patented as U.S. Pat. No. 10,008,230.
U.S. Appl. No. 15/848,173, Patented as U.S. Pat. No. 10,403,320.
U.S. Appl. No. 15/628,814, Allowed.
U.S. Appl. No. 15/690,400, Allowed.
U.S. Appl. No. 15/690,906, Allowed.
U.S. Appl. No. 15/626,355, Allowed.
U.S. Appl. No. 15/627,696, Allowed.
U.S. Appl. No. 14/870,618, Patented as U.S. Pat. No. 9,959,894.
U.S. Appl. No. 15/388,911, Pending.
U.S. Appl. No. 14/753,227, Patented as U.S. Pat. No. 9,601,146.
U.S. Appl. No. 15/380,309, Patented as U.S. Pat. No. 10,403,319.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,4331.
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Patented as U.S. Pat. No. 10,373,633.
U.S. Appl. No. 15/854,409, Pending.
U.S. Appl. No. 15/443,026, Pending.
U.S. Appl. No. 15/920,782, Patented as U.S. Pat. No. 10,134,433.
U.S. Appl. No. 15/920,563, Allowed; QPIDS filed.
U.S. Appl. No. 15/920,533, Pending.
U.S. Appl. No. 15/900,144, Allowed.
U.S. Appl. No. 15/900,080, Allowed.
U.S. Appl. No. 15/900,230, Allowed.
U.S. Appl. No. 15/900,164, Allowed.
U.S. Appl. No. 15/920,518, Allowed.
U.S. Appl. No. 15/899,587, Pending.
U.S. Appl. No. 15/899,430, Patented as U.S. Pat. No. 10,403,314.
U.S. Appl. No. 15/920,515, Patented as U.S. Pat. No. 10,410,665.
U.S. Appl. No. 15/920,517, Patented as U.S. Pat. No. 10,395,685.
U.S. Appl. No. 15/920,538, Patented as U.S. Pat. No. 10,403,317.
U.S. Appl. No. 15/920,544, Patented as U.S. Pat. No. 10,410,666.
U.S. Appl. No. 15/920,768, Patented as U.S. Pat. No. 10,373,639.
U.S. Appl. No. 16/009,603, Patented as U.S. Pat. No. 10,366,721.
U.S. Appl. No. 16/182,083, Allowed (Continuation of U.S. Appl. No. 15/920,768).
U.S. Appl. No. 15/705,531, Pending.
U.S. Appl. No. 16/232,165, Allowed (Continuation of U.S. Appl. No. 15/854,438).
U.S. Appl. No. 16/100,289, Allowed.
U.S. Appl. No. 16/038,669, Pending.

(56) References Cited

OTHER PUBLICATIONS

U.S. Appl. No. 15/900,106, Allowed.
U.S. Appl. No. 15/900,412, Patented as U.S. Pat. No. 10,062,4032.
U.S. Appl. No. 15/900,141, Allowed; RCE filed.
U.S. Appl. No. 15/900,160, Allowed.
U.S. Appl. No. 15/900,345, Allowed; QPIDS filed.
U.S. Appl. No. 15/900,379, Allowed; QPIDS filed.
U.S. Appl. No. 16/012,018, Pending.
U.S. Appl. No. 15/920,616, Allowed.
U.S. Appl. No. 15/900,242, Allowed.
U.S. Appl. No. 15/900,334, Allowed.
U.S. Appl. No. 15/920,592, Patented as U.S. Pat. No. 10,403,312.
U.S. Appl. No. 15/920,635, Patented as U.S. Pat. No. 10,170,144.
U.S. Appl. No. 16/160,377, Allowed.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Patented as U.S. Pat. No. 10,403,316.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Allowed.
U.S. Appl. No. 16/142,560, Pending.
U.S. Appl. No. 16/184,312, Allowed.
U.S. Appl. No. 16/143,646, Allowed.
U.S. Appl. No. 16/144,428, Pending.
U.S. Appl. No. 16/143,747, Pending.
U.S. Appl. No. 16/440,161, Pending.
U.S. Appl. No. 16/144,605, Pending.
U.S. Appl. No. 15/854,397, Pending.
U.S. Appl. No. 15/854,329, Patented as U.S. Pat. No. 9,984,712.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Office Action dated Aug. 23, 2019 in U.S. Appl. No. 15/854,409.
Office Action dated Aug. 27, 2019 in Japanese Application No. 2016-254428.
Office Action dated Aug. 27, 2019 in Japanese Application No. 2016-254430.
Office Action dated Aug. 6, 2019 in Japanese Application No. 2016-254421.
Office Action dated Aug. 6, 2019 in Japanese Application No. 2016-254427.
Office Action dated Jul. 16, 2019 in Japanese Application No. 2016-124933.
Office Action dated Jun. 25, 2019 in Japanese Application No. 2015-245144.
Office Action dated Sep. 3, 2019 in Japanese Application No. 2016-254434.
Notice of Allowance dated Jun. 27, 2019 in U.S. Appl. No. 15/854,439.
Office Action dated Sep. 16, 2019 in U.S. Appl. No. 15/854,403.
Office Action dated Aug. 27, 2019 in Japanese Application No. 2016-254432.
Office Action dated Aug. 28, 2019 in U.S. Appl. No. 15/854,397.
Office Action dated Sep. 17, 2019 in Japanese Application No. 2017-029499.
Office Action dated Sep. 19, 2019 in U.S. Appl. No. 15/443,026.
Office Action dated Sep. 20, 2019 in U.S. Appl. No. 15/442,961.

* cited by examiner

MAGNETIC TAPE HAVING CHARACTERIZED MAGNETIC LAYER AND HEXAGONAL FERRITE POWDER

CROSS-REFERENCE TO RELATED APPLICATIONS

This application claims priority under 35 U.S.C 119 to Japanese Patent Application No. 2016-123205 filed on Jun. 22, 2016. The above application is hereby expressly incorporated by reference, in its entirety.

BACKGROUND OF THE INVENTION

1. Field of the Invention

The present invention relates to a magnetic tape.

2. Description of the Related Art

Magnetic recording media are divided into tape-shaped magnetic recording media and disk-shaped magnetic recording media, and tape-shaped magnetic recording media, that is, magnetic tapes are mainly used for data storage such as data back-up.

It is required that recording density is increased (high-density recording is realized) in the magnetic tape, in accordance with a great increase in information content of recent years. As a method for achieving high-density recording, a method of decreasing a particle size of ferromagnetic powder included in a magnetic layer (hereinafter, referred to as "micronization") and increasing a filling percentage of the ferromagnetic powder of the magnetic layer is used. In regards to this point, as the ferromagnetic powder for satisfying both micronization and excellent magnetic properties, ferromagnetic hexagonal ferrite powder among various ferromagnetic powder forms is suitable (for example, see JP2012-203955A).

SUMMARY OF THE INVENTION

As an index of a particle size of the ferromagnetic powder, an activation volume which is a unit of magnetization reversal can be used. Therefore, the inventor has examined a magnetic tape including ferromagnetic hexagonal ferrite powder having a small activation volume as ferromagnetic powder in a magnetic layer. However, in the intensive studies, it was clear that a new problem of an increase in the number of times of occurrence of a phenomenon (hereinafter, referred to as a "partial output decrease") in which reproduction signal amplitude is partially decreased, when reproducing a signal recorded in a magnetic tape, occurs, in the magnetic tape including ferromagnetic hexagonal ferrite powder having an activation volume equal to or smaller than 1,600 $nm^3$ in a magnetic layer. As the number of times of occurrence of the partial output decrease increases, an error rate increases, reliability of the magnetic tape decreases, and thus, it is required that the number of times of occurrence thereof is decreased.

Therefore, an object of the invention is to provide a magnetic tape which includes ferromagnetic hexagonal ferrite powder having an activation volume equal to or smaller than 1,600 $nm^3$ in a magnetic layer and in which the partial output decrease at the time of signal reproducing is prevented.

According to one aspect of the invention, there is provided a magnetic tape comprising: a magnetic layer including ferromagnetic powder and a binder on a non-magnetic support, in which the ferromagnetic powder is ferromagnetic hexagonal ferrite powder having an activation volume equal to or smaller than 1,600 $nm^3$, the magnetic layer includes one or more components selected from the group consisting of fatty acid and fatty acid amide, and an abrasive, a C—H derived C concentration calculated from a C—H peak area ratio of C1s spectra obtained by X-ray photoelectron spectroscopic analysis performed on the surface of the magnetic layer at a photoelectron take-off angle of 10 degrees (hereinafter, also referred to as a "surface part C—H derived C concentration") is equal to or greater than 45 atom %, and a tilt cos θ (hereinafter, also simply referred to as "cos θ") of the ferromagnetic hexagonal ferrite powder with respect to the surface of the magnetic layer acquired by cross section observation performed by using a scanning transmission electron microscope is 0.85 to 1.00.

The "activation volume" is a unit of magnetization reversal. Regarding the activation volume described in the invention and the specification, magnetic field sweep rates of a coercivity Hc measurement part at time points of 3 minutes and 30 minutes are measured by using an oscillation sample type magnetic-flux meter, and the activation volume is a value acquired from the following relational expression of Hc and an activation volume V.

$$Hc = 2Ku/Ms\{1-[(kT/KuV)ln(At/0.693)]^{1/2}\}$$

[In the expression, Ku: anisotropy constant, Ms: saturation magnetization, k: Boltzmann's constant, T: absolute temperature, V: activation volume, A: spin precession frequency, and t: magnetic field reversal time]

In the invention and the specification, the ferromagnetic hexagonal ferrite powder means an aggregate of a plurality of ferromagnetic hexagonal ferrite particles. Hereinafter, particles (ferromagnetic hexagonal ferrite particles) configuring the ferromagnetic hexagonal ferrite powder are also referred to as "hexagonal ferrite particles" or simply "particles". The aggregate not only includes an aspect in which particles configuring the aggregate directly come into contact with each other, but also includes an aspect in which a binder, an additive, or the like is interposed between the particles. The points described above are also applied to various powder forms such as non-magnetic powder of the invention and the specification, in the same manner.

The measurement methods of the surface part C—H derived C concentration and the cos θ will be described later in detail.

In one aspect, the surface part C—H derived C concentration is 45 atom % to 80 atom %.

In one aspect, the surface part C—H derived C concentration is 50 atom % to 80 atom %.

In one aspect, the activation volume of the ferromagnetic hexagonal ferrite powder is 800 $nm^3$ to 1,600 $nm^3$.

In one aspect, the abrasive includes alumina powder.

In one aspect, the magnetic layer further includes a polyester chain-containing compound having a weight-average molecular weight of 1,000 to 80,000.

In one aspect, the magnetic tape further comprises a non-magnetic layer including non-magnetic powder and a binder between the non-magnetic support and the magnetic layer.

In one aspect, the magnetic layer and the non-magnetic layer respectively include one or more components selected from the group consisting of fatty acid and fatty acid amide.

According to one aspect of the invention, it is possible to provide a magnetic tape which includes ferromagnetic hexagonal ferrite powder having an activation volume equal to or smaller than 1,600 $nm^3$ in a magnetic layer and in which the partial output decrease at the time of signal reproducing is prevented.

DESCRIPTION OF THE PREFERRED EMBODIMENTS

Figure 1:
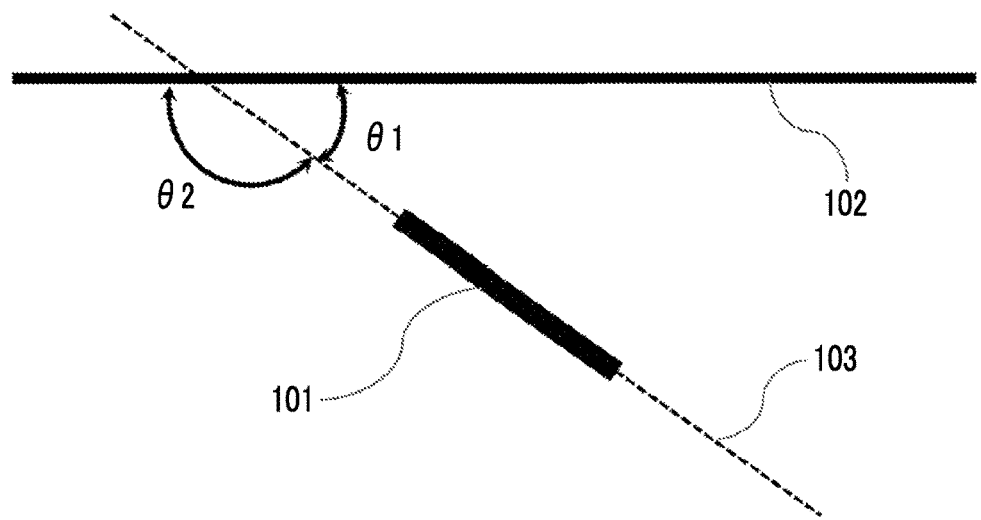
FIG. 1 is an explanatory diagram of an angle θ regarding cos θ.

According to one aspect of the invention, there is provided a magnetic tape including: a magnetic layer including ferromagnetic powder and a binder on a non-magnetic support, in which the ferromagnetic powder is ferromagnetic hexagonal ferrite powder having an activation volume equal to or smaller than 1,600 $nm^3$, the magnetic layer includes one or more components selected from the group consisting of fatty acid and fatty acid amide, and an abrasive, a C—H derived C concentration calculated from a C—H peak area ratio of C1s spectra obtained by X-ray photoelectron spectroscopic analysis performed on the surface of the magnetic layer at a photoelectron take-off angle of 10 degrees (surface part C—H derived C concentration) is equal to or greater than 45 atom %, and a tilt cos θ (cos θ) of the ferromagnetic hexagonal ferrite powder with respect to the surface of the magnetic layer acquired by cross section observation performed by using a scanning transmission electron microscope is 0.85 to 1.00.

Hereinafter, the magnetic tape described above will be described more specifically. The following description contains surmise of the inventor. The invention is not limited by such surmise. In addition, hereinafter, the examples are described with reference to the drawings. However, the invention is not limited to such exemplified aspects. In the invention and the specification, the "surface of the magnetic layer" of the magnetic tape is identical to the surface of the magnetic tape on the magnetic layer side.

Activation Volume

The magnetic layer of the magnetic tape includes ferromagnetic hexagonal ferrite powder having an activation volume equal to or smaller than 1,600 $nm^3$. As a result of the studies of the inventor, it was clear that, in the magnetic tape including the ferromagnetic hexagonal ferrite powder having an activation volume equal to or smaller than 1,600 $nm^3$ in the magnetic layer, a partial output decrease occurs at the time of signal reproducing which does not occur in a magnetic tape including ferromagnetic hexagonal ferrite powder having an activation volume exceeding 1,600 $nm^3$ in a magnetic layer. Such a partial output decrease can be prevented by controlling the surface part C—H derived C concentration and the cos θ to be in the ranges described above, respectively. This point will be described later in detail. The activation volume of the ferromagnetic hexagonal ferrite powder is equal to or smaller than 1,600 $nm^3$, and may be, for example, equal to or smaller than 1,500 $nm^3$ or equal to or smaller than 1,400 $nm^3$. Generally, as the activation volume decreases, high-density recording can be suitably performed. Here, the activation volume of the ferromagnetic hexagonal ferrite powder included in the magnetic layer of the magnetic tape may be equal to or smaller than 1,600 $nm^3$. Meanwhile, from a viewpoint of stability of magnetization, the lower limit of the activation volume is preferably, for example, equal to or greater than 800 $nm^3$, and more preferably equal to or greater than 1,000 $nm^3$, and even more preferably equal to or greater than 1,200 $nm^3$.

The above-mentioned activation volume of the ferromagnetic hexagonal ferrite powder existing as powder can be acquired by using the powder as a measurement sample. Meanwhile, regarding the ferromagnetic hexagonal ferrite powder included in the magnetic layer of the magnetic tape, a measurement sample can be obtained by collecting powder from the magnetic layer. The collection of the measurement sample can be performed by the following method, for example.

1. The surface treatment is performed with respect to the surface of the magnetic layer with a plasma reactor manufactured by Yamato Scientific Co., Ltd. for 1 to 2 minutes, and organic components (binder and the like) of the surface of the magnetic layer are incinerated and removed.

2. A filter paper impregnated with an organic solvent such as cyclohexanone or acetone is attached to an edge portion of a metal bar, the surface of the magnetic layer after the treatment of the section 1. is rubbed against the upper portion thereof, and the components of the magnetic layer is transferred and stripped to the filter paper from the magnetic tape.

3. The components stripped in the section 2. are shaken off in the organic solvent such as cyclohexanone or acetone (the filter paper is put into the organic solvent to shake off the components with an ultrasonic disperser), the organic solvent is dried to extract the stripped components.

4. The components scraped in the section 3. are put into a glass test tube which is sufficiently washed, for example, approximately 20 ml of n-butylamine is added thereto, and the glass test tube is sealed. (The amount of n-butylamine to be added is an amount which can decompose the organic components remaining without being incinerated.)

5. The glass test tube is heated to an internal temperature of 170° C. for 20 hours or longer, and the organic components are decomposed.

6. The precipitates after the decomposition of the section 5. are sufficiently washed with pure water and dried, and the powder is extracted.

7. A neodymium magnet is brought to be close to the powder collected in the section 6. and the adsorbed powder (that is, ferromagnetic hexagonal ferrite powder) is extracted.

By performing the steps described above, the ferromagnetic hexagonal ferrite powder for measuring the activation volume can be collected from the magnetic layer. Since the ferromagnetic hexagonal ferrite powder is not substantially negatively affected by performing the processes described above, it is possible to measure the activation volume of the ferromagnetic hexagonal ferrite powder included in the magnetic layer by the method described above.

The ferromagnetic hexagonal ferrite powder included in the magnetic layer of the magnetic tape will be described later in detail. Hereinafter, unless otherwise noted, the ferromagnetic hexagonal ferrite powder indicates ferromagnetic hexagonal ferrite powder having an activation volume equal to or smaller than 1,600 $nm^3$.

The inventor has surmised as follows, regarding a reason of the occurrence of the partial output decrease at the time of signal reproducing, in the magnetic tape including the ferromagnetic hexagonal ferrite powder having an activation volume equal to or smaller than 1,600 $nm^3$ in the magnetic layer.

The recording and reproducing of information (signals) to the magnetic tape are normally performed by causing the magnetic tape to run in a drive and bringing the surface of the magnetic layer of the magnetic tape to come into contact with a magnetic head (hereinafter, also simply referred to as a "head") to slide thereon. With such sliding, a foreign material due to the chipping of a part of the surface of the magnetic layer is generated, and the generated foreign material may be attached to the head. Hereinafter, the foreign material attached to the head is referred to as a "head attached material". In order to impart a function of removing this head attached material (hereinafter, referred to as "abrasion resistance"), to the surface of the magnetic layer, the magnetic layer of the magnetic tape normally includes an abrasive. In the intensive studies, the inventor has thought that, in the magnetic tape including the ferromagnetic hexagonal ferrite powder having an activation volume equal to or smaller than 1,600 $nm^3$ in the magnetic layer, a decrease in abrasion resistance of the surface of the magnetic layer imparted by an abrasive may be a reason of the occurrence of the partial output decrease at the time of signal reproducing. In addition, as a result of the research, it was newly found that it is possible to prevent the partial output decrease, by setting the surface part C—H derived C concentration and the cos θ to be in the ranges described above, respectively. The inventor has thought that the setting of the surface part C—H derived C concentration to be in the range described above contributes the prevention of the chipping of the surface of the magnetic layer due to the sliding, by causing smooth sliding between the surface of the magnetic layer and the head. In addition, the inventor has surmised that the setting of the cos θ to be in the range described above contributes the prevention of a decrease in the abrasion resistance of the surface of the magnetic layer. Hereinafter, the surface part C—H derived C concentration and the cos θ will be described more specifically.

Surface Part C—H Derived C Concentration

The surface part C—H derived C concentration of the magnetic tape is equal to or greater than 45 atom %. The surface part C—H derived C concentration is preferably equal to or greater than 48 atom %, more preferably equal to or greater than 50 atom %, even more preferably equal to or greater than 55 atom %, and still more preferably equal to or greater than 60 atom %, from a viewpoint of further preventing the partial output decrease at the time of signal reproducing. According to the research of the inventor, higher surface part C—H derived C concentration tends to be preferable, from a viewpoint of even more preventing the partial output decrease at the time of signal reproducing. Thus, from this point, the upper limit of the surface part C—H derived C concentration is not limited. As an example, the upper limit thereof, for example, can be set to be equal to or smaller than 95 atom %, equal to or smaller than 90 atom %, equal to or smaller than 85 atom %, equal to or smaller than 80 atom %, equal to or smaller than 75 atom %, and equal to or smaller than 70 atom %.

The surface part C—H derived C concentration is a value acquired by X-ray photoelectron spectroscopic analysis. The X-ray photoelectron spectroscopic analysis is an analysis method also generally called Electron Spectroscopy for Chemical Analysis (ESCA) or X-ray Photoelectron Spectroscopy (XPS). Hereinafter, the X-ray photoelectron spectroscopic analysis is also referred to as ESCA. The ESCA is an analysis method using a phenomenon of photoelectron emission when a surface of a measurement target sample is irradiated with X ray, and is widely used as an analysis method regarding a surface part of a measurement target sample. According to the ESCA, it is possible to perform qualitative analysis and quantitative analysis by using X-ray photoemission spectra acquired by the analysis regarding the sample surface of the measurement target. A depth from the sample surface to the analysis position (hereinafter, also referred to as a "detection depth") and photoelectron take-off angle generally satisfy the following expression: detection depth≈mean free path of electrons×3×sin θ. In the expression, the detection depth is a depth where 95% of photoelectrons configuring X-ray photoemission spectra are generated, and θ is the photoelectron take-off angle. From the expression described above, it is found that, as the photoelectron take-off angle decreases, the analysis regarding a shallow part of the depth from the sample surface can be performed, and as the photoelectron take-off angle increases, the analysis regarding a deep part of the depth from the sample surface can be performed. In the analysis performed by the ESCA at a photoelectron take-off angle of 10 degrees, an extremely outermost surface part having a depth of approximately several nm from the sample surface generally becomes an analysis position. Accordingly, in the surface of the magnetic layer of the magnetic tape, according to the analysis performed by the ESCA at a photoelectron take-off angle of 10 degrees, it is possible to perform composition analysis regarding the extremely outermost surface part having a depth of approximately several nm from the surface of the magnetic layer.

The C—H derived C concentration is a percentage of carbon atoms C configuring the C—H bond occupying total (based on atom) 100 atom % of all elements detected by the qualitative analysis performed by the ESCA. The magnetic tape includes one or more components selected from the group consisting of fatty acid and fatty acid amide in the magnetic layer. Fatty acid and fatty acid amide are components which can function as lubricants in the magnetic tape. The inventor has considered that, in the surface of the magnetic layer of the magnetic tape including one or more of these components in the magnetic layer, the C—H derived C concentration obtained by the analysis performed by the ESCA at a photoelectron take-off angle of 10 degrees becomes an index of the presence amount of the components (one or more components selected from the group consisting of fatty acid and fatty acid amide) in the extremely outermost surface part of the magnetic layer. Specific description is as follows.

In X-ray photoemission spectra (horizontal axis: bonding energy, vertical axis: strength) obtained by the analysis performed by the ESCA, the C1s spectra include information regarding an energy peak of a 1s orbit of the carbon atoms C. In such C1s spectra, a peak positioned at the vicinity of the bonding energy 284.6 eV is a C—H peak. This C—H peak is a peak derived from the bonding energy of the C—H bond of the organic compound. The inventor has surmised that, in the extremely outermost surface part of the magnetic layer including one or more components selected from the group consisting of fatty acid and fatty acid amide, main constituent components of the C—H peak are components selected from the group consisting of fatty acid and fatty acid amide. Accordingly, the inventor has considered that the C—H derived C concentration can be used as an index of the presence amount as described above. In addition, the inventor has considered that, in the magnetic tape in which one or more components selected from the group consisting of fatty acid and fatty acid amide are included in the magnetic layer and the surface part C—H derived C concentration is equal to or greater than 45 atom %, a larger amount of one or more components selected from the group consisting of fatty acid and fatty acid amide is present in the extremely outermost surface part of the magnetic layer, compared to the amount thereof in the magnetic tape of the related art. The inventor has surmised that the presence of a large amount of one or more components selected from the group consisting of fatty acid and fatty acid amide in the extremely outermost surface part of the magnetic layer contributes the smooth sliding between the surface of the magnetic layer and the head. When the smooth sliding between the surface of the magnetic layer and the head is realized, it is possible to prevent the chipping of the surface of the magnetic layer due to the sliding. Accordingly, the inventor has surmised that it is possible to prevent the generation of head attached material which is considered as a reason of the occurrence of the partial output decrease at the time of signal reproducing. In addition, the inventor has considered that, in the magnetic tape including the ferromagnetic hexagonal ferrite powder having an activation volume equal to or smaller than 1,600 $nm^3$ in the magnetic layer, strength of the magnetic layer is decreased due to an effect of micronization of the ferromagnetic powder included in the magnetic layer, compared to that in the magnetic tape of the related art. Due to this point, a foreign material (head attached material) is easily generated due to the chipping of the surface of the magnetic layer caused by the sliding between the surface of the magnetic layer and the head. With respect to this, the inventor has surmised that, when smooth sliding between the surface of the magnetic layer and the head is promoted, it is possible to prevent the generation of the head attached material.

However, the descriptions described above are the surmise of the inventor and the invention is not limited thereto.

As described above, the surface part C—H derived C concentration is a value obtained by analysis using ESCA. A region for the analysis is a region having an area of 300 μm×700 μm at an arbitrary position of the surface of the magnetic layer of the magnetic tape. The qualitative analysis is performed by wide scan measurement (pass energy: 160 eV, scan range: 0 to 1,200 eV, energy resolution: 1 eV/step) performed by ESCA. Then, spectra of entirety of elements detected by the qualitative analysis are obtained by narrow scan measurement (pass energy: 80 eV, energy resolution: 0.1 eV, scan range: set for each element so that the entirety of spectra to be measured is included). An atomic concentration (unit: atom %) of each element is calculated from the peak surface area of each spectrum obtained as described above. Here, an atomic concentration (C concentration) of carbon atoms is also calculated from the peak surface area of C1s spectra.

In addition, C1s spectra are obtained (pass energy: 10 eV, scan range: 276 to 296 eV, energy resolution: 0.1 eV/step). The obtained C1s spectra are subjected to a fitting process by a nonlinear least-squares method using a Gauss-Lorentz complex function (Gaussian component: 70%, Lorentz component: 30%), peak resolution of a peak of a C—H bond of the C1s spectra is performed, and a percentage (peak area ratio) of the separated C—H peak occupying the C1s spectra is calculated. A C—H derived C concentration is calculated by multiplying the calculated C—H peak area ratio by the C concentration.

An arithmetical mean of values obtained by performing the above-mentioned process at different positions of the surface of the magnetic layer of the magnetic tape three times is set as the surface part C—H derived C concentration. In addition, the specific aspect of the process described above is shown in Examples which will be described later.

As preferred means for adjusting the surface part C—H derived C concentration described above to be equal to or greater than 45 atom %, a cooling step can be performed in a non-magnetic layer forming step which will be described later specifically. However, the magnetic tape is not limited to a magnetic tape manufactured through such a cooling step.

cos θ

In the magnetic tape, the tilt cos θ of the ferromagnetic hexagonal ferrite powder with respect to the surface of the magnetic layer acquired by the cross section observation performed by using a scanning transmission electron microscope is 0.85 to 1.00. The cos θ is preferably equal to or greater than 0.89, more preferably equal to or greater than 0.90, even more preferably equal to or greater than 0.92, and sill more preferably equal to or greater than 0.95. Meanwhile, in a case where all of the hexagonal ferrite particles having an aspect ratio and a length in a long axis direction which will be described later are present to be parallel to the surface of the magnetic layer, the cos θ becomes 1.00 which is the maximum value. According to the research of the inventor, it is found that, as the value of the cos θ increases, the partial output decrease at the time of signal reproducing tends to be further prevented. That is, a great value of the cos θ is preferable, from a viewpoint of even more preventing the partial reproducing output decrease at the time of signal reproducing. Accordingly, in the magnetic tape, the upper limit of the cos θ is equal to or smaller than 1.00. The cos θ may be, for example, equal to or smaller than 0.99. However, as described above, a great value of the cos θ is preferable, and thus, the cos θ may exceed 0.99.

Calculation Method of cos θ)

The cos θ is acquired by the cross section observation performed by using a scanning transmission electron microscope (hereinafter, also referred to as a "STEM"). The cos θ of the invention and the specification is a value measured and calculated by the following method.

(1) A cross section observation sample is manufactured by performing the cutting out from an arbitrarily determined position of the magnetic tape which is a target for acquiring the cos θ. The manufacturing of the cross section observation sample is performed by focused ion beam (FIB) processing using a gallium ion ($Ga^+$) beam. A specific example of such a manufacturing method will be described later with an Example.

(2) The manufactured cross section observation sample is observed with the STEM, and a STEM images are captured. The STEM images are captured at positions of the same cross section observation sample arbitrarily selected, except for selecting so that the imaging ranges are not overlapped, and total 10 images are obtained. The STEM image is a STEM-high-angle annular dark field (HAADF) image which is captured at an acceleration voltage of 300 kV and an imaging magnification of 450,000, and the imaging is performed so that entire region of the magnetic layer in a thickness direction is included in one image. The entire region of the magnetic layer in the thickness direction is a region from the surface of the magnetic layer observed in the cross section observation sample to an interface between the magnetic layer and the adjacent layer or the non-magnetic support. The adjacent layer is a non-magnetic layer, in a case where the magnetic tape which is a target for acquiring the cos θ includes the non-magnetic layer which will be described later between the magnetic layer and the non-magnetic support. Meanwhile, in a case where the magnetic tape which is a target for acquiring the cos θ includes the magnetic layer directly on the non-magnetic support, the interface is an interface between the magnetic layer and the non-magnetic support.

(3) In each STEM image obtained as described above, a linear line connecting both ends of a line segment showing the surface of the magnetic layer is determined as a reference line. In a case where the STEM image is captured so that the magnetic layer side of the cross section observation sample is positioned on the upper side of the image and the non-magnetic support side is positioned on the lower side, for example, the linear line connecting both ends of the line segment described above is a linear line connecting an intersection between a left side of the image (normally, having a rectangular or square shape) of the STEM image and the line segment, and an intersection between a right side of the STEM image and the line segment to each other.

(4) Among the hexagonal ferrite particles observed in the STEM image, an angle θ formed by the reference line and the long axis direction of the hexagonal ferrite particles (primary particles) having an aspect ratio in a range of 1.5 to 6.0 and a length in the long axis direction equal to or greater than 10 nm is measured, and regarding the measured angle θ, the cos θ is calculated as a cos θ based on a unit circle. The calculation of the cos θ is performed with 30 particles arbitrarily extracted from the hexagonal ferrite particles having the aspect ratio and the length in the long axis direction in each STEM image.

(5) The measurement and the calculation are respectively performed for 10 images, the values of the acquired cos θ of the 30 hexagonal ferrite particles of each image, that is, 300 hexagonal ferrite particles in total of the 10 images, are averaged. The arithmetical mean acquired as described above is set as the tilt cos θ of the ferromagnetic hexagonal ferrite powder with respect to the surface of the magnetic layer acquired by the cross section observation performed by using the scanning transmission electron microscope.

Here, the "aspect ratio" observed in the STEM image is a ratio of "length in the long axis direction/length in a short axis direction" of the hexagonal ferrite particles.

The "long axis direction" means a direction when an end portion close to the reference line and an end portion far from the reference line are connected to each other, among the end portions which are most separated from each other, in the image of one hexagonal ferrite particle observed in the STEM image. In a case where a line segment connecting one end portion and the other end portion is parallel with the reference line, a direction parallel to the reference line becomes the long axis direction.

The "length in the long axis direction" means a length of a line segment drawn by connecting end portions which are most separated from each other, in the image of one hexagonal ferrite particle observed in the STEM image. Meanwhile, the "length in the short axis direction" means a length of the longest line segment, among the line segments connecting two intersections between an outer periphery of the image of the particle and a perpendicular line with respect to the long axis direction.

In addition, the angle θ formed by the reference line and the tilt of the particle in the long axis direction is determined to be in a range of 0° to 90°, by setting an angle of the long axis direction parallel to the reference line as 0°. Hereinafter, the angle θ will be further described with reference to the drawings.

Figure 2:
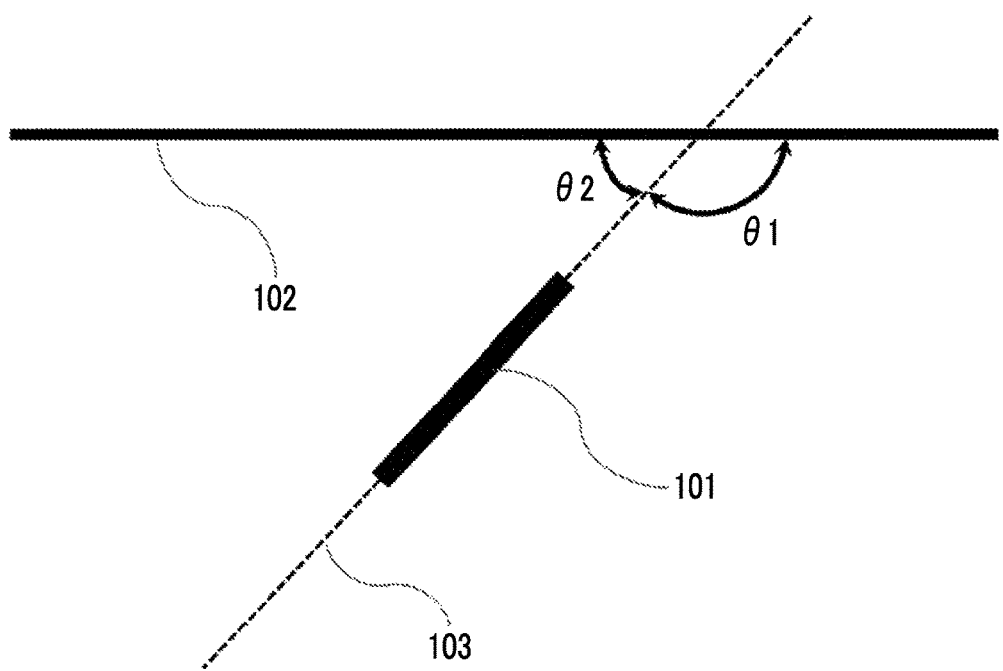
FIG. 2 is an explanatory diagram of another angle θ regarding cos θ.

FIG. 1 and FIG. 2 are explanatory diagrams of the angle θ. In FIG. 1 and FIG. 2, a reference numeral 101 indicates a line segment (length in the long axis direction) drawn by connecting end portions which are most separated from each other, a reference numeral 102 indicates the reference line, and a reference numeral 103 indicates an extended line of the line segment (reference numeral 101). In this case, as the angle formed by the reference line 102 and the extended line 103, θ1 and θ2 are exemplified as shown in FIG. 1 and FIG. 2. Here, a smaller angle is used from the θ1 and θ2, and this is set as the angle θ. Accordingly, in the aspect shown in FIG. 1, the θ1 is set as the angle θ, and in the aspect shown in FIG. 2, θ2 is set as the angle θ. A case where θ1=θ2 is a case where the angle θ=90°. The cos θ based on the unit circle becomes 1.00, in a case where the θ=0°, and becomes 0, in a case where the θ=90°.

The magnetic tape includes the abrasive and the ferromagnetic hexagonal ferrite powder in the magnetic layer, and cos θ is 0.85 to 1.00. The inventor has thought that hexagonal ferrite particles satisfying the aspect ratio and the length in the long axis direction among the hexagonal ferrite particles configuring the ferromagnetic hexagonal ferrite powder included in the magnetic layer can support the abrasive. The inventor has thought that this point contributes the prevention of the partial output decrease at the time of signal reproducing in the magnetic tape. This point will be further described below.

The abrasive can impart abrasion resistance of removing the head attached material to the surface of the magnetic layer. When the surface of the magnetic layer exhibits abrasion resistance, it is possible to remove the head attached material generated due to the chipping of a part of the surface of the magnetic layer caused by the sliding between the surface of the magnetic layer and the head. However, when the surface of the magnetic layer does not sufficiently exhibit the abrasion resistance, the head reproduces signals recorded in the magnetic layer, in a state where the head attached material is attached to the head. The inventor has surmised that this point causes the partial output decrease at the time of signal reproducing. The inventor has thought that a decrease in abrasion resistance of the surface of the magnetic layer occurs due to pressing of the abrasive present in the vicinity of the surface of the magnetic layer into the magnetic layer due to the sliding on the head. The inventor has thought that, in the magnetic layer including ferromagnetic hexagonal ferrite powder having an activation volume equal to or smaller than 1,600 nm$^3$, an operation of supporting the abrasive is deteriorated due to the micronization of the ferromagnetic powder. Therefore, the inventor has surmised that the abrasive present in the vicinity of the surface of the magnetic layer is easily pressed into the magnetic layer due to the sliding on the head.

With respect to this, it is considered that the pressing of the abrasive present in the vicinity of the surface of the magnetic layer into the magnetic layer due to the sliding on the head can be prevented by supporting the abrasive by the hexagonal ferrite particles having the aspect ratio and the length in the long axis direction. Thus, the inventor has surmised that it is possible to prevent a decrease in abrasion resistance of the surface of the magnetic layer and this point contributes the prevention of the partial output decrease at the time of signal reproducing. However, this is merely a surmise.

A squareness ratio is known as an index of a presence state (orientation state) of the ferromagnetic hexagonal ferrite powder of the magnetic layer. However, according to the studies of the inventor, an excellent correlation was not observed between the squareness ratio and the occurrence of the partial output decrease at the time of signal reproducing. The squareness ratio is a value indicating a ratio of residual magnetization with respect to saturated magnetization, and is measured using all of the particles as targets, regardless of the shapes and size of the particles included in the ferromagnetic hexagonal ferrite powder. With respect to this, the cos θ is a value measured by selecting the hexagonal ferrite particles having the aspect ratio and the length in the long axis direction in the ranges described above. With such a difference, the inventor has thought that an excellent correlation may be found between the cos θ and the occurrence of the partial output decrease at the time of signal reproducing. However, this is merely a surmise, and the invention is not limited thereto.

Adjustment Method of cos θ

The magnetic tape can be manufactured through a step of applying a magnetic layer forming composition onto the non-magnetic support. As an adjustment method of the cos θ, a method of controlling a dispersion state of the ferromagnetic hexagonal ferrite powder of the magnetic layer forming composition is used. Regarding this viewpoint, the inventor has thought that, as dispersibility of the ferromagnetic hexagonal ferrite powder having an activation volume equal to or smaller than 1,600 $nm^3$ in the magnetic layer forming composition (hereinafter, also referred to as "dispersibility of the ferromagnetic hexagonal ferrite powder" or simply "dispersibility") is increased, the hexagonal ferrite particles having the aspect ratio and the length in the long axis direction in the ranges described above in the magnetic layer formed by using this magnetic layer forming composition are easily oriented in a state closer to parallel to the surface of the magnetic layer. As means for increasing dispersibility, any one or both of the following methods (1) and (2) are used.

(1) Adjustment of Dispersion Conditions
(2) Use of Dispersing Agent

In addition, as means for increasing dispersibility, a method of separately dispersing the ferromagnetic hexagonal ferrite powder and the abrasive is also used. The separate dispersing is more specifically a method of preparing the magnetic layer forming composition through a step of mixing a magnetic solution including the ferromagnetic hexagonal ferrite powder, a binder, and a solvent (here, substantially not including an abrasive), and an abrasive liquid including an abrasive and a solvent with each other. By performing the mixing after separately dispersing the abrasive and the ferromagnetic hexagonal ferrite powder as described above, it is possible to increase the dispersibility of the ferromagnetic hexagonal ferrite powder of the magnetic layer forming composition. The expression of "substantially not including an abrasive" means that the abrasive is not added as a constituent component of the magnetic solution, and a small amount of the abrasive present as impurities by being mixed without intention is allowed. In addition, it is also preferable that any one or both of the methods (1) and (2) are combined with the separate dispersion described above. In this case, by controlling the dispersion state of the ferromagnetic hexagonal ferrite powder of the magnetic solution, it is possible to control the dispersion state of the ferromagnetic hexagonal ferrite powder of the magnetic layer forming composition obtained through the step of mixing the magnetic solution with the abrasive liquid.

Hereinafter, specific aspects of the methods (1) and (2) will be described.

(1) Adjustment of Dispersion Conditions

A dispersing process of the magnetic layer forming composition, preferably the magnetic solution can be performed by adjusting the dispersion conditions thereof by using a well-known dispersing method. The dispersion conditions of the dispersing process, for example, include the types of a dispersion device, the types of dispersion media used in the dispersion device, and a retention time in the dispersion device (hereinafter, also referred to as a "dispersion retention time").

As the dispersion device, various well-known dispersion devices using a shear force such as a ball mill, a sand mill, or a homomixer. A dispersing process having two or more stages may be performed by connecting two or more dispersion devices to each other, or different dispersion devices may be used in combination. A circumferential speed of a tip of the dispersion device is preferably 5 to 20 m/sec and more preferably 7 to 15 m/sec.

As the dispersion medium, ceramic beads or glass beads are used, and zirconia beads are preferable. Two or more types of beads may be used in combination. A particle diameter of the dispersion medium is, for example, 0.03 to 1 mm and is preferably 0.05 to 0.5 mm. In a case of performing the dispersing process having two or more stages by connecting the dispersion devices as described above, the dispersion medium having different particle diameters may be used in each stage. It is preferable that the dispersion medium having a smaller particle diameter is used, as the stages are passed. A filling percentage of the dispersion medium can be, for example, 30% to 80% and preferably 50% to 80% based on the volume.

The dispersion retention time may be suitably set b considering the circumferential speed of the tip of the dispersion device and the filling percentage of the dispersion medium, and can be, for example, 15 to 45 hours and preferably 20 to 40 hours. In a case of performing the dispersing process having two or more stages by connecting the dispersion devices as described above, the total dispersion retention time of each stage is preferably in the range described above. By performing the dispersing process described above, it is possible to increase the dispersibility of the ferromagnetic hexagonal ferrite powder and to adjust the cos θ to be 0.85 to 1.00.

(2) Use of Dispersing Agent

It is possible to increase the dispersibility of the ferromagnetic hexagonal ferrite powder by using a dispersing agent at the time of preparing the magnetic layer forming composition, preferably at the time of preparing the magnetic solution. Here, the dispersing agent is a component which can increase the dispersibility of the ferromagnetic hexagonal ferrite powder of the magnetic layer forming composition and/or the magnetic solution, compared to a state where the agent is not present. It is also possible to control the dispersion state of the ferromagnetic hexagonal ferrite powder by changing the type and the amount of the dispersing agent included in the magnetic layer forming composition and/or the magnetic solution. As the dispersing agent, a dispersing agent which prevents aggregation of the hexagonal ferrite particles configuring the ferromagnetic hexagonal ferrite powder and imparts suitable plasticity to the magnetic layer is also preferably used, from a viewpoint of increasing durability of the magnetic layer.

As an aspect of the dispersing agent preferable for improving the dispersibility of the ferromagnetic hexagonal ferrite powder, a polyester chain-containing compound can be used. The polyester chain-containing compound is preferable from a viewpoint of imparting suitable plasticity to the magnetic layer. Here, the polyester chain is shown as E in General Formula A which will be described later. Specific aspects thereof include a polyester chain contained in General Formula 1, a polyester chain represented by Formula 2-A, and a polyester chain represented by Formula 2-B which will be described later. The inventor has surmised that, by mixing the polyester chain-containing compound with the magnetic layer forming composition and/or the magnetic solution together with the ferromagnetic hexagonal ferrite powder, it is possible to prevent aggregation of particles, due to the polyester chain interposed between the hexagonal ferrite particles. However, this is merely the surmise, and the invention is not limited thereto. A weight-average molecular weight of the polyester chain-containing compound is preferably equal to or greater than 1,000, from a viewpoint of improving the dispersibility of the ferromagnetic hexagonal ferrite powder. In addition, the weight-average molecular weight of the polyester chain-containing compound is preferably equal to or smaller than 80,000. The inventor has thought that the polyester chain-containing compound having a weight-average molecular weight equal to or smaller than 80,000 can increase the durability of the magnetic layer by exhibiting an operation of a plasticizer. The weight-average molecular weight of the invention and the specification is a value obtained by performing polystyrene conversion of a value measured by gel permeation chromatography (GPC). Specific examples of the measurement conditions will be described later. In addition, the preferred range of the weight-average molecular weight will be also described later.

As a preferred aspect of the polyester chain-containing compound, a compound having a partial structure represented by the following General Formula A is used. In the invention and the specification, unless otherwise noted, a group disclosed may include a substituent or may be non-substituted. In a case where a given group includes a substituent, examples of the substituent include an alkyl group (for example, alkyl group having 1 to 6 carbon atoms), a hydroxyl group, an alkoxy group (for example, alkoxy group having 1 to 6 carbon atoms), a halogen atom (for example, a fluorine atom, a chlorine atom, or a bromine atom), a cyano group, an amino group, a nitro group, an acyl group, carboxyl (salt) group. In addition, the "number of carbon atoms" of the group including a substituent means the number of carbon atoms of a portion not including a substituent.

General Formula A

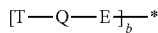

In General Formula A, Q represents —O—, —CO—, —S—, —NR$^a$—, or a single bond, T and R$^a$ each independently represent a hydrogen atom or a monovalent substituent, E represents —(O-L$^A$-CO)a- or —(CO-L$^A$-O)a-, L$^A$ represents a divalent linking group, a represents an integer equal to or greater than 2, b represents an integer equal to or greater than 1, and * represents a bonding site with another partial structure configuring the polyester chain-containing compound.

In General Formula A, the number of L$^A$ included is a value of a×b. In addition, the numbers of T and Q included are respectively the value of b. In a case where a plurality of L$^A$ are included in General Formula A, the plurality of L$^A$ may be the same as each other or different from each other. The same applies to T and Q.

It is considered that the compound described above can prevent aggregation of hexagonal ferrite particles due to a steric hindrance caused by the partial structure, in the magnetic solution and the magnetic layer forming composition.

As a preferred aspect of the polyester chain-containing compound, a compound including a group which can be adsorbed to the surface of the hexagonal ferrite particles or the partial structure (hereinafter, referred to as an "adsorption part") together with the polyester chain in a molecule is used. It is preferable that the polyester chain is included in the partial structure represented by General Formula A. In addition, it is more preferable that the partial structure and the adsorption part represented by General Formula A form a bond through * in General Formula A.

In one aspect, the adsorption part can be a functional group (polar group) having polarity to be an adsorption point to the surface of the hexagonal ferrite particles. As a specific example, at least one polar group selected from a carboxyl group (—COOH) and a salt thereof (—COO$^-$M$^+$), a sulfonic acid group (—SO$_3$H) and a salt thereof (—SO$_3^-$M$^+$), a sulfuric acid group (—OSO$_3$H) and a salt thereof (—OSO$_3^-$M$^+$), a phosphoric acid group (—P=O(OH)$_2$) and a salt thereof (—P=O(O$^-$M$^+$)$_2$), an amino group (—NR$_2$), —N$^+$R$_3$, an epoxy group, a thiol group (—SH), and a cyano group (—CN) (here, M$^+$ represents a cation such as an alkali metal ion and R represents a hydrogen atom or a hydrocarbon group) can be used. In addition, the "carboxyl (salt) group" means one or both of a carboxyl group and a slat thereof (carboxylic salt). The carboxylic salt is a state of a salt of the carboxyl group (—COOH) as described above.

As one aspect of the adsorption part, a polyalkyleneimine chain can also be used.

The types of the bond formed by the partial structure and the adsorption part represented by General Formula A are not particularly limited. Such a bond is preferably selected from the group consisting of a covalent bond, a coordinate bond, and an ion bond, and a bond of different types may be included in the same molecular. It is considered that by efficiently performing the adsorption with respect to the hexagonal ferrite particles through the adsorption part, it is possible to further increase an aggregation prevention effect of the hexagonal ferrite particles based on the steric hindrance caused by the partial structure represented by General Formula A.

In one aspect, the polyester chain-containing compound can include at least one polyalkyleneimine chain. The polyester chain-containing compound can preferably include a polyester chain in the partial structure represented by General Formula A. As a preferred example of the polyester chain-containing compound, a polyalkyleneimine derivative including a polyester chain selected from the group consisting of a polyester chain represented by the following Formula 2-A and a polyester chain represented by the following Formula 2-B as General Formula A is used. These examples will be described later in detail.

Formula 2-A

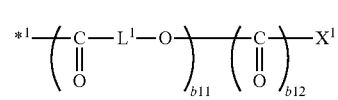

Formula 2-B

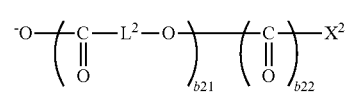

L$^1$ in Formula 2-A and L$^2$ in Formula 2-B each independently represent a divalent linking group, b11 in Formula 2-A and b21 in Formula 2-B each independently represent an integer equal to or greater than 2, b12 in Formula 2-A and b22 in Formula 2-B each independently represent 0 or 1, and $X^1$ in Formula 2-A and $X^2$ in Formula 2-B each independently represent a hydrogen atom or a monovalent substituent.

In General Formula A, Q represents —O—, —CO—, —S—, —NR$^a$—, or a single bond, and is preferably a portion represented by X in General Formula 1 which will be described later, (—CO—)b12 in Formula 2-A or (—CO—)b22 in Formula 2-B.

In General Formula A, T and R$^a$ each independently represent a hydrogen atom or a monovalent substituent and is preferably a portion represented by R in General Formula 1 which will be described later, $X^1$ in Formula 2-A or $X^2$ in Formula 2-B.

In General Formula A, E represents —(O-L$^A$-CO)a- or —(CO-L$^A$-O)a-, L$^A$ represents a divalent linking group, and a represents an integer equal to or greater than 2.

As a divalent linking group represented by L$^A$, L in General Formula 1 which will be described later, L$^1$ in Formula 2-A or L$^2$ in Formula 2-B is preferably used.

In one aspect, the polyester chain-containing compound can include at least one group selected from the group consisting of a carboxyl group and a carboxylic salt. Such a polyester chain-containing compound can preferably include a polyester chain in the partial structure represented by General Formula A. As a preferred example of the polyester chain-containing compound, a compound represented by the following General Formula 1 is used.

Compound Represented by General Formula 1
General Formula 1 is as described below.

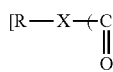

General Formula 1

(In General Formula 1, X represents —O—, —S—, or —NR$^1$—, R and $R^1$ each independently represent a hydrogen atom or a monovalent substituent, L represents a divalent linking group, Z represents a n-valent partial structure including at least one group (carboxyl (salt) group) selected from the group consisting of a carboxyl group and a carboxylic salt, m represents an integer equal to or greater than 2, and n represents an integer equal to or greater than 1.)

In General Formula 1, the number of L included is a value of m×n. In addition, the numbers of R and X included are respectively the value of n. In a case where a plurality of L are included in General Formula 1, the plurality of L may be the same as each other or different from each other. The same applies to R and X.

The compound represented by General Formula 1 has a structure (polyester chain) represented by —((C=O)-L-O) m-, and a carboxyl (salt) group is included in the Z part as the adsorption part. It is considered that, when the compound represented by General Formula 1 is effectively adsorbed to the hexagonal ferrite particles by setting the carboxyl (salt) group included in the Z part as the adsorption part to the surface of the hexagonal ferrite particles, it is possible to prevent aggregation of the hexagonal ferrite particles caused by steric hindrance caused by the polyester chain.

In General Formula 1, X represents —O—, —S—, or —NR$^1$—, and $R^1$ represents a hydrogen atom or a monovalent substituent. As the monovalent substituent represented by $R^1$, an alkyl group, a hydroxyl group, an alkoxy group, a halogen atom, a cyano group, an amino group, a nitro group, an acyl group, and a carboxyl (salt) group which is the substituent described above can be used, an alkyl group is preferably used, an alkyl group having 1 to 6 carbon atoms is more preferably used, and a methyl group or an ethyl group is even more preferably used. $R^1$ is still more preferably a hydrogen atom. X preferably represents —O—.

R represents a hydrogen atom or a monovalent substituent. R preferably represents a monovalent substituent. As the monovalent substituent represented by R, a monovalent group such as an alkyl group, an aryl group, a heteroaryl group, an alicyclic group, or a nonaromatic heterocyclic group, and a structure in which a divalent linking group is bonded to the monovalent group (that is, R has a structure in which a divalent linking group is bonded to the monovalent group and is a monovalent substituent bonding with X through the divalent linking group) can be used, for example. As the divalent linking group, a divalent linking group configured of a combination of one or two or more selected from the group consisting of —C(=O)—O—, —O—, —C(=O)—NR$^{10}$— ($R^{10}$ represents a hydrogen atom or an alkyl group having 1 to 4 carbon atoms), —O—C(=O)—NH—, a phenylene group, an alkylene group having 1 to 30 carbon atoms, and an alkenylene group having 2 to 30 carbon atoms can be used, for example. As a specific example of the monovalent substituent represented by R, the following structures are used, for example. In the following structures, * represents a bonding site with X. However, R is not limited to the following specific example.

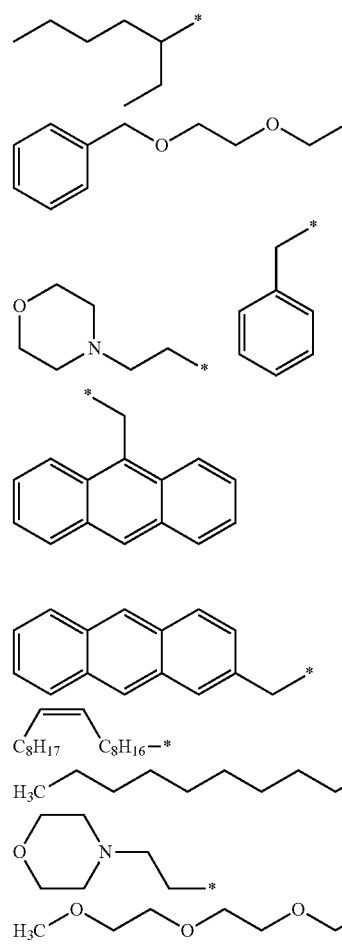

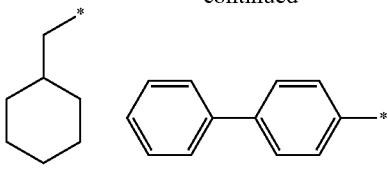

In General Formula 1, L represents a divalent linking group. As the divalent linking group, a divalent linking group which is configured of a combination of one or two or more selected from the group consisting of an alkylene group which may have a linear, branched, or cyclic structure, an alkenylene group which may have a linear, branched, or cyclic structure, —C(=O)—, —O—, and an arylene group, and which may include a substituent in the divalent linking group or a halogen atom as an anion can be used. More specifically, a divalent linking group configured of a combination of one or two or more selected from an alkylene group having 1 to 12 carbon atoms which may have a linear, branched, or cyclic structure, an alkenylene group having 1 to 6 carbon atoms which may have a linear, branched, or cyclic structure, —C(=O)—, —O—, and a phenylene group can be used. The divalent linking group is preferably a divalent linking group formed of 1 to 10 carbon atoms, 0 to 10 oxygen atoms, 0 to 10 halogen atoms, and 1 to 30 hydrogen atoms. As a specific example, an alkylene group and the following structures are used. In the following structures, * represents a bonding site with the other structure in General Formula 1. However, the divalent linking group is not limited to the following specific example.

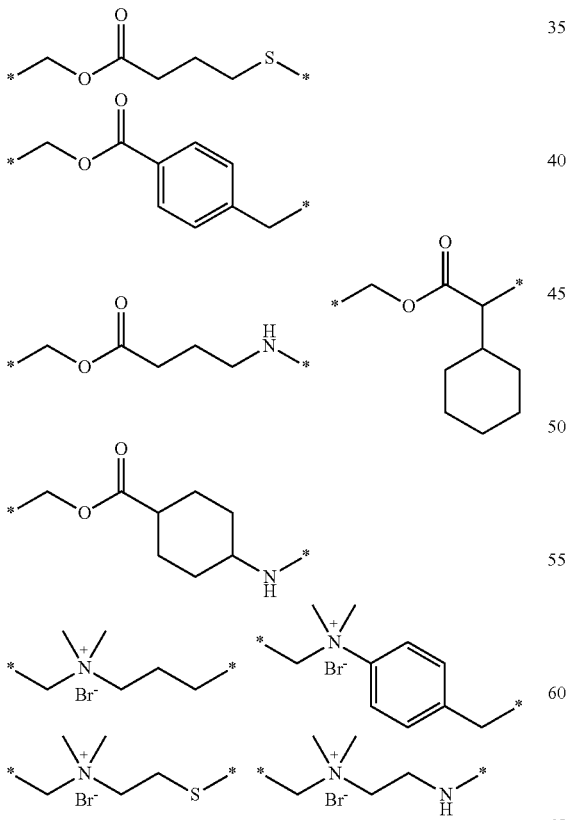

L is preferably an alkylene group, more preferably an alkylene group having 1 to 12 carbon atoms, even more preferably an alkylene group having 1 to 5 carbon atoms, and still more preferably a non-substituted alkylene group having 1 to 5 carbon atoms.

Z represents an n-valent partial structure including at least one group (carboxyl (salt) group) selected from the group consisting of a carboxyl group and a carboxylic salt.

The number of the carboxyl (salt) group included in Z is at least 1, preferably equal to or greater than 2, and more preferably 2 to 4, for one Z.

Z can have a structure of one or more selected from the group consisting of a linear structure, a branched structure, and a cyclic structure. From a viewpoint of easiness of synthesis, Z is preferably a reactive residue of a carboxylic acid anhydride. For example, as a specific example, the following structures are used. In the following structures, * represents a bonding site with the other structure in General Formula 1. However, Z is not limited to the following specific example.

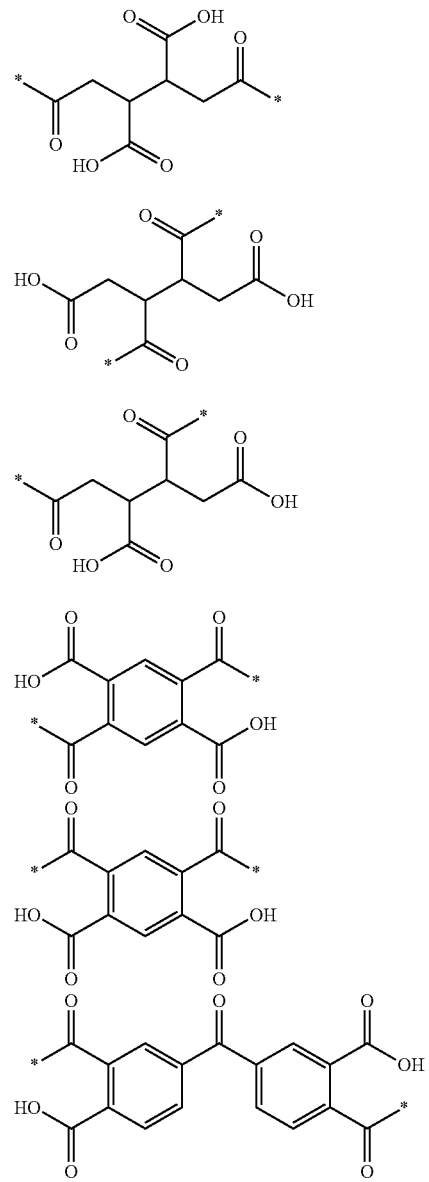

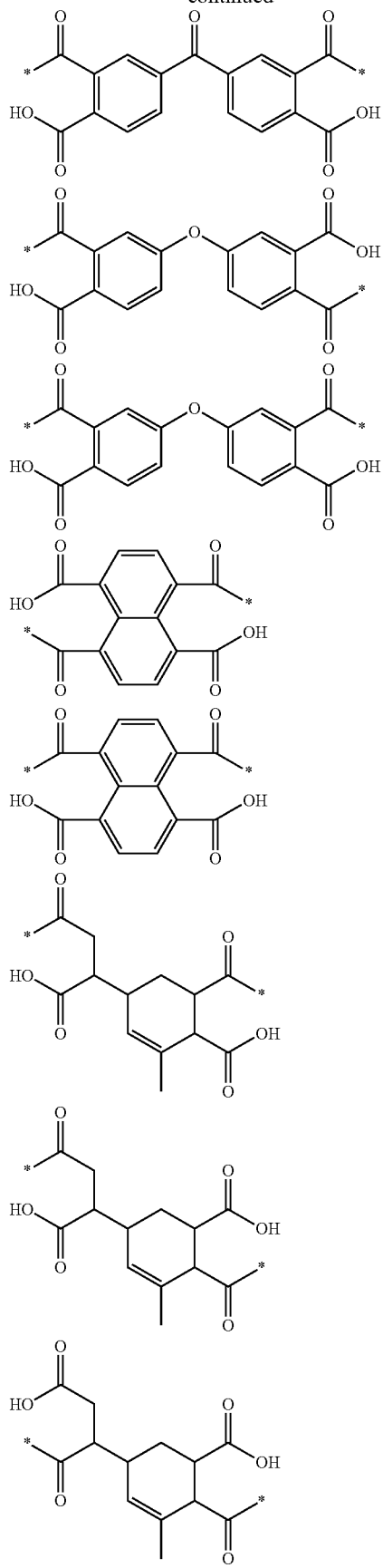
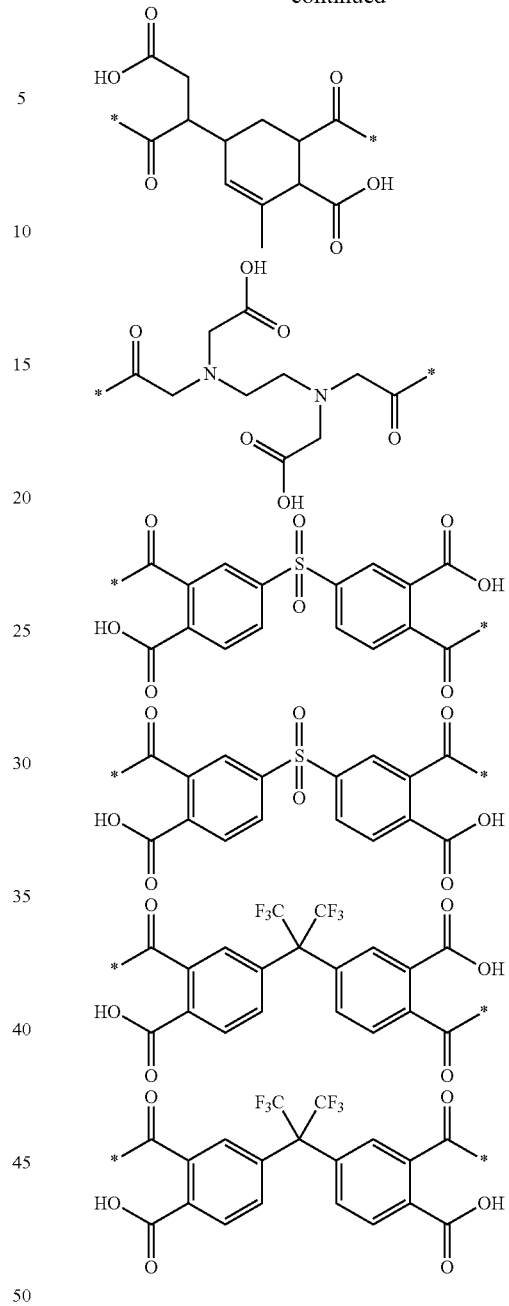

The carboxylic acid anhydride is a compound having a partial structure represented by —(C=O)—O—(C=O)—. In the carboxylic acid anhydride, the partial structure becomes a reactive site, and an oxygen atom and Z of —((C=O)-L-O)m— in General Formula 1 are bonded to each other through a carbonyl bond (—(C=O)—), and a carboxyl (salt) group is obtained. The partial structure generated as described above is a reactive residue of a carboxylic acid anhydride. By synthesizing the compound represented by General Formula 1 by using a compound having one partial structure —(C=O)—O—(C=O)—, as the carboxylic acid anhydride, it is possible to obtain a compound represented by General Formula 1 including a monovalent reactive residue of the carboxylic acid anhydride, and it is possible to obtain a compound represented by General Formula 1 including a divalent reactive residue of the carboxylic acid anhydride, by using the compound having two partial structures described above. The same applies to the compound represented by General Formula 1 including a trivalent or higher reactive residue of the carboxylic acid anhydride. As described above, n is an integer equal to or greater than 1, is, for example, an integer of 1 to 4, and is preferably an integer of 2 to 4.

It is possible to obtain a compound represented by General Formula 1 in a case of n=2, by using the tetracarboxylic acid anhydride, for example, as the carboxylic acid anhydride. The tetracarboxylic acid anhydride is a carboxylic acid anhydride having two partial structures described above in one molecule, by dehydration synthesis of two carboxyl groups, in the compound including four carboxyl groups in one molecule. In General Formula 1, the compound in which Z represents a reactive residue of the tetracarboxylic acid anhydride is preferable, from viewpoints of further improving dispersibility of ferromagnetic hexagonal ferrite powder and durability of the magnetic layer. Examples of the tetracarboxylic acid anhydride include various tetracarboxylic acid anhydrides such as aliphatic tetracarboxylic acid anhydride, aromatic tetracarboxylic acid anhydride, and polycyclic tetracarboxylic acid anhydride.

As the aliphatic tetracarboxylic acid anhydride, for example, various aliphatic tetracarboxylic acid anhydrides disclosed in a paragraph 0040 of JP2016-071926A can be used. As the aromatic tetracarboxylic acid anhydride, for example, various aromatic tetracarboxylic acid anhydrides disclosed in a paragraph 0041 of JP2016-071926A can be used. As the polycyclic tetracarboxylic acid anhydride, various polycyclic tetracarboxylic acid anhydrides disclosed in a paragraph 0042 of JP2016-071926A can be used.

In General Formula 1, m represents an integer equal to or greater than 2. As described above, it is thought that the structure (polyester chain) represented by —((C═O)-L-O) m- of the compound represented by General Formula 1 contributes to the improvement of dispersibility and the durability. From these viewpoints, m is preferably an integer of 5 to 200, more preferably an integer of 5 to 100, and even more preferably an integer of 5 to 60.

Weight-Average Molecular Weight

The weight-average molecular weight of the compound represented by General Formula 1 is preferably 1,000 to 80,000 as described above and more preferably 1,000 to 20,000. The weight-average molecular weight of the compound represented by General Formula 1 is even more preferably smaller than 20,000, further more preferably equal to or smaller than 12,000, and sill more preferably equal to or smaller than 10,000. In addition, the weight-average molecular weight of the compound represented by General Formula 1 is preferably equal to or greater than 1,500 and more preferably equal to or greater than 2,000. Regarding the compound represented by General Formula 1, the weight-average molecular weight shown in Examples which will be described later is a value obtained by performing reference polystyrene conversion of a value measured by GPC under the following measurement conditions. In addition, the weight-average molecular weight of a mixture of two or more kinds of structural isomers is a weight-average molecular weight of two or more kinds of structural isomers included in this mixture.

GPC device: HLC-8220 (manufactured by Tosoh Corporation)

Guard column: TSK guard column Super HZM-H

Column: TSK gel Super HZ 2000, TSK gel Super HZ 4000, TSK gel Super HZ-M (manufactured by Tosoh Corporation, 4.6 mm (inner diameter)×15.0 cm, three types of columns are connected in series)

Eluent: Tetrahydrofuran (THF), containing a stabilizer (2,6-di-t-butyl-4-methylphenol)

Flow rate of eluent: 0.35 mL/min

Column temperature: 40° C.

Inlet temperature: 40° C.

Refractive index (RI) measurement temperature: 40° C.

Sample concentration: 0.3 mass %

Sample introduction amount: 10 μL

Synthesis Method

The compound represented by General Formula 1 described above can be synthesized by a well-known method. As an example of the synthesis method, a method of allowing a reaction such as a ring-opening addition reaction between the carboxylic acid anhydride and a compound represented by the following General Formula 2 can be used, for example. In General Formula 2, R, X, L, and m are the same as those in General Formula 1. A represents a hydrogen atom, an alkali metal atom, or quaternary ammonium base and is preferably a hydrogen atom.

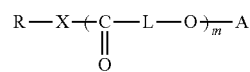

General Formula 2

In a case of using a butanetetracarboxylic acid anhydride, for example, the reaction between the carboxylic acid anhydride and a compound represented by General Formula 2 is performed by mixing the butanetetracarboxylic acid anhydride at a percentage of 0.4 to 0.5 moles with respect to 1 equivalent of a hydroxyl group, and heating and stirring the mixture approximately for 3 to 12 hours, under the absence of solvent, if necessary, under the presence of an organic solvent having a boiling point equal to or higher than 50° C., further, a catalyst such as tertiary amine or inorganic base. Even in a case of using other carboxylic acid anhydride, a reaction between the carboxylic acid anhydride and the compound represented by General Formula 2 can be performed under the reaction conditions described above or under well-known reaction conditions.

After the reaction, post-process such as purification may be performed, if necessary.

In addition, the compound represented by General Formula 2 can also be obtained by using a commercially available product or by a well-known polyester synthesis method. For example, as the polyester synthesis method, ring-opening polymerization of lactone can be used. As the ring-opening polymerization of lactone, descriptions disclosed in paragraphs 0050 to 0051 of JP2016-071926A can be referred to. However, the compound represented by General Formula 2 is not limited to a compound obtained by the ring-opening polymerization of lactone, and can also be a compound obtained by a well-known polyester synthesis method, for example, polycondensation of polyvalent carboxylic acid and polyhydric alcohol or polycondensation of hydroxycarboxylic acid.

The synthesis method described above is merely an example and there is no limitation regarding the synthesis method of the compound represented by General Formula 1. Any well-known synthesis method can be used without limitation, as long as it is a method capable of synthesizing the compound represented by General Formula 1. The reaction product after the synthesis can be used for forming the magnetic layer, as it is, or by purifying the reaction product by a well-known method, if necessary. The compound represented by General Formula 1 may be used alone or in combination of two or more kinds having different structures, in order to form the magnetic layer. In addition, the compound represented by General Formula 1 may be used as a mixture of two or more kinds of structural isomers. For example, in a case of obtaining two or more kinds of structural isomers by the synthesis reaction of the compound represented by General Formula 1, the mixture can also be used for forming the magnetic layer.

As the compound represented by General Formula 1, various compounds included in reaction products shown in synthesis examples in Examples disclosed in JP2016-071926A can be used. For example, as a specific example thereof, compounds shown in the following Table 1 can be used. A weight-average molecular weight shown in Table 1 is a weight-average molecular weight of the compound represented by structural formula shown in Table 1 or a weight-average molecular weight of the compound represented by structural formula shown in Table 1 and a mixture of structural isomers thereof.

TABLE 1

| Types | Structural Formula | Weight-average molecular weight |
|---|---|---|
| Compound 1 | | 9200 |
| Compound 2 | | 6300 |
| Compound 3 | | 5300 |
| Compound 4 | | 8000 |
| Compound 5 | | 8700 |
| Compound 6 | | 8600 |
| Compound 7 | | 6200 |

TABLE 1-continued

| Types | Structural Formula | Weight-average molecular weight |
|---|---|---|
| Compound 8 | 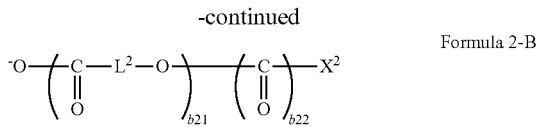 | 8000 |

As an aspect of a preferred example of the compound having the partial structure and the adsorption part represented by General Formula A, a polyalkyleneimine derivative including a polyester chain represented by the following Formula 2-A or 2-B as General Formula A is used. Hereinafter, the polyalkyleneimine derivative will be described.

Polyalkyleneimine Derivative

The polyalkyleneimine derivative is a compound including at least one polyester chain selected from the group consisting of a polyester chain represented by the following Formula 2-A and a polyester chain represented by the following Formula 2-B, and a polyalkyleneimine chain having a number average molecular weight of 300 to 3,000. A percentage of the polyalkyleneimine chain occupying the compound is preferably smaller than 5.0 mass %.

The polyalkyleneimine derivative includes a polyalkyleneimine chain which is an aspect of the adsorption part described above. In addition, it is thought that, the steric hindrance caused by the polyester chain included in the polyalkyleneimine derivative is caused in the magnetic layer forming composition and/or the magnetic solution, and accordingly, it is possible to prevent aggregation of the hexagonal ferrite particles.

Hereinafter, the polyester chain and the polyalkyleneimine chain included in the polyalkyleneimine derivative will be described.

Polyester Chain

Structure of Polyester Chain

The polyalkyleneimine derivative includes at least one polyester chain selected from the group consisting of a polyester chain represented by the following Formula 2-A and a polyester chain represented by the following Formula 2-B, together with a polyalkyleneimine chain which will be described later. In one aspect, the polyester chain is bonded to an alkyleneimine chain represented by Formula A which will be described later by a nitrogen atom N included in Formula A and a carbonyl bond —(C=O)— at *$^1$ of Formula A, and —N—(C=O)— can be formed. In addition, in another aspect, an alkyleneimine chain represented by Formula B which will be described later and the polyester chain can form a salt crosslinking group by a nitrogen cation $N^+$ in Formula B and an anionic group including a polyester chain. As the salt crosslinking group, a component formed by an oxygen anion $O^-$ included in the polyester chain and $N^+$ in Formula B can be used.

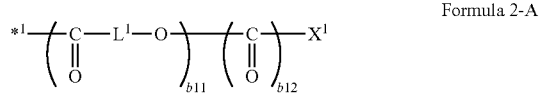

Formula 2-A

Formula 2-B

As the polyester chain bonded to the alkyleneimine chain represented by Formula A by a nitrogen atom N included in Formula A and a carbonyl bond —(C=O)—, the polyester chain represented by Formula 2-A can be used. The polyester chain represented by Formula 2-A can be bonded to the alkyleneimine chain represented by Formula A by forming —N—(C=O)— by a nitrogen atom included in the alkyleneimine chain and a carbonyl group —(C=O)— included in the polyester chain at the bonding site represented by *$^1$.

In addition, as the polyester chain bonded to the alkyleneimine chain represented by Formula B by forming a salt crosslinking group by $N^+$ in Formula B and an anionic group including the polyester chain, the polyester chain represented by Formula 2-B can be used. The polyester chain represented by Formula 2-B can form $N^+$ in Formula B and a salt crosslinking group by an oxygen anion $O^-$.

$L^1$ in Formula 2-A and $L^2$ in Formula 2-B each independently represent a divalent linking group. As the divalent linking group, an alkylene group having 3 to 30 carbon atoms can be preferably used. In a case where the alkylene group includes a substituent, the number of carbon atoms of the alkylene group is the number of carbon atoms of a part (main chain part) excluding the substituent, as described above.

b11 in Formula 2-A and b21 Formula 2-B each independently represent an integer equal to or greater than 2, for example, an integer equal to or smaller than 200. The number of lactone repeating units shown in Table 3 which will be described later corresponds to b11 in Formula 2-A or b21 Formula 2-B.

b12 in Formula 2-A and b22 Formula 2-B each independently represent 0 or 1.

$X^1$ in Formula 2-A and $X^2$ Formula 2-B each independently represent a hydrogen atom or a monovalent substituent. As the monovalent substituent, a monovalent substituent selected from the group consisting of an alkyl group, a haloalkyl group (for example, fluoroalkyl group), an alkoxy group, a polyalkyleneoxyalkyl group, and an aryl group can be used.

The alkyl group may include a substituent or may be non-substituted. As the alkyl group including a substituent, an alkyl group (hydroxyalkyl group) substituted with a hydroxyl group, and an alkyl group substituted with one or more halogen atoms are preferable. In addition, an alkyl group (haloalkyl group) in which all of hydrogen atoms bonded to carbon atoms are substituted with halogen atoms is also preferable. As the halogen atom, a fluorine atom, a chlorine atom, or a bromine atom can be used. The alkyl group is more preferably an alkyl group having 1 to 30 carbon atoms, and even more preferably an alkyl group having 1 to 10 carbon atoms. The alkyl group may have any of a linear, branched, and cyclic structure. The same applies to the haloalkyl group.

Specific examples of substituted or non-substituted alkyl group or haloalkyl group include a methyl group, an ethyl group, a propyl group, a butyl group, a pentyl group, a hexyl group, a heptyl group, an octyl group, a nonyl group, a decyl group, a undecyl group, a dodecyl group, a tridecyl group, a pentadecyl group, a hexadecyl group, a heptadecyl group, an octadecyl group, an eicosyl group, an isopropyl group, an isobutyl group, an isopentyl group, a 2-ethylhexyl group, a tert-octyl group, a 2-hexyldecyl group, a cyclohexyl group, a cyclopentyl group, a cyclohexylmethyl group, an octylcyclohexyl group, a 2-norbornyl group, a 2,2,4-trimethylpentyl group, an acetylmethyl group, an acetylethyl group, a hydroxymethyl group, a hydroxyethyl group, a hydroxypropyl group, a hydroxybutyl group, a hydroxypentyl group, a hydroxyhexyl group, a hydroxyheptyl group, a hydroxyoctyl group, a hydroxynonyl group, a hydroxydecyl group, a chloromethyl group, a dichloromethyl group, a trichloromethyl group, a bromomethyl group, a 1,1,1,3,3,3-hexafluoroisopropyl group, a heptafluoropropyl group, a pentadecafluoroheptyl group, a nonadecafluorononyl group, a hydroxyundecyl group, a hydroxydodecyl group, a hydroxypentadecyl group, a hydroxyheptadecyl group, and a hydroxyoctadecyl group.

Examples of the alkoxy group include a methoxy group, an ethoxy group, a propyloxy group, a hexyloxy group, a methoxyethoxy group, a methoxyethoxyethoxy group, and a methoxyethoxyethoxymethyl group.

The polyalkyleneoxyalkyl group is a monovalent substituent represented by $R_{10}(OR^{11})n1(O)m1-$. $R^{10}$ represents an alkyl group, $R^{11}$ represents an alkylene group, n1 represents an integer equal to or greater than 2, and m1 represents 0 or 1.

The alkyl group represented by $R^{10}$ is as described regarding the alkyl group represented by $X^1$ or $X^2$. For the specific description of the alkylene group represented by $R^{11}$, the description regarding the alkyl group represented by $X^1$ or $X^2$ can be applied by replacing the alkyl group with an alkylene group obtained by removing one hydrogen atom from the alkylene group (for example, by replacing the methyl group with a methylene group). n1 is an integer equal to or greater than 2, for example, is an integer equal to or smaller than 10, and preferably an integer equal to or smaller than 5.

The aryl group may include a substituent or may be annelated, and more preferably an aryl group having 6 to 24 carbon atoms, and examples thereof include a phenyl group, a 4-methylphenyl group, 4-phenylbenzoic acid, a 3-cyanophenyl group, a 2-chlorophenyl group, and a 2-naphthyl group.

The polyester chain represented by Formula 2-A and the polyester chain represented by Formula 2-B can have a polyester-derived structure obtained by a well-known polyester synthesis method. As the polyester synthesis method, ring-opening polymerization of lactone disclosed in paragraphs 0056 and 0057 of JP2015-28830A can be used. However, the structure of the polyester chain is not limited to the polyester-derived structure obtained by the ring-opening polymerization of lactone, and can be a polyester-derived structure obtained by a well-known polyester synthesis method, for example, polycondensation of polyvalent carboxylic acid and polyhydric alcohol or polycondensation of hydroxycarboxylic acid.

Number Average Molecular Weight of Polyester Chain

A number average molecular weight of the polyester chain is preferably equal to or greater than 200, more preferably equal to or greater than 400, and even more preferably equal to or greater than 500, from a viewpoint of improvement of dispersibility of ferromagnetic hexagonal ferrite powder. In addition, from the same viewpoint, the number average molecular weight of the polyester chain is preferably equal to or smaller than 100,000 and more preferably equal to or smaller than 50,000. As described above, it is considered that the polyester chain functions to cause steric hindrance in the magnetic layer forming composition and/or the magnetic solution and preventing the aggregation of the hexagonal ferrite particles. It is assumed that the polyester chain having the number average molecular weight described above can exhibit such an operation in an excellent manner. The number average molecular weight of the polyester chain is a value obtained by performing reference polystyrene conversion of a value measured by GPC, regarding polyester obtained by hydrolysis of a polyalkyleneimine derivative. The value acquired as described above is the same as a value obtained by performing reference polystyrene conversion of a value measured by GPC regarding polyester used for synthesis of the polyalkyleneimine derivative. Accordingly, the number average molecular weight acquired regarding polyester used for synthesis of the polyalkyleneimine derivative can be used as the number average molecular weight of the polyester chain included in the polyalkyleneimine derivative. For the measurement conditions of the number average molecular weight of the polyester chain, the measurement conditions of the number average molecular weight of polyester in a specific example which will be described later can be referred to.

Polyalkyleneimine Chain

Number Average Molecular Weight

The number average molecular weight of the polyalkyleneimine chain included in the polyalkyleneimine derivative is a value obtained by performing reference polystyrene conversion of a value measured by GPC, regarding polyalkyleneimine obtained by hydrolysis of a polyalkyleneimine derivative. The value acquired as described above is the same as a value obtained by performing reference polystyrene conversion of a value measured by GPC regarding polyalkyleneimine used for synthesis of the polyalkyleneimine derivative. Accordingly, the number average molecular weight acquired regarding polyalkyleneimine used for synthesis of the polyalkyleneimine derivative can be used as the number average molecular weight of the polyalkyleneimine chain included in the polyalkyleneimine derivative. For the measurement conditions of the number average molecular weight of the polyalkyleneimine chain, a specific example which will be described later can be referred to. In addition, the polyalkyleneimine is a polymer which can be obtained by ring-opening polymerization of alkyleneimine. In the polyalkyleneimine derivative, the term "polymer" is used to include a homopolymer including a repeating unit in the same structure and a copolymer including a repeating unit in two or more kinds of different structures.

The hydrolysis of the polyalkyleneimine derivative can be performed by various methods which are normally used as a hydrolysis method of ester. For details of such a method, description of a hydrolysis method disclosed in "The Fifth Series of Experimental Chemistry Vol. 14 Synthesis of Organic Compounds II—Alcohol·Amine" (Chemical Society of Japan, Maruzen Publication, issued August, 2005) pp. 95 to 98, and description of a hydrolysis method disclosed in "The Fifth Series of Experimental Chemistry Vol. 16 Synthesis of Organic Compounds IV—Carboxylic acid·Amino Acid·Peptide" (Chemical Society of Japan, Maruzen Publication, issued March, 2005) pp. 10 to 15 cam be referred to, for example.

The polyalkyleneimine is decomposed from the obtained hydrolyzate by well-known separating means such as liquid chromatography, and the number average molecular weight thereof can be acquired.

The number average molecular weight of the polyalkyleneimine chain included in the polyalkyleneimine derivative is in a range of 300 to 3,000. The inventors have surmised that when the number average molecular weight of the polyalkyleneimine chain is in the range described above, the polyalkyleneimine derivative can be effectively adsorbed to the surface of the hexagonal ferrite particles. The number average molecular weight of the polyalkyleneimine chain is preferably equal to or greater than 500, from a viewpoint of adsorption properties to the surface of the hexagonal ferrite particles. From the same viewpoint, the number average molecular weight is preferably equal to or smaller than 2,000.

Percentage of Polyalkyleneimine Chain Occupying Polyalkyleneimine Derivative

As described above, the inventors have considered that the polyalkyleneimine chain included in the polyalkyleneimine derivative can function as an adsorption part to the surface of the hexagonal ferrite particles. A percentage of the polyalkyleneimine chain occupying the polyalkyleneimine derivative (hereinafter, also referred to as a "polyalkyleneimine chain percentage") is preferably smaller than 5.0 mass %, from a viewpoint of increasing the dispersibility of the ferromagnetic hexagonal ferrite powder. From a viewpoint of improving the dispersibility of the ferromagnetic hexagonal ferrite powder, the polyalkyleneimine chain percentage is more preferably equal to or smaller than 4.9 mass %, even more preferably equal to or smaller than 4.8 mass %, further more preferably equal to or smaller than 4.5 mass %, still more preferably equal to or smaller than 4.0 mass %, and still even more preferably equal to or smaller than 3.0 mass %. In addition, from a viewpoint of improving the dispersibility of the ferromagnetic hexagonal ferrite powder, the polyalkyleneimine chain percentage is preferably equal to or greater than 0.2 mass %, more preferably equal to or greater than 0.3 mass %, and even more preferably equal to or greater than 0.5 mass %.

The percentage of the polyalkyleneimine chain described above can be controlled, for example, according to a mixing ratio of polyalkyleneimine and polyester used at the time of synthesis.

The percentage of the polyalkyleneimine chain occupying the polyalkyleneimine derivative can be calculated from an analysis result obtained by element analysis such as nuclear magnetic resonance (NMR), more specifically, $^1$H-NMR and $^{13}$C-NMR, and a well-known method. The value calculated as described is the same as a theoretical value acquired from a compounding ratio of a synthesis raw material in the polyalkyleneimine derivative, and thus, the theoretical value acquired from the compounding ratio can be used as the percentage of the polyalkyleneimine chain occupying the polyalkyleneimine derivative.

Structure of Polyalkyleneimine Chain

The polyalkyleneimine chain has a polymer structure including the same or two or more different alkyleneimine chains. As the alkyleneimine chain included, an alkyleneimine chain represented by the following Formula A and an alkyleneimine chain represented by Formula B can be used. In the alkyleneimine chains represented by the following Formulae, the alkyleneimine chain represented by Formula A can include a bonding site with a polyester chain. In addition, the alkyleneimine chain represented by Formula B can be bonded to a polyester chain by the salt crosslinking group described above. The polyalkyleneimine derivative can have a structure in which one or more polyester chains are bonded to the polyalkyleneimine chain, by including one or more alkyleneimine chains. In addition, the polyalkyleneimine chain may be formed of only a linear structure or may have a branched tertiary amine structure. It is preferable that the polyalkyleneimine chain has a branched structure, from a viewpoint of further improving the dispersibility. As a component having a branched structure, a component bonded to an adjacent alkyleneimine chain at $*^1$ in the following Formula A and a component bonded to an adjacent alkyleneimine chain at $*^2$ in the following Formula B can be used.

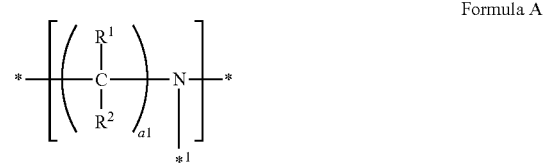

Formula A

In Formula A, $R^1$ and $R^2$ each independently represent a hydrogen atom or an alkyl group, a1 represents an integer equal to or greater than 2, and $*^1$ represents a bonding site with a polyester chain, an adjacent alkyleneimine chain, a hydrogen atom, or a substituent.

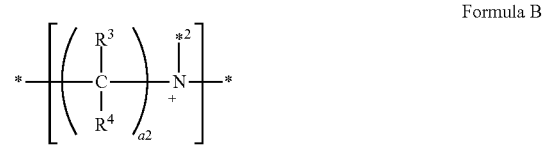

Formula B

In Formula B, $R^3$ and $R^4$ each independently represent a hydrogen atom or an alkyl group, and a2 represents an integer equal to or greater than 2. The alkyleneimine chain represented by Formula B is bonded to a polyester chain including an anionic group by forming a salt crosslinking group by $N^+$ in Formula B and an anionic group included in the polyester chain.

* in Formula A and Formula B and $*^2$ in Formula B each independently represent a site to be bonded to an adjacent alkyleneimine chain, a hydrogen atom, or a substituent.

Hereinafter, Formula A and Formula B will be further described in detail.

$R^1$ and $R^2$ in Formula A and $R^3$ and $R^4$ in Formula B each independently represent a hydrogen atom or an alkyl group. As the alkyl group, for example, an alkyl group having 1 to 6 carbon atoms can be used, and the alkyl group is preferably an alkyl group having 1 to 3 carbon atoms, more preferably a methyl group or an ethyl group, and even more preferably a methyl group. As an aspect of a combination of $R^1$ and $R^2$ in Formula A, an aspect in which one is a hydrogen atom and the other is an alkyl group, an aspect in which both of them are hydrogen atoms, and an aspect in which both of them are alkyl groups (alkyl groups which are the same as each other or different from each other) are used, and the aspect in which both of them are hydrogen atoms is preferably used. The point described above is also applied to $R^3$ and $R^4$ in Formula B in the same manner.

Ethyleneimine has a structure having the minimum number of carbon atoms configuring a ring as alkyleneimine, and the number of carbon atoms of a main chain of the alkyleneimine chain (ethyleneimine chain) obtained by ring opening of ethyleneimine is 2. Accordingly, the lower limit of a1 in Formula A and a2 in Formula B is 2. That is, a1 in Formula A and a2 in Formula B each independently represent an integer equal to or greater than 2. a1 in Formula A and a2 in Formula B are each independently preferably equal to or smaller than 10, more preferably equal to or smaller than 6, even more preferably equal to or smaller than 4, still more preferably 2 or 3, and still even more preferably 2, from a viewpoint of adsorption properties to the surface of the particles of the ferromagnetic powder.

The details of the bonding between the alkyleneimine chain represented by Formula A or the alkyleneimine chain represented by Formula B and the polyester chain are as described above.

Each alkyleneimine chain is bonded to an adjacent alkyleneimine chain, a hydrogen atom, or a substituent, at a position represented by * in each Formula. As the substituent, for example, a monovalent substituent such as an alkyl group (for example, an alkyl group having 1 to 6 carbon atoms) can be used, but there is no limitation. In addition, the polyester chain may be bonded as the substituent.

Weight-Average Molecular Weight of Polyalkyleneimine Derivative

A molecular weight of the polyalkyleneimine derivative is preferably 1,000 to 80,000 as the weight-average molecular weight as described above. The weight-average molecular weight of the polyalkyleneimine derivative is more preferably equal to or greater than 1,500, even more preferably equal to or greater than 2,000, and further more preferably equal to or greater than 3,000. In addition, the weight-average molecular weight of the polyalkyleneimine derivative is more preferably equal to or smaller than 60,000, even more preferably equal to or smaller than 40,000, and further more preferably equal to or smaller than 35,000, and still more preferably equal to or smaller than 34,000. For measurement conditions of the weight-average molecular weight of the polyalkyleneimine derivative, a specific example which will be described later can be referred to.

Synthesis Method

The synthesis method is not particularly limited, as long as the polyalkyleneimine derivative includes the polyester chain and the polyalkyleneimine chain having a number average molecular weight of 300 to 3,000 at the ratio described above. As a preferred aspect of the synthesis method, descriptions disclosed in paragraphs 0061 to 0069 of JP2015-28830A can be referred to.

As a specific example of the polyalkyleneimine derivative, various polyalkyleneimine derivatives shown in Table 2 synthesized by using polyethyleneimine and polyester shown in Table 2 can be used. For the details of the synthesis reaction, descriptions disclosed in Examples which will be described later and/or Examples of JP2015-28830A can be referred to.

TABLE 2

| Polyalkyleneimine (polyethyleneimine) derivative | Polyethyleneimine* | Polyethyleneimine amount (g) | Percentage of Polyalkyleneimine chain (polyethyleneimine chain) (mass %) | Polyester | Acid value (mgKOH/g) | Amine value (mgKOH/g) | Weight-average molecular weight |
|---|---|---|---|---|---|---|---|
| (J-1) | SP-018 | 5 | 4.8 | (i-1) | 22.2 | 28.6 | 15,000 |
| (J-2) | SP-006 | 2.4 | 2.3 | (i-2) | 35 | 17.4 | 7,000 |
| (J-3) | SP-012 | 4.5 | 4.3 | (i-3) | 6.5 | 21.2 | 22,000 |
| (J-4) | SP-006 | 5 | 4.8 | (i-4) | 4.9 | 11.8 | 34,000 |
| (J-5) | SP-003 | 5 | 4.8 | (i-5) | 10.1 | 15.2 | 19,000 |
| (J-6) | SP-018 | 1.2 | 1.2 | (i-6) | 68.5 | 22.4 | 8,000 |
| (J-7) | SP-018 | 3 | 2.9 | (i-7) | 39.9 | 16.8 | 13,000 |
| (J-8) | SP-012 | 2.5 | 2.4 | (i-8) | 15.5 | 18.9 | 18,000 |
| (J-9) | SP-006 | 5 | 4.8 | (i-9) | 11.1 | 16.8 | 22,000 |
| (J-10) | SP-003 | 4 | 3.8 | (i-10) | 4.4 | 14.1 | 24,000 |
| (J-11) | SP-012 | 0.3 | 0.3 | (i-10) | 8.1 | 7.8 | 28,000 |
| (J-12) | SP-018 | 1 | 1 | (i-1) | 28.8 | 6.7 | 15,000 |
| (J-13) | SP-012 | 5 | 4.8 | (i-6) | 61 | 28.2 | 4,000 |
| (J-14) | SP-006 | 2.4 | 2.3 | (i-11) | 30 | 17.4 | 6,000 |
| (J-15) | SP-006 | 2.4 | 2.3 | (i-12) | 42.8 | 18.1 | 6,300 |
| (J-16) | SP-006 | 2.4 | 2.3 | (i-13) | 43.7 | 17.9 | 5,900 |
| (J-17) | SP-006 | 2.4 | 2.3 | (i-14) | 42.5 | 17.1 | 5,300 |
| (J-18) | SP-006 | 2.3 | 2.4 | (i-15) | 37.5 | 19.4 | 7,300 |
| (J-19) | SP-006 | 2.3 | 2.4 | (i-16) | 24.6 | 16 | 9,800 |
| (J-20) | SP-006 | 2.3 | 2.4 | (i-17) | 27.5 | 26.1 | 9,300 |
| (J-21) | SP-006 | 2.3 | 2.4 | (i-18) | 31.7 | 8.9 | 8,900 |
| (J-22) | SP-006 | 2.3 | 2.4 | (i-19) | 15.3 | 13.9 | 15,100 |
| (J-23) | SP-006 | 2.3 | 2.4 | (i-20) | 38.1 | 22.4 | 7,580 |

(*Note)
Polyethyleneimine shown in Table 2 is as described below.
SP-003 (Polyethyleneimine (manufactured by Nippon Shokubai Co., Ltd.) number average molecular weight of 300)
SP-006 (Polyethyleneimine (manufactured by Nippon Shokubai Co., Ltd.) number average molecular weight of 600)
SP-012 (Polyethyleneimine (manufactured by Nippon Shokubai Co., Ltd.) number average molecular weight of 1,200)
SP-018 (Polyethyleneimine (manufactured by Nippon Shokubai Co., Ltd.) number average molecular weight of 1,800)

The polyester shown in Table 2 is polyester synthesized by the ring-opening polymerization of lactone by using lactone and a nucleophilic reagent (carboxylic acid) shown in Table 3. For the details of the synthesis reaction, descriptions disclosed in Examples which will be described later and/or Examples of JP2015-28830A can be referred to.

The dispersing agent described above is mixed with ferromagnetic hexagonal ferrite powder, a binder, an abrasive, and a solvent, and thus, the magnetic layer forming composition can be prepared. As described above, it is preferable that the ferromagnetic hexagonal ferrite powder and the abrasive are separately dispersed. In addition, the

TABLE 3

| Polyester | Carboxylic acid | Amount of carboxylic acid (g) | Lactone | Weight-average molecular weight | Number average molecular weight | Number of lactone repeating units |
|---|---|---|---|---|---|---|
| (i-1) | n-Octanoic acid | 12.6 | ε-Caprolactone | 9,000 | 7,500 | 20 |
| (i-2) | n-Octanoic acid | 16.8 | ε-Caprolactone | 7,000 | 5,800 | 15 |
| (i-3) | n-Octanoic acid | 3.3 | L-Lactide | 22,000 | 18,000 | 60 |
| (i-4) | Palmitic acid | 4.5 | ε-Caprolactone | 38,000 | 31,000 | 100 |
| (i-5) | Palmitic acid | 12.8 | δ-Valerolactone | 16,000 | 13,000 | 40 |
| (i-6) | Stearic acid | 99.7 | ε-Caprolactone | 2,500 | 2,000 | 5 |
| (i-7) | Glycol acid | 13.3 | ε-Caprolactone | 4,800 | 4,000 | 10 |
| (i-8) | 12-Hydroxystearic acid | 20 | δ-Valerolactone | 13,000 | 10,000 | 30 |
| (i-9) | 12-Hydroxystearic acid | 13.2 | ε-Caprolactone | 17,000 | 14,000 | 40 |
| (i-10) | 2-Naphthoic acid | 3.8 | ε-Caprolactone | 27,000 | 22,500 | 80 |
| (i-11) | [2-(2-Methoxyethoxy)ethoxy] acetic acid | 15.6 | ε-Caprolactone | 8,700 | 6,300 | 15 |
| (i-12) | n-Octanoic acid | 16.8 | Lactide | 8,100 | 4,100 | 15 |
| (i-13) | n-Octanoic acid | 17.31 | L-Lactide ε-Caprolactone | 6,900 | 3,500 | 10 (L-Lactide drived) 5 (ε-Caprolactone derived) |
| (i-14) | n-Octanoic acid | 17.31 | L-Lactide ε-Caprolactone | 6,200 | 3,200 | 5 (L-Lactide drived) 10 (ε-Caprolactone derived) |
| (i-15) | Nonafluorovaleric acid | 30.8 | ε-Caprolactone | 9,000 | 7,500 | 15 |
| (i-16) | Heptadecafluorononanoic acid | 54.2 | ε-Caprolactone | 8,000 | 5,000 | 15 |
| (i-17) | 3,5,5-Trimethylhexanoic acid | 18.5 | ε-Caprolactone | 10,000 | 5,800 | 15 |
| (i-18) | 4-Oxovaleric acid | 13.6 | ε-Caprolactone | 7,400 | 4,100 | 15 |
| (i-19) | [2-(2-Methoxyethoxy)ethoxy] acetic acid | 20.8 | ε-Caprolactone | 15,300 | 11,500 | 30 |
| (i-20) | Benzoic acid | 14.3 | ε-Caprolactone | 7,000 | 3,000 | 15 |

The acid value and amine value described above are determined by a potentiometric method (solvent: tetrahydrofuran/water=100/10 (volume ratio), titrant: 0.01 N (0.01 mol/l), sodium hydroxide aqueous solution (acid value), 0.01 N (0.01 mol/l) hydrochloric acid (amine value)).

The average molecular weight (number average molecular weight and weight-average molecular weight) is acquired by performing reference polystyrene conversion of a value measured by GPC.

Specific examples of the measurement conditions of the average molecular weights of polyester, polyalkyleneimine, and a polyalkyleneimine derivative are respectively as described below.

Measurement Conditions of Average Molecular Weight of Polyester

Measurement device: HLC-8220 GPC (manufactured by Tosoh Corporation)

Column: TSK gel Super HZ2000/TSK gel Super HZ 4000/TSK gel Super HZ-H (manufactured by Tosoh Corporation)

Eluent: Tetrahydrofuran (THF)

Flow rate: 0.35 mL/min

Column temperature: 40° C.

Detector: differential refractometry (RI) detector

Measurement Conditions of Average Molecular Weight of Polyalkyleneimine and Average Molecular Weight of Polyalkyleneimine Derivative Measurement device: HLC-8320 GPC (manufactured by Tosoh Corporation)

Column: three TSK gel Super AWM-H (manufactured by Tosoh Corporation)

Eluent: N-methyl-2-pyrrolidone (10 mmol/l of lithium bromide is added as an additive)

Flow rate: 0.35 mL/min

Column temperature: 40° C.

Detector: differential refractometry (RI) detector magnetic layer of the magnetic tape can include the dispersing agent, together with the ferromagnetic hexagonal ferrite powder and the binder. The dispersing agent may be used alone or in combination of two or more kinds having different structures. In a case of using two more kinds thereof in combination, the content thereof means the total content of the compounds used in combination. The point described above is also applied to the content of various components disclosed in the specification.

The content of the dispersing agent is preferably 0.5 to 25.0 parts by mass with respect to 100.0 parts by mass of the ferromagnetic hexagonal ferrite powder. The content of the dispersing agent is preferably equal to or greater than 0.5 parts by mass, more preferably equal to or greater than 1.0 part by mass, even more preferably equal to or greater than 5.0 parts by mass, and still more preferably equal to or greater than 10.0 parts by mass, with respect to 100.0 parts by mass of the ferromagnetic hexagonal ferrite powder, from viewpoints of improving the dispersibility of the ferromagnetic hexagonal ferrite powder and the durability of the magnetic layer. Meanwhile, it is preferable to increase the filling percentage of the ferromagnetic hexagonal ferrite powder of the magnetic layer, in order to improve recording density. From this point, it is preferable that the content of the components other than the ferromagnetic hexagonal ferrite powder is relatively low. From the viewpoints described above, the content of the dispersing agent is preferably equal to or smaller than 25.0 parts by mass, more preferably equal to or smaller than 20.0 parts by mass, even more preferably equal to or smaller than 18.0 parts by mass, and still more preferably equal to or smaller than 15.0 parts by mass with respect to 100.0 parts by mass of the ferromagnetic hexagonal ferrite powder.

Hereinafter, the magnetic tape will be further described in detail.

Magnetic Layer

Ferromagnetic Powder

The ferromagnetic powder included in the magnetic layer is ferromagnetic hexagonal ferrite powder having an activation volume equal to or smaller than 1,600 nm$^3$. The details of the activation volume of the ferromagnetic hexagonal ferrite powder are as described above. A percentage of the hexagonal ferrite particles having the aspect ratio and the length in the long axis direction described above in all of the hexagonal ferrite particles observed in the STEM image, can be, for example, equal to or greater than 50%, as a percentage with respect to all of the hexagonal ferrite particles observed in the STEM image, based on the particle number. In addition, the percentage can be, for example, equal to or smaller than 95% and can exceed 95%. For other details of ferromagnetic hexagonal ferrite powder, for example, descriptions disclosed in paragraphs 0012 to 0030 of JP2011-225417A, paragraphs 0134 to 0136 of JP2011-216149A, and paragraphs 0013 to 0030 of JP2012-204726A can be referred to.

The content (filling percentage) of the ferromagnetic hexagonal ferrite powder of the magnetic layer is preferably in a range of 50 to 90 mass % and more preferably in a range of 60 to 90 mass %. The component other than the ferromagnetic hexagonal ferrite powder of the magnetic layer is at least a binder, an abrasive, and one or more components selected from the group consisting of fatty acid and fatty acid amide, and arbitrarily one or more kinds of additives can be included. The high filling percentage of the ferromagnetic hexagonal ferrite powder of the magnetic layer is preferable, from a viewpoint of improving recording density.

Fatty Acid and Fatty Acid Amide

The magnetic tape includes one or more components selected from the group consisting of fatty acid and fatty acid amide in the magnetic layer. The magnetic layer may include only one or both of fatty acid and fatty acid amide. The inventor has considered that presence of a large amount of the components in the extremely outermost surface part of the magnetic layer contributes the prevention of the partial output decrease at the time of signal reproducing. In addition, in the magnetic tape including a non-magnetic layer which will be described later in detail, between the non-magnetic support and the magnetic layer, one or more components selected from the group consisting of fatty acid and fatty acid amide may be included in the non-magnetic layer. The non-magnetic layer can play a role of holding a lubricant such as fatty acid or fatty acid amide and supply the lubricant to the magnetic layer. The lubricant such as fatty acid or fatty acid amide included in the non-magnetic layer may be moved to the magnetic layer and present in the magnetic layer.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the magnetic layer in a state of salt such as metal salt.

As fatty acid amide, amide of various fatty acid described above is used, and specific examples thereof include lauric acid amide, myristic acid amide, palmitic acid amide, and stearic acid amide.

Regarding fatty acid and a derivative of fatty acid (amide and ester which will be described later), a part derived from fatty acid of the fatty acid derivative preferably has a structure which is the same as or similar to that of fatty acid used in combination. As an example, in a case of using fatty acid and stearic acid, it is preferable to use stearic acid amide and/or stearic acid ester.

The content of fatty acid of a magnetic layer forming composition is, for example, 0.1 to 10.0 parts by mass and is preferably 1.0 to 7.0 parts by mass, with respect to 100.0 parts by mass of ferromagnetic powder. In a case of adding two or more kinds of different fatty acids to the magnetic layer forming composition, the content thereof is the total content of two or more kinds of different fatty acids. The same applies to other components. In addition, in the invention and the specification, a component disclosed may be used alone or used in combination of two or more kinds thereof, unless otherwise noted.

The content of fatty acid amide in the magnetic layer forming composition is, for example, 0.1 to 3.0 parts by mass and is preferably 0.1 to 1.0 part by mass with respect to 100.0 parts by mass of ferromagnetic powder.

Meanwhile, the content of fatty acid in a non-magnetic layer forming composition is, for example, 1.0 to 10.0 parts by mass and is preferably 1.0 to 7.0 parts by mass with respect to 100.0 parts by mass of non-magnetic powder. In addition, the content of fatty acid amide in the non-magnetic layer forming composition is, for example, 0.1 to 3.0 parts by mass and is preferably 0.1 to 1.0 part by mass with respect to 100.0 parts by mass of non-magnetic powder.

Binder

The magnetic tape includes a binder in the magnetic layer. The binder is one or more kinds of resin. For example, as the binder, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binder even in the non-magnetic layer and/or a back coating layer which will be described later. For the binder described above, description disclosed in paragraphs 0028 to 0031 of JP2010-24113A can be referred to. In addition, the binder may be a radiation curable resin such as an electron beam-curable resin. For the radiation curable resin, descriptions disclosed in paragraphs 0044 and 0045 of JP2011-48878A can be referred to.

In addition, a curing agent can be used together with a resin which can be used as the binder. The curing agent is a compound including at least one and preferably two or more crosslinking functional groups in one molecule. At least a part of the curing agent is included in the magnetic layer in a state of being reacted (crosslinked) with other components such as the binder, by proceeding the curing reaction in the magnetic layer forming step. As the curing agent, polyisocyanate is suitable. For the details of polyisocyanate, descriptions disclosed in paragraphs 0124 and 0125 of JP2011-216149A can be referred to. The amount of the curing agent used can be, for example, 0 to 80.0 parts by mass with respect to 100.0 parts by mass of the binder, and is preferably 50.0 to 80.0 parts by mass, from a viewpoint of improvement of strength of each layer such as the magnetic layer.

Abrasive

The magnetic tape includes an abrasive in the magnetic layer. The abrasive means non-magnetic powder having Mohs hardness exceeding 8 and is preferably non-magnetic powder having Mohs hardness equal to or greater than 9. The abrasive may be powder of inorganic substances (inorganic powder) or may be powder of organic substances (organic powder), and the inorganic powder is preferable. The abrasive is more preferably inorganic powder having Mohs hardness exceeding 8 and even more preferably inorganic powder having Mohs hardness equal to or greater than 9. A maximum value of Mohs hardness is 10 of diamond. Specifically, powders of alumina ($Al_2O_3$), silicon carbide, boron carbide ($B_4C$), TiC, cerium oxide, zirconium oxide ($ZrO_2$), diamond, and the like can be used as the abrasive, and among these, alumina powder is preferable. For the alumina powder, a description disclosed in a paragraph 0021 of JP2013-229090A can be referred to. In addition, a specific surface area can be used as an index of a particle size of the abrasive. A great value of the specific surface area means a small particle size. From a viewpoint of increasing surface smoothness of the magnetic layer, an abrasive having a specific surface area measured by Brunauer-Emmett-Teller (BET) method (hereinafter, referred to as a "BET specific surface area") which is equal to or greater than 14 $m^2/g$, is preferably used. In addition, from a viewpoint of dispersibility, an abrasive having a BET specific surface area equal to or smaller than 40 $m^2/g$, is preferably used. The content of the abrasive of the magnetic layer is preferably 1.0 to 20.0 parts by mass with respect to 100.0 parts by mass of the ferromagnetic powder.

Other Components

One or both of the magnetic layer and the non-magnetic layer which will be described later specifically may include or may not include fatty acid ester.

All of Fatty acid ester, fatty acid, and fatty acid amide are components which can function as a lubricant. The lubricant is generally broadly divided into a fluid lubricant and a boundary lubricant. Fatty acid ester is called a component which can function as a fluid lubricant, whereas fatty acid and fatty acid amide is called as a component which can function as a boundary lubricant. It is considered that the boundary lubricant is a lubricant which can be attached to a surface of powder (for example, ferromagnetic powder) and form a rigid lubricant film to decrease contact friction. Meanwhile, it is considered that the fluid lubricant is a lubricant which can form a liquid film on a surface of a magnetic layer to reduce friction due to flowing of the liquid film. As described above, it is considered that the operation of fatty acid ester is different from the operation fatty acid and fatty acid amide as the lubricants. The inventor has considered that, as described above, setting of the surface part C—H derived C concentration which is considered as an index of the amount of one or more components selected from the group consisting of fatty acid and fatty acid amide present in the extremely outermost surface part of the magnetic layer contributes to be equal to or greater than 45 atom % contributes the prevention of the partial output decrease at the time of signal reproducing.

As fatty acid ester, esters of various fatty acids described above regarding fatty acid can be used. Specific examples thereof include butyl myristate, butyl palmitate, butyl stearate (butyl stearate), neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester of the magnetic layer forming composition is, for example, 0 to 10.0 parts by mass and is preferably 1.0 to 7.0 parts by mass with respect to 100.0 parts by mass of ferromagnetic powder.

In addition, the content of fatty acid ester in the non-magnetic layer forming composition is, for example, 0 to 10.0 parts by mass and is preferably 1.0 to 7.0 parts by mass with respect to 100.0 parts by mass of non-magnetic powder.

The magnetic layer may further include one or more kinds of other additives. In addition, examples of the additive which can be included in the magnetic layer include a non-magnetic filler, a lubricant, a dispersing agent, a dispersing assistant, an antibacterial agent, an antistatic agent, an antioxidant, and carbon black. The non-magnetic filler is identical to the non-magnetic powder. As the non-magnetic filler, a non-magnetic filler (hereinafter, referred to as a "projection formation agent") which can function as a projection formation agent which forms projections suitably protruded from the surface of the magnetic layer can be used. The projection formation agent is a component which can contribute to the control of friction properties of the surface of the magnetic layer. As the projection formation agent, various non-magnetic powders normally used as a projection formation agent can be used. These may be inorganic substances or organic substances. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably powder of inorganic substances (inorganic powder). Examples of the inorganic powder include powder of metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide configuring the inorganic oxide colloidal particles are preferably silicon dioxide (silica). The inorganic oxide colloidal particles are more preferably colloidal silica (silica colloidal particles). In the invention and the specification, the "colloidal particles" are particles which are not precipitated and dispersed to generate a colloidal dispersion, when 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. In addition, in another aspect, the projection formation agent is preferably carbon black. An average particle size of the projection formation agent is, for example, 30 to 300 nm and is preferably 40 to 200 nm. In addition, from a viewpoint that the projection formation agent can exhibit the functions thereof in more excellent manner, the content of the projection formation agent of the magnetic layer is preferably 1.0 to 4.0 parts by mass and more preferably 1.5 to 3.5 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition.

As the additives, a commercially available product or an additive prepared by a well-known method can be suitably selected and used according to desired properties.

Non-Magnetic Layer

Next, the non-magnetic layer will be described. The magnetic tape may directly include a magnetic layer on a non-magnetic support, or may include a non-magnetic layer including non-magnetic powder and a binder between the non-magnetic support and the magnetic layer. The non-magnetic powder used in the non-magnetic layer may be inorganic powder or organic powder. In addition, carbon black and the like can be used. Examples of the inorganic powder include powders of metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113 can be referred to. The content (filling percentage) of the non-magnetic powder of the non-magnetic layer is preferably in a range of 50 to 90 mass % and more preferably in a range of 60 to 90 mass %.

In regards to other details of a binder or additives of the non-magnetic layer, the well-known technology regarding the non-magnetic layer can be applied. In addition, in regards to the type and the content of the binder, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Back Coating Layer

The magnetic tape can also include a back coating layer including non-magnetic powder and a binder on a surface of the non-magnetic support opposite to the surface including the magnetic layer. The back coating layer preferably includes any one or both of carbon black and inorganic powder. In regards to the binder included in the back coating layer and various additives which can be arbitrarily included in the back coating layer, a well-known technology regarding the treatment of the magnetic layer and/or the non-magnetic layer can be applied.

Various Thicknesses

A thickness of the non-magnetic support is preferably 3.0 to 20.0 μm, more preferably 3.0 to 10.0 μm, and even more preferably 3.0 to 6.0 μm.

A thickness of the magnetic layer can be optimized in accordance with saturation magnetization quantity of the magnetic head used, a head gap length, or a band of a recording signal. The thickness of the magnetic layer is normally 0.01 μm to 0.15 μm (10 nm to 150 nm), and is preferably 0.02 μm to 0.12 μm (20 nm to 120 nm) and more preferably 0.03 μm to 0.10 μm (30 nm to 100 nm), from a viewpoint of realizing recording at high density. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, 0.10 to 1.50 μm and is preferably 0.10 to 1.00 μm.

A thickness of the back coating layer is preferably equal to or smaller than 0.90 μm and even more preferably 0.10 to 0.70 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binder normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, a binder may be separately added in a kneading step, a dispersing step, and a mixing step for adjusting viscosity after the dispersion. In the preparation of the magnetic layer forming composition, it is preferable that the abrasive and the ferromagnetic hexagonal ferrite powder are separately dispersed as described above. In a manufacturing step of the magnetic tape, a well-known manufacturing technology of the related art can be used as a part of the step. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP 1989-79274A (JP-H01-79274A). In addition, in order to disperse each layer forming composition, glass beads and/or other beads can be used. As such dispersion beads, zirconia beads, titania beads, and steel beads which are dispersion beads having high specific gravity are suitable. These dispersion beads are preferably used by optimizing a bead diameter and a filling percentage. As a dispersion device, a well-known dispersion device can be used. As one of means for obtaining a magnetic tape having cos θ of 0.85 to 1.00, a technology of reinforcing the dispersion conditions (for example, increasing the dispersion time, decreasing the diameter of the dispersion beads used for dispersion and/or increasing the filling percentage of the dispersion beads, using the dispersing agent, and the like) is also preferable. A preferred aspect regarding the reinforcing of the dispersion conditions is as described above.

Coating Step, Cooling Step, and Heating And Drying Step

The magnetic layer can be formed by directly coating the magnetic layer forming composition onto the non-magnetic support, or by performing multilayer coating of the magnetic layer forming composition with the non-magnetic layer forming composition in order or at the same time. For details of the coating for forming each layer, a description disclosed in a paragraph 0066 of JP2010-231843A can be referred to.

As described above, in one aspect, the magnetic tape includes the non-magnetic layer between the non-magnetic support and the magnetic layer. Such a magnetic tape can be preferably manufactured by successive multilayer coating. A manufacturing step of performing the successive multilayer coating can be preferably performed as follows. The non-magnetic layer is formed through a coating step of applying a non-magnetic layer forming composition onto a non-magnetic support to form a coating layer, and a heating and drying step of drying the formed coating layer by a heating process. In addition, the magnetic layer is formed through a coating step of applying a magnetic layer forming composition onto the formed non-magnetic layer to form a coating layer, and a heating and drying step of drying the formed coating layer by a heating process.

In the manufacturing method of performing such successive multilayer coating, it is preferable to perform the non-magnetic layer forming step by using the non-magnetic layer forming composition including one or more components selected from the group consisting of fatty acid and fatty acid amide in the coating step, and to perform a cooling step of cooling the coating layer between the coating step and the heating and drying step, in order to adjust the surface part C—H derived C concentration to be equal to or greater than 45 atom %, in the magnetic tape including at least one or more components selected from the group consisting of fatty acid and fatty acid amide in the magnetic layer. The reason thereof is not clear, but the inventor has surmised that the reason thereof is because the components (fatty acid and/or fatty acid amide) are easily moved to the surface of the non-magnetic layer at the time of solvent volatilization of the heating and drying step, by cooling the coating layer of the non-magnetic layer forming composition before the heating and drying step. However, this is merely the surmise, and the invention is not limited thereto.

In the magnetic layer forming step, a coating step of applying a magnetic layer forming composition including ferromagnetic powder, a binder, and a solvent onto a non-magnetic layer to form a coating layer, and a heating and drying step of drying the formed coating layer by a heating process can be performed. The magnetic tape includes one or more components selected from the group consisting of fatty acid and fatty acid amide in the magnetic layer. In a case where the magnetic tape includes the non-magnetic layer between the non-magnetic support and the magnetic layer, the magnetic layer forming composition preferably includes one or more components selected from the group consisting of fatty acid and fatty acid amide, in order to manufacture such a magnetic tape. However, it is not necessary that the magnetic layer forming composition includes one or more components selected from the group consisting of fatty acid and fatty acid amide. This is because that a magnetic layer including one or more components selected from the group consisting of fatty acid and fatty acid amide can be formed, by applying the magnetic layer forming composition onto a non-magnetic layer to form the magnetic layer, after the components included in the non-magnetic layer forming composition are moved to the surface of the non-magnetic layer.

Hereinafter, a specific aspect of the manufacturing method of the magnetic tape will be described with reference to FIG. 3. However, the invention is not limited to the following specific aspect.

Figure 3:
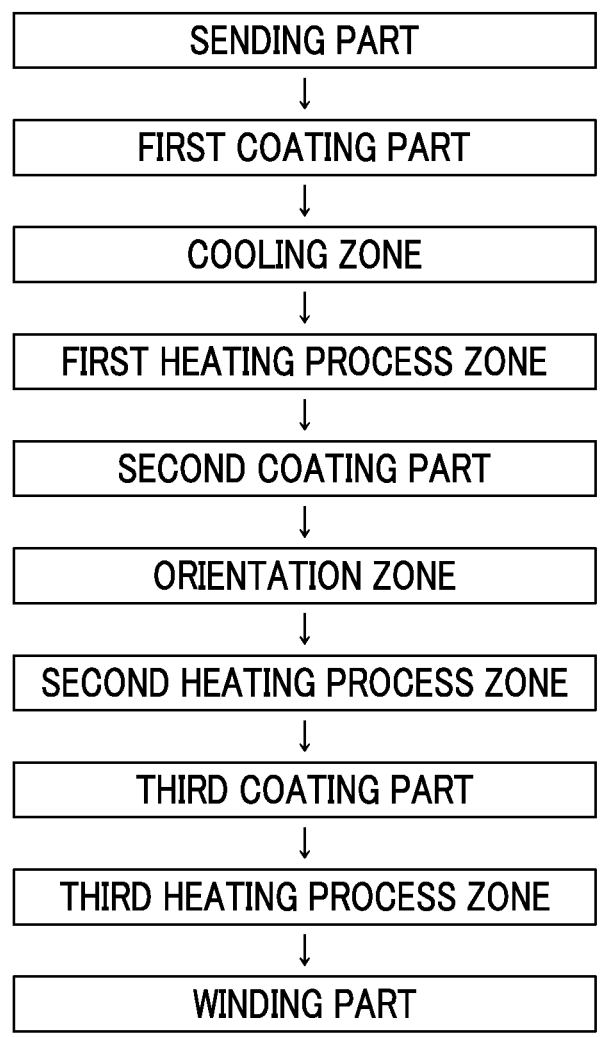
FIG. 3 shows an example (step schematic view) of a specific aspect of a magnetic tape manufacturing step.

FIG. 3 is a step schematic view showing a specific aspect of a step of manufacturing the magnetic tape including a non-magnetic layer and a magnetic layer in this order on one surface of a non-magnetic support and including a back coating layer on the other surface thereof. In the aspect shown in FIG. 3, an operation of sending a non-magnetic support (elongated film) from a sending part and winding the non-magnetic support around a winding part is continuously performed, and various processes of coating, drying, and orientation are performed in each part or each zone shown in FIG. 3, and thus, it is possible to sequentially form a non-magnetic layer and a magnetic layer on one surface of the running non-magnetic support by multilayer coating and to form a back coating layer on the other surface thereof. The manufacturing step which is normally performed for manufacturing the coating type magnetic recording medium can be performed in the same manner except for including a cooling zone.

The non-magnetic layer forming composition is applied onto the non-magnetic support sent from the sending part in a first coating part (coating step of non-magnetic layer forming composition).

After the coating step, a coating layer of the non-magnetic layer forming composition formed in the coating step is cooled in a cooling zone (cooling step). For example, it is possible to perform the cooling step by allowing the non-magnetic support on which the coating layer is formed to pass through a cooling atmosphere. An atmosphere temperature of the cooling atmosphere is preferably in a range of −10° C. to 0° C. and more preferably in a range of −5° C. to 0° C. The time for performing the cooling step (for example, time while an arbitrary part of the coating layer is delivered to and sent from the cooling zone (hereinafter, also referred to as a "staying time")) is not particularly limited, and when the time described above is long, the surface part C—H derived C concentration tends to be increased. Thus, the time described above is preferably adjusted by performing preliminary experiment if necessary, so that the surface part C—H derived C concentration equal to or greater than 45 atom % is realized. In the cooling step, cooled air may blow to the surface of the coating layer.

After the cooling zone, in a first heating process zone, the coating layer is heated after the cooling step to dry the coating layer (heating and drying step). The heating and drying process can be performed by causing the non-magnetic support including the coating layer after the cooling step to pass through the heated atmosphere. An atmosphere temperature of the heated atmosphere here is, for example, approximately 60° to 140°. Here, the atmosphere temperature may be a temperature at which the solvent is volatilized and the coating layer is dried, and the atmosphere temperature is not limited to the atmosphere temperature in the range described above. In addition, the heated air may blow to the surface of the coating layer. The points described above are also applied to a heating and drying step of a second heating process zone and a heating and drying step of a third heating process zone which will be described later, in the same manner.

Next, in a second coating part, the magnetic layer forming composition is applied onto the non-magnetic layer formed by performing the heating and drying step in the first heating process zone (coating step of magnetic layer forming composition).

After that, while the coating layer of the magnetic layer forming composition is wet, an orientation process of the ferromagnetic powder in the coating layer is performed in an orientation zone. For the orientation process, a description disclosed in a paragraph 0052 of JP2010-24113A can be referred to. As one of means for obtaining a magnetic tape having cos θ of 0.85 to 1.00, a vertical orientation process is preferably performed.

The coating layer after the orientation process is subjected to the heating and drying step in the second heating process zone.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition). After that, the coating layer is heated and dried in the third heating process zone.

By the step described above, it is possible to obtain the magnetic tape including the non-magnetic layer and the magnetic layer in this order on one surface of the non-magnetic support and including the back coating layer on the other surface thereof.

In order to manufacture the magnetic tape, well-known various processes for manufacturing the coating type magnetic recording medium can be performed. For example, for various processes, descriptions disclosed in paragraphs 0051 to 0057 of JP2010-24113A can be referred to.

The magnetic tape described above includes the ferromagnetic hexagonal ferrite powder having an activation volume equal to or smaller than 1,600 nm$^3$ in the magnetic layer, and it is possible to prevent the partial output decrease at the time of signal reproducing.

EXAMPLES

Hereinafter, the invention will be described with reference to Examples. However, the invention is not limited to aspects shown in the Examples. "Parts" and "%" in the following description mean "parts by mass" and "mass %", unless otherwise noted.

An average particle size of the powder of the invention and the specification is a value measured by a method disclosed in paragraphs 0058 to 0061 of JP2016-071926A. The measurement of the average particle size described below was performed by using transmission electron microscope H-9000 manufactured by Hitachi, Ltd. as the transmission electron microscope, and image analysis software KS-400 manufactured by Carl Zeiss as the image analysis software.

Examples 1 to 10 and Comparative Examples 1 to 10

1. Preparation of Alumina Dispersion 3.0 parts of a solution (solvent is a mixed solvent of methyl ethyl ketone and toluene) having 32% of 2,3-dihydroxynaphthalene (manufactured by Tokyo Chemical Industry Co., Ltd.), 31.3 parts of a polyester polyurethane resin having a SO$_3$Na group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-80 manufactured by Sumitomo Chemical Co., Ltd.) having an gelatinization ratio of 65% and a BET specific surface area of 20 m$^2$/g, and dispersed in the presence of zirconia beads by a paint shaker for 5 hours. After the dispersion, the dispersion liquid and the beads were separated by a mesh and an alumina dispersion was obtained.

2. Magnetic Layer Forming Composition List
Magnetic Solution
Ferromagnetic hexagonal ferrite powder: 100.0 parts
Activation volume: see Table 8
SO$_3$Na group-containing polyurethane resin: 14.0 parts
Weight-average molecular weight: 70,000, SO$_3$Na group: 0.2 meq/g
Dispersing agent: see Table 8
Cyclohexanone: 150.0 parts
Methyl ethyl ketone: 150.0 parts
Abrasive liquid
Alumina dispersion prepared in the section 1.: 6.0 parts
Silica Sol (Projection Forming Agent Liquid)
Colloidal silica (average particle size of 120 nm): 2.0 parts
Methyl ethyl ketone: 1.4 parts
Other Components
Stearic acid: see Table 8
Stearic acid amide: see Table 8
Butyl stearate: see Table 8
Polyisocyanate (CORONATE (registered trademark) manufactured by Nippon Polyurethane Industry): 2.5 parts
Finishing Additive Solvent
Cyclohexanone: 200.0 parts
Methyl ethyl ketone: 200.0 parts 3. Non-Magnetic Layer Forming Composition List
Nonmagnetic inorganic powder: α-iron oxide: 100.0 parts
Average particle size (average long axis length): 0.15 μm
Average acicular ratio: 7
BET specific surface area: 52 m$^2$/g
Carbon black: 20.0 parts
Average particle size: 20 nm
SO$_3$Na group-containing polyurethane resin: 18.0 parts
Weight-average molecular weight: 70,000, SO$_3$Na group: 0.2 meq/g
Stearic acid: see Table 8
Stearic acid amide: see Table 8
Butyl stearate: see Table 8
Cyclohexanone: 300.0 parts
Methyl ethyl ketone: 300.0 parts 4. Back Coating Layer Forming Composition List
Nonmagnetic inorganic powder: α-iron oxide: 80.0 parts
Average particle size (average long axis length): 0.15 μm
Average acicular ratio: 7
BET specific surface area: 52 m$^2$/g
Carbon black: 20.0 parts
Average particle size: 20 nm
A vinyl chloride copolymer: 13.0 parts Sulfonic acid group-containing polyurethane resin: 6.0 parts Phenylphosphonic acid: 3.0 parts Methyl ethyl ketone: 155.0 parts Polyisocyanate: 5.0 parts Cyclohexanone: 355.0 parts 5. Preparation of Each Layer Forming Composition (1) Preparation of Magnetic Layer Forming Composition The magnetic layer forming composition was prepared by the following method.

A magnetic solution was prepared by performing beads dispersing of the magnetic solution components described above by using beads as the dispersion medium in a batch type vertical sand mill. Specifically, the dispersing process was performed for the dispersion retention time shown in Table 8 by using zirconia beads having a bead diameter shown in Table 8, as the beads dispersion of each stage (first stage and second stage, or first to third stages). In the beads dispersion, dispersion liquid obtained by using filter (average hole diameter of 5 µm) was filtered after completion of each stage. In the beads dispersion of each stage, the filling percentage of the dispersion medium was set to be approximately 50 to 80 volume %.

The magnetic solution obtained as described above was mixed with the abrasive liquid, silica sol, other components, and the finishing additive solvent and beads-dispersed for 5 minutes by using the sand mill, and ultrasonic dispersion was performed with a batch type ultrasonic device (20 kHz, 300 W) for 0.5 minutes. After that, the obtained mixed liquid was filtered by using a filter (average hole diameter of 0.5 µm), and the magnetic layer forming composition was prepared.

A circumferential speed of a tip of the sand mill at the time of beads dispersion was in a range of 7 to 15 m/sec.

(2) Preparation of Non-Magnetic Layer Forming Composition

The non-magnetic layer forming composition was prepared by the following method.

Each component excluding a lubricant (stearic acid, stearic acid amide, and butyl stearate), cyclohexanone, and methyl ethyl ketone was dispersed by using a batch type vertical sand mill (dispersion medium: zirconia beads (bead diameter: 0.1 mm), dispersion retention time: 24 hours) to obtain dispersion liquid. After that, the remaining components were added into the obtained dispersion liquid and stirred with a dissolver. Then, the obtained dispersion liquid was filtered by using the filter (average hole diameter of 0.5 µm), and a non-magnetic layer forming composition was prepared.

(3) Preparation of Back Coating Layer Forming Composition

The back coating layer forming composition was prepared by the following method.

Each component excluding polyisocyanate and cyclohexanone was kneaded and diluted by an open kneader. Then, the obtained mixed liquid was subjected to a dispersing process of 12 passes, with a transverse beads mill by using zirconia beads having a bead diameter of 1 mm, by setting a bead filling percentage as 80 volume %, a circumferential speed of rotor tip as 10 m/sec, and a retention time for 1 pass as 2 minutes. After that, the remaining components were added into the obtained dispersion liquid and stirred with a dissolver. Then, the obtained dispersion liquid was filtered with a filter (average hole diameter of 1 µm) and a back coating layer forming composition was prepared.

6. Manufacturing of Magnetic Tape

A magnetic tape was manufactured by the specific aspect shown in FIG. 3. The magnetic tape was specifically manufactured as follows.

A support made of polyethylene naphthalate having a thickness of 4.30 µm was sent from the sending part, and the non-magnetic layer forming composition prepared in the section 5. was applied to one surface thereof so that the thickness after the drying becomes 1.00 µm in the first coating part, to form a coating layer. The cooling step was performed by passing the formed coating layer through the cooling zone in which the atmosphere temperature is adjusted to 0° C. for the staying time shown in Table 8 while the coating layer is wet, and then the heating and drying step was performed by passing the coating layer through the first heating process zone at the atmosphere temperature of 100° C., to form a non-magnetic layer.

Then, the magnetic layer forming composition prepared in the section 5. was applied onto the non-magnetic layer so that the thickness after the drying becomes 0.10 µm in the second coating part, and a coating layer was formed. In Examples and Comparative Examples in which "performed" was shown in the column of the vertical orientation process in Table 8, the vertical orientation process was performed by applying a magnetic field having a magnetic field strength of 0.3 T to the coating surface in a vertical direction, while the coated magnetic layer forming composition was not dried, and then, the drying was performed in the second heating process zone (atmosphere temperature of 100° C.). In Comparative Examples in which "not performed" was shown in the column of the vertical orientation process in Table 8, the coated magnetic layer forming composition was dried in the second heating process zone (atmosphere temperature of 100° C.), without performing the vertical orientation process.

After that, in the third coating part, the back coating layer forming composition prepared in the section 5. was applied to the surface of the non-magnetic support made of polyethylene naphthalate on a side opposite to the surface where the non-magnetic layer and the magnetic layer are formed, so that the thickness after the drying becomes 0.60 µm, to form a coating layer, and the formed coating layer was dried in a third heating process zone (atmosphere temperature of 100° C.).

The thickness of each layer is a designed thickness calculated according to the manufacturing conditions.

Then, a calender process (surface smoothing treatment) was performed with a calender roll configured of only a metal roll, at a speed of 80 m/min, linear pressure of 294 kN/m (300 kg/cm), and a surface temperature of a calender roll of 100° C. Then, a heating process was performed in the environment of the atmosphere temperature of 70° C. for 36 hours. After the heating process, the laminate was slit to have a width of ½ inches (0.0127 meters) and a magnetic tape was manufactured.

In Table 8, in the Comparative Examples in which "0 seconds" is disclosed in a column of the cooling zone staying time, a magnetic tape was manufactured by a manufacturing step not including the cooling zone.

By performing the steps described above, magnetic tapes were respective obtained in Examples 1 to 10 and Comparative Examples 1 to 10.

7. Preparation of Dispersing Agent

Dispersing agents 1 to 4 shown in Table 8 were prepared by the following method. Hereinafter, a temperature shown regarding the synthesis reaction is a temperature of a reaction liquid.

In Comparative Example 10, 2,3-dihydroxynaphthalene was used instead of the dispersing agents 1 to 4. 2,3-dihydroxynaphthalene is a compound used as an additive for adjusting a squareness ratio in JP2012-203955A.

(1) Preparation of Dispersing Agent 1

Synthesis of Precursor 1

197.2 g of ε-caprolactone and 15.0 g of 2-ethyl-1-hexanol were introduced into a 500 mL three-neck flask and stirred and decomposed while blowing nitrogen. 0.1 g of monobutyltin oxide was added thereto and heated to 100° C. After 8 hours, the elimination of the raw material was confirmed by gas chromatography, the resultant material was cooled to room temperature, and 200 g of a solid precursor 1 (following structure) was obtained.

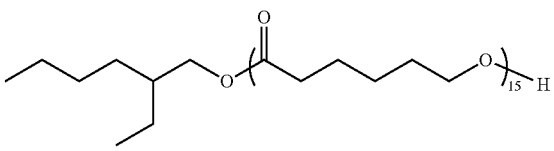

Synthesis of Dispersing Agent 1

40.0 g of the obtained precursor 1 was introduced into 200 mL three-neck flask, and stirred and decomposed at 80° C. while blowing nitrogen. 2.2 g of meso-butane-1,2,3,4-tetracarboxylic dianhydride was added thereto and heated to 110° C. After 5 hours, the elimination of a peak derived from the precursor 1 was confirmed by $^1$H-NMR, and then, the resultant material was cooled to room temperature, and 38 g of a solid reaction product 1 (mixture of the following structural isomer) was obtained. The reaction product 1 obtained as described above is a mixture of the compound 1 shown in Table 1 and the structural isomer. The reaction product 1 is called a "dispersing agent 1".

Dispersing Agent 1 (Reaction Product 1)

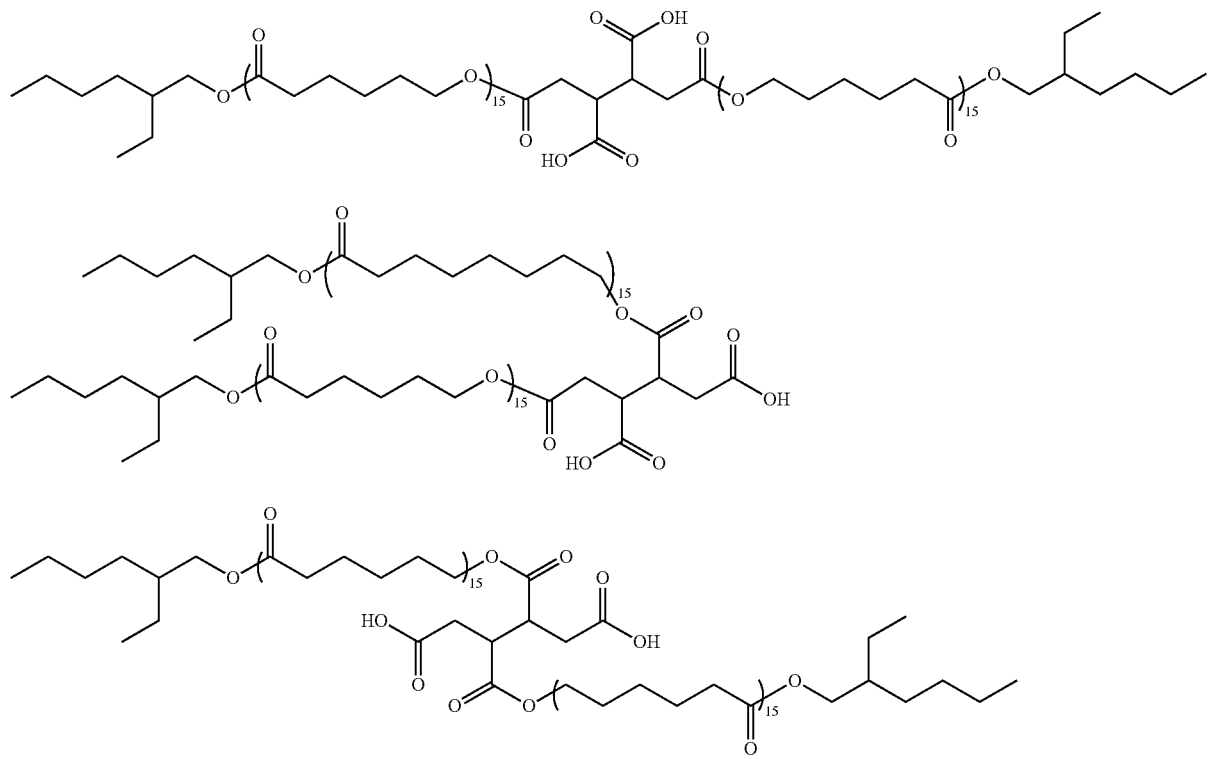

(2) Preparation of Dispersing Agent 2

Synthesis of Dispersing Agent 2

The synthesis was performed in the same manner as in the synthesis of the dispersing agent 1, except for changing 2.2 g of butanetetracarboxylic acid anhydride and 2.4 g of pyromellitic acid dianhydride, and 38 g of a solid reaction product 2 (mixture of the following structural isomer) was obtained. The reaction product 2 obtained as described above is a mixture of the compound 2 shown in Table 1 and the structural isomer. The reaction product 2 is called a "dispersing agent 2".

Dispersing Agent 2 (Reaction Product 2)

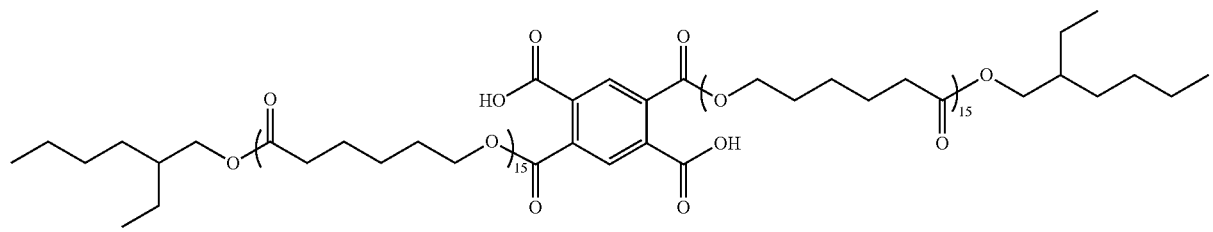

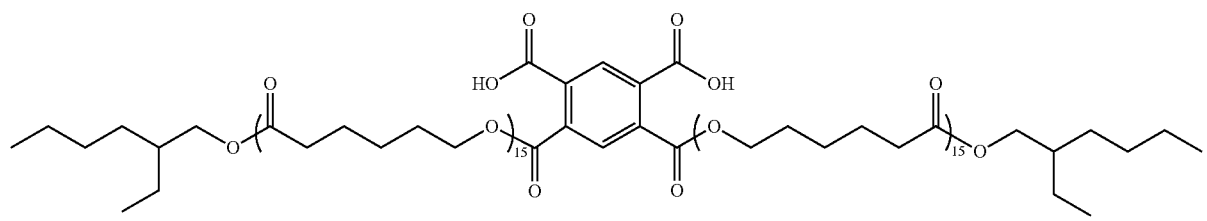

(3) Preparation of Dispersing Agent 3

Synthesis of Polyester (i-1)

12.6 g of n-octanoic acid (manufactured by Wako Pure Chemical Industries, Ltd.) as carboxylic acid, 100 g of ε-caprolactone (PLACCEL M manufactured by Daicel Corporation) as lactone, and 2.2 g of monobutyl tin oxide (manufactured by Wako Pure Chemical Industries, Ltd.) ($C_4H_9Sn(O)OH$) were mixed with each other in a 500 mL three-neck flask, and heated at 160° C. for 1 hour. 100 g of ε-caprolactone was added dropwise for 5 hours, and further stirred for 2 hours. After that, the cooling was performed to room temperature, and polyester (i-1) was obtained.

The synthesis scheme will be described below.

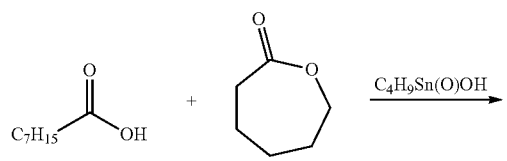

Synthesis of Dispersing Agent 3 (Polyethyleneimine Derivative (J-1))

5.0 g of polyethyleneimine (SP-018 manufactured by Nippon Shokubai Co., Ltd., number average molecular weight of 1,800) and 100 g of the obtained polyester (i-1) were mixed with each other and heated at 110° C. for 3 hours, to obtain a polyethyleneimine derivative (J-1). The polyethyleneimine derivative (J-1) is called a "dispersing agent 3".

The synthesis scheme is shown below. In the following synthesis scheme, a, b, c respectively represent a polymerization molar ratio of the repeating unit and is 0 to 50, and a relationship of a+b+c=100 is satisfied. 1, m, n1, and n2 respectively represent a polymerization molar ratio of the repeating unit, 1 is 10 to 90, m is 0 to 80, n1 and n2 are 0 to 70, and a relationship of 1+m+n1+n2=100 is satisfied.

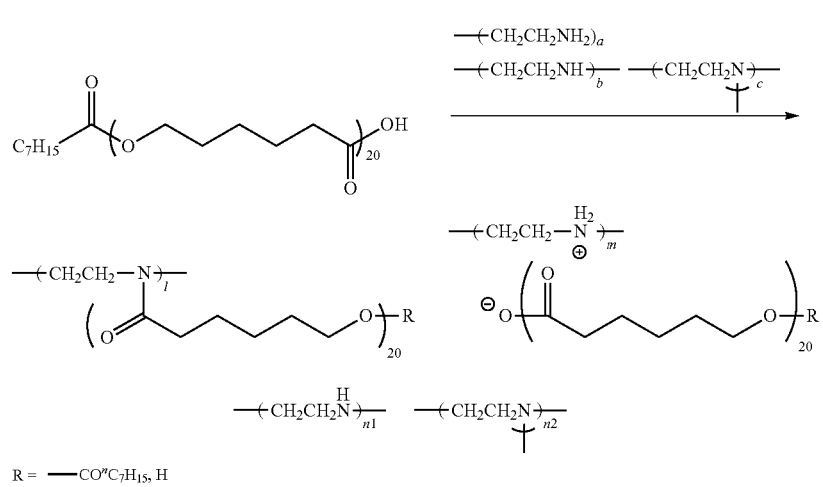

(4) Preparation of Dispersing Agent 4

Synthesis of Polyester (i-2)

Polyester (i-2) was obtained in the same manner as in the synthesis of the polyester (i-1), except for changing the amount of carboxylic acid shown in Table 3.

Synthesis of Dispersing Agent 4 (Polyethyleneimine Derivative (J-2))

A polyethyleneimine derivative (J-2) was obtained by performing the synthesis which is the same as that of the compound J-1, except for using polyethyleneimine shown in Table 2 and the obtained polyester (i-2). The polyethyleneimine derivative (J-2) is called a "dispersing agent 4".

The weight-average molecular weight of the dispersing agents 1 and 2 was measured by a method described above as the measurement method of the weight-average molecular weight of the compound represented by General Formula 1. As a result of the measurement, the weight-average molecular weight of the dispersing agent 1 was 9,200 and the weight-average molecular weight of the dispersing agent 2 was 6,300.

The weight-average molecular weight of the dispersing agent 3 (polyethyleneimine derivative (J-1)) and the dispersing agent 4 (polyethyleneimine derivative (J-2)) was a value shown in Table 3, when the value was acquired by performing reference polystyrene conversion of a value measured by GPC under the measurement conditions of the specific example described above.

The weight-average molecular weight other than that described above is a value acquired by performing reference polystyrene conversion of a value measured by GPC under the following measurement conditions.

GPC device: HLC-8120 (manufactured by Tosoh Corporation)

Column: TSK gel Multipore HXL-M (manufactured by Tosoh Corporation, 7.8 mm (internal diameter)×30.0 cm)

Eluent: Tetrahydrofuran (THF)

8. Measurement of Activation Volume

The powder in a powder lot which is the same as that of ferromagnetic hexagonal barium ferrite powder used in the preparation of the magnetic layer forming composition was used as a measurement sample of the activation volume. The magnetic field sweep rates of the He measurement part at time points of 3 minutes and 30 minutes were measured by using an oscillation sample type magnetic-flux meter (manufactured by Toei Industry Co., Ltd.), and the activation volume was calculated from the relational expression described above. The measurement was performed in the environment of 23° C.±1° C. The calculated activation volume is shown in Table 8.

9. Measurement of cos θ

A cross section observation sample was cut out from each magnetic tape of Examples and Comparative Examples, and cos θ was acquired by the method described above by using this sample. In each magnetic tape of Examples and Comparative Examples, acquired cos θ is shown in Table 8. In each magnetic tape of Examples and Comparative Examples, a percentage of hexagonal ferrite particles having the aspect ratio and the length in the long axis direction of the ranges described above which is a measurement target of cos θ occupying all of the hexagonal ferrite particles observed in the STEM image, was approximately 80% to 95% based on the particle number.

The cross section observation sample used for the measurement of cos θ was manufactured by the following method.

(i) Manufacturing of Sample Including Protective Film

A sample including a protective film (laminated film of a carbon film and a platinum film) was manufactured by the following method.

A sample having a size of a width direction 10 mm×longitudinal direction 10 mm of the magnetic tape was cut out from the magnetic tape which is a target acquiring the cos θ, with a blade. The width direction of the sample described below is a direction which was a width direction of the magnetic tape before the cutting out. The same applies to the longitudinal direction.

A protective film was formed on the surface of the magnetic layer of the cut-out sample to obtain a sample including a protective film. The formation of the protective film was performed by the following method.

A carbon film (thickness of 80 nm) was formed on the surface of the magnetic layer of the sample by vacuum deposition, and a platinum (Pt) film (thickness of 30 nm) was formed on the surface of the formed carbon film by sputtering. The vacuum deposition of the carbon film and the sputtering of the platinum film were respectively performed under the following conditions.

Vacuum Deposition Conditions of Carbon Film

Deposition source: carbon (core of a mechanical pencil having a diameter of 0.5 mm)

Degree of vacuum in a chamber of a vacuum deposition device: equal to or smaller than $2 \times 10^{-3}$ Pa Current value: 16 A Sputtering Conditions of Platinum Film Target: Pt Degree of vacuum in a chamber of a sputtering device: equal to or smaller than 7 Pa Current value: 15 mA (ii) Manufacturing Cross Section Observation Sample A sample having a thin film shape was cut out from the sample including a protective film manufactured in the section (i), by FIB processing using a gallium ion (Ga$^+$) beam. The cutting out was performed by performing the following FIB processing two times. An acceleration voltage of the FIB processing was 30 kV.

In a first FIB processing, one end portion (that is, portion including one side surface of the sample including a protective film in the width direction) of the sample including a protective film in the longitudinal direction, including the area from the surface of the protective film to a region of a depth of approximately 5 μm was cut. The cut-out sample includes the area from the protective film to a part of the non-magnetic support.

Then, a microprobe was loaded on a cut-out surface side (that is, sample cross section side exposed by the cutting out) of the cut-out sample and the second FIB processing was performed. In the second FIB processing, the surface side opposite to the cut-out surface side (that is, one side surface in the width direction) was irradiated with a gallium ion beam to perform the cutting out of the sample. The sample was fixed by bonding the cut-out surface of the second FIB processing to the end surface of the mesh for STEM observation. After the fixation, the microprobe was removed.

In addition, the surface of the sample fixed to the mesh, from which the microprobe is removed, was irradiated with a gallium ion beam at the same acceleration voltage described above, to perform the FIB processing, and the sample fixed to the mesh was further thinned.

The cross section observation sample fixed to the mesh manufactured as described above was observed by a scanning transmission electron microscope, and the cos θ was acquired by the method described above. The cos θ acquired as described above is shown in Table 8.

10. Evaluation of Squareness Ratio (SQ)

The squareness ratio of each magnetic tape manufactured was measured at a magnetic field strength of 1194 kA/m (15 kOe) by using an oscillation sample type magnetic-flux meter (manufactured by Toei Industry Co., Ltd.). The measurement results are shown in Table 8.

11. Surface Part C—H Derived C Concentration

The X-ray photoelectron spectroscopic analysis was performed regarding the surface of the magnetic layer of the magnetic tape (measurement region: 300 μm×700 μm) by the following method using an ESCA device, and a surface part C—H derived C concentration was calculated from the analysis result.

Analysis and Calculation Method

All of the measurement (1) to (3) described below were performed under the measurement conditions shown in Table 4.

TABLE 4

| Device | AXIS-ULTRA manufactured by Shimadzu Corporation |
|---|---|
| Excitation X-ray source | Monochromatic Al-Kα ray (output: 15 kV, 20 mA) |
| Analyzer mode | Spectrum |
| Lens mode | Hybrid (analysis area: 300 μm × 700 μm) |
| Neutralization electron gun for charge correction (Charge neutraliser) | ON (used) |
| Photoelectron take-off angle (take-off angle) | 10 deg. (angle formed by a detector and a sample surface) |

(1) Wide Scan Measurement

A wide scan measurement (measurement conditions: see Table 5) was performed regarding the surface of the magnetic layer of the magnetic tape with the ESCA device, and the types of the detected elements were researched (qualitative analysis).

TABLE 5

| Scan range | Pass Energy | Energy resolution (Step) | Capturing time (Dwell) | Number of integration times (Sweeps) |
|---|---|---|---|---|
| 0 to 1200 eV | 160 eV | 1 eV/step | 100 ms/step | 5 |

(2) Narrow Scan Measurement

All elements detected in (1) described above were subjected to narrow scan measurement (measurement conditions: see Table 6). An atom concentration (unit: atom %) of each element detected was calculated from a peak surface area of each element by using software for a data process attached to the device (Vision 2.2.6). Here, the C concentration was also calculated.

(3) Acquiring of C1s Spectra

The C1s spectra were acquired under the measurement conditions disclosed in Table 7. Regarding the acquired C1s spectra, after correcting a shift (physical shift) due to a sample charge by using software for a data process attached to the device (Vision 2.2.6), a fitting process (peak resolution) of the C1s spectra was performed by using the software described above. In the peak resolution, the fitting of C1s spectra was performed by a nonlinear least-squares method using a Gauss-Lorentz complex function (Gaussian component: 70%, Lorentz component: 30%), and a percentage (peak area ratio) of the C—H peak occupying the C1s spectra was calculated. A C—H derived C concentration was calculated by multiplying the calculated C—H peak area ratio by the C concentration acquired in (2) described above.

TABLE 7

| Spectra | Scan range | Pass Energy | Energy resolution (Step) | Capturing time (Dwell) | Number of integration times (Sweeps) |
|---|---|---|---|---|---|
| C1s | 276 to 296 eV | 10 eV | 0.1 eV/step | 200 ms/step | 20 |

An arithmetical mean of values obtained by performing the above-mentioned process at different positions of the surface of the magnetic layer of the magnetic tape three times was set as the surface part C—H derived C concentration.

12. Measurement of Number of Times of Decrease of Partial Reproducing Output A magnetic tape cartridge containing each magnetic tape (magnetic tape total length of 500 m) of Examples and Comparative Examples was set in a drive of Linear Tape-Open Generation 6 (LTO-G6) manufactured by IBM, and the magnetic tape was subjected to reciprocating running 100 times at tension of 0.6 N and a running speed of 5 m/sec.

A reproduction signal during the running was introduced to an external analog/digital (AD) conversion device. When a reproduction signal amplitude was decreased more than 60% with respect to an average (average of measured values of all tracks) for the time equal to or longer than 1 second, it was determined that the partial output decrease has occurred, and the number of times of the occurrence of the

TABLE 6

| Spectra[Note1] | Scan range | Pass Energy | Energy resolution (Step) | Capturing time (Dwell) | Number of integration times (Sweeps)[Note2] |
|---|---|---|---|---|---|
| C1s | 276 to 296 eV | 80 eV | 0.1 eV/step | 100 ms/step | 3 |
| Cl2p | 190 to 212 eV | 80 eV | 0.1 eV/step | 100 ms/step | 5 |
| N1s | 390 to 410 eV | 80 eV | 0.1 eV/step | 100 ms/step | 5 |
| O1s | 521 to 541 eV | 80 eV | 0.1 eV/step | 100 ms/step | 3 |
| Fe2p | 700 to 740 eV | 80 eV | 0.1 eV/step | 100 ms/step | 3 |
| Ba3d | 765 to 815 eV | 80 eV | 0.1 eV/step | 100 ms/step | 3 |
| Al2p | 64 to 84 eV | 80 eV | 0.1 eV/step | 100 ms/step | 5 |
| Y3d | 148 to 168 eV | 80 eV | 0.1 eV/step | 100 ms/step | 3 |
| P2p | 120 to 140 eV | 80 eV | 0.1 eV/step | 100 ms/step | 5 |
| Zr3d | 171 to 191 eV | 80 eV | 0.1 eV/step | 100 ms/step | 5 |
| Bi4f | 151 to 171 eV | 80 eV | 0.1 eV/step | 100 ms/step | 3 |
| Sn3d | 477 to 502 eV | 80 eV | 0.1 eV/step | 100 ms/step | 5 |
| Si2p | 90 to 110 eV | 80 eV | 0.1 eV/step | 100 ms/step | 5 |
| S2p | 153 to 173 eV | 80 eV | 0.1 eV/step | 100 ms/step | 5 |

[Note1] Spectra shown in Table 6 (element type) are examples, and in a case where an element not shown in Table 6 is detected by the qualitative analysis of the section (1), the same narrow scan measurement is performed in a scan range including entirety of spectra of the elements detected.

[Note2] The spectra having excellent signal-to-noise ratio (S/N ratio) were measured when the number of integration times is set as three times. However, even when the number of integration times regarding the entirety of spectra is set as five times, the quantitative results are not affected.

partial output decrease during 100 times of the reciprocating running was acquired. When the number of times of the occurrence of the partial output decrease is equal to or smaller than 3, the magnetic tape can be determined as a magnetic tape having high reliability, in practice.

The result described above is shown in Table 8.

TABLE 8

| | Ferromagnetic hexagonal ferrite powder activation volume [nm³] | Dispersing agent Type | Dispersing agent Content [part] | Magnetic solution beads dispersion conditions | | | | | | Vertical orientation process |
|---|---|---|---|---|---|---|---|---|---|---|
| | | | | First stage | | Second stage | | Third stage | | |
| | | | | Dispersion retention time [h] | Bead diameter [mm] | Dispersion retention time [h] | Bead diameter [mm] | Dispersion retention time [h] | Bead diameter [mm] | |
| Comparative Example 1 | 2500 | — | — | 10 | 0.5 | — | — | — | — | Not performed |
| Comparative Example 2 | 2000 | — | — | 10 | 0.5 | — | — | — | — | Not performed |
| Comparative Example 3 | 1800 | — | — | 10 | 0.5 | — | — | — | — | Not performed |
| Comparative Example 4 | 1600 | — | — | 10 | 0.5 | — | — | — | — | Not performed |
| Comparative Example 5 | 1300 | — | — | 10 | 0.5 | — | — | — | — | Not performed |
| Comparative Example 6 | 1600 | — | — | 10 | 0.5 | — | — | — | — | Not performed |
| Comparative Example 7 | 1600 | — | — | 10 | 0.5 | — | — | — | — | Not performed |
| Comparative Example 8 | 1600 | Dispersing agent 1 | 6.0 | 10 | 0.5 | 10 | 0.1 | — | — | Performed |
| Comparative Example 9 | 1600 | Dispersing agent 1 | 12.0 | 10 | 0.5 | 30 | 0.1 | — | — | Performed |
| Comparative Example 10 | 1600 | 2,3-dihydroxy naphthalene | 12.0 | 10 | 0.5 | 10 | 0.1 | — | — | Performed |
| Example 1 | 1600 | Dispersing agent 1 | 6.0 | 10 | 0.5 | 10 | 0.1 | — | — | Performed |
| Example 2 | 1600 | Dispersing agent 1 | 12.0 | 10 | 0.5 | 30 | 0.1 | — | — | Performed |
| Example 3 | 1600 | Dispersing agent 1 | 12.0 | 10 | 0.5 | 10 | 0.1 | 10 | 0.05 | Performed |
| Example 4 | 1300 | Dispersing agent 1 | 6.0 | 10 | 0.5 | 10 | 0.1 | — | — | Performed |
| Example 5 | 1600 | Dispersing agent 2 | 6.0 | 10 | 0.5 | 10 | 0.1 | — | — | Performed |
| Example 6 | 1600 | Dispersing agent 3 | 6.0 | 10 | 0.5 | 10 | 0.1 | — | — | Performed |
| Example 7 | 1600 | Dispersing agent 4 | 6.0 | 10 | 0.5 | 10 | 0.1 | — | — | Performed |
| Example 8 | 1600 | Dispersing agent 1 | 6.0 | 10 | 0.5 | 10 | 0.1 | — | — | Performed |
| Example 9 | 1600 | Dispersing agent 1 | 6.0 | 10 | 0.5 | 10 | 0.1 | — | — | Performed |
| Example 10 | 1600 | Dispersing agent 1 | 6.0 | 10 | 0.5 | 10 | 0.1 | — | — | Performed |

| | Magnetic layer forming composition | | | Non-magnetic layer forming composition | | | Cooling zone staying time | Evaluation results | | | Number of times of partial output decrease |
|---|---|---|---|---|---|---|---|---|---|---|---|
| | Stearic acid/ part | Stearic acid amide/ part | Butyl stearate/ part | Stearic acid/ part | Stearic acid amide/ part | Butyl stearate/ part | | SQ [—] | Cos θ [—] | Surface part C—H derived C concentration | |
| Comparative Example 1 | 2.0 | 0.2 | 2.0 | 2.0 | 0.2 | 2.0 | 0 seconds | 0.58 | 0.68 | 35 atom % | 0 |
| Comparative Example 2 | 2.0 | 0.2 | 2.0 | 2.0 | 0.2 | 2.0 | 0 seconds | 0.58 | 0.68 | 35 atom % | 1 |
| Comparative Example 3 | 2.0 | 0.2 | 2.0 | 2.0 | 0.2 | 2.0 | 0 seconds | 0.55 | 0.68 | 35 atom % | 1 |
| Comparative Example 4 | 2.0 | 0.2 | 2.0 | 2.0 | 0.2 | 2.0 | 0 seconds | 0.54 | 0.65 | 35 atom % | 5 |
| Comparative Example 5 | 2.0 | 0.2 | 2.0 | 2.0 | 0.2 | 2.0 | 0 seconds | 0.54 | 0.65 | 35 atom % | 7 |
| Comparative Example 6 | 2.0 | 0.2 | 2.0 | 2.0 | 0.2 | 2.0 | 50 seconds | 0.54 | 0.65 | 65 atom % | 5 |
| Comparative Example 7 | 2.0 | 0.2 | 2.0 | 2.0 | 0.2 | 2.0 | 180 seconds | 0.54 | 0.65 | 70 atom % | 4 |

TABLE 8-continued

| | | | | | | | | | | | |
|---|---|---|---|---|---|---|---|---|---|---|---|
| Comparative Example 8 | 2.0 | 0.2 | 2.0 | 2.0 | 0.2 | 2.0 | 0 seconds | 0.73 | 0.87 | 35 atom % | 5 |
| Comparative Example 9 | 2.0 | 0.2 | 2.0 | 2.0 | 0.2 | 2.0 | 0 seconds | 0.74 | 0.96 | 35 atom % | 5 |
| Comparative Example 10 | 2.0 | 0.2 | 2.0 | 2.0 | 0.2 | 2.0 | 0 seconds | 0.78 | 0.80 | 35 atom % | 7 |
| Example 1 | 2.0 | 0.2 | 2.0 | 2.0 | 0.2 | 2.0 | 50 seconds | 0.73 | 0.87 | 65 atom % | 0 |
| Example 2 | 2.0 | 0.2 | 2.0 | 2.0 | 0.2 | 2.0 | 50 seconds | 0.74 | 0.96 | 65 atom % | 0 |
| Example 3 | 2.0 | 0.2 | 2.0 | 2.0 | 0.2 | 2.0 | 180 second | 0.74 | 0.98 | 70 atom % | 0 |
| Example 4 | 2.0 | 0.2 | 2.0 | 2.0 | 0.2 | 2.0 | 50 seconds | 0.70 | 0.86 | 65 atom % | 0 |
| Example 5 | 2.0 | 0.2 | 2.0 | 2.0 | 0.2 | 2.0 | 50 seconds | 0.73 | 0.87 | 65 atom % | 0 |
| Example 6 | 2.0 | 0.2 | 2.0 | 2.0 | 0.2 | 2.0 | 50 seconds | 0.73 | 0.85 | 65 atom % | 0 |
| Example 7 | 2.0 | 0.2 | 2.0 | 2.0 | 0.2 | 2.0 | 50 seconds | 0.73 | 0.85 | 65 atom % | 0 |
| Example 8 | 2.0 | 0.2 | 2.0 | 2.0 | 0.2 | 2.0 | 1 second | 0.73 | 0.87 | 45 atom % | 1 |
| Example 9 | 2.0 | 0.2 | 2.0 | 2.0 | 0.2 | 2.0 | 5 seconds | 0.73 | 0.87 | 55 atom % | 0 |
| Example 10 | 2.0 | 0.2 | 5.0 | 2.0 | 0.2 | 5.0 | 50 seconds | 0.73 | 0.87 | 65 atom % | 0 |

From the result shown in Table 8 and comparison between Examples 1 to 10 and Comparative Examples 4 to 10, it is confirmed that, in the magnetic tape in which an activation volume of the ferromagnetic hexagonal ferrite powder included in the magnetic layer is equal to or smaller than 1,600 nm$^3$, the surface part C—H derived C concentration is equal to or greater than 45 atom %, and the cos θ is 0.85 to 1.00, and therefore, it is possible to prevent the occurrence of the partial output decrease.

Meanwhile, as shown in Table 8, in the magnetic tapes of Comparative Examples 1 to 3 in which an activation volume of the ferromagnetic hexagonal ferrite powder included in the magnetic layer exceeds 1,600 nm$^3$, the number of times of the occurrence of the partial output decrease was equal to or smaller than 3, even when the surface part C—H derived C concentration and the cos θ are in the ranges described above. That is, in the magnetic tape in which an activation volume of the ferromagnetic hexagonal ferrite powder included in the magnetic layer exceeds 1,600 nm$^3$, a correlation was not observed between the number of times of the occurrence of the partial output decrease and the surface part C—H derived C concentration and the cos θ. In addition, from the result shown in Table 8, it is confirmed that a correlation was not observed between the value of the cos θ and the value of the squareness ratio SQ.

Reference Experiment: Confirmation of Contribution of Fatty Acid and Fatty Acid Amide With Respect To Surface Part C—H Derived C Concentration (1) Two magnetic tapes (sample tapes) were manufactured by the same method as that in Example 1. The measurement regarding one sample tape was performed by the ESCA device, and then, the solvent extraction of the other sample tape was performed in a non-measured state (solvent: methanol).

When the quantity of fatty acid, fatty acid amide, and fatty acid ester in the solution obtained by the extraction was determined by gas chromatography analysis, a difference in the quantitative values of fatty acid (stearic acid) and fatty acid amide (stearic acid amide) in the two sample tapes was not obtained. Meanwhile, the quantitative value of fatty acid ester (butyl stearate) in the sample tape after the measurement was a value which is significantly lower than the quantitative value thereof in the non-measured sample tape. This is because fatty acid ester is volatilized in a vacuum chamber in which a measurement target sample is disposed during the measurement in the ESCA device.

From the results described above, it is possible to determine that fatty acid ester does not affect the surface part C—H derived C concentration acquired by the analysis performed by ESCA.

(2) Among the components included in the magnetic layer forming composition and the components included in the non-magnetic layer forming composition and present in the magnetic layer, the organic compounds excluding the solvent and polyisocyanate (crosslinked with other components by a process accompanied with the heating) are stearic acid, stearic acid amide, butyl stearate, 2,3-dihydroxynaphthalene, and a polyurethane resin. Among the components, it is possible to determine that butyl stearate does not affect the surface part C—H derived C concentration from the results (1), as described above.

Next, the effect of 2,3-dihydroxynaphthalene and a polyurethane resin with respect to the surface part C—H derived C concentration was confirmed by the following method.

Regarding 2,3-dihydroxynaphthalene and a polyurethane resin used in Example 1, C1s spectra were acquired by the same method as that described above, and regarding the acquired spectra, peak resolution of a peak positioned at the vicinity of bonding energy 286 eV and a C—H peak was performed by the process described above. A percentage (peak area ratio) of the separated peak occupying the C1s spectra was calculated, and the peak area ratio of the peak positioned at the vicinity of bonding energy 286 eV and the C—H peak was calculated.

Then, in the C1s spectra acquired in Example 1, the peak resolution of the peak positioned at the vicinity of bonding energy 286 eV was performed by the process described above. 2,3-dihydroxynaphthalene and a polyurethane resin have the peak positioned at the vicinity of bonding energy 286 eV in the C1s spectra, whereas fatty acid (stearic acid) and fatty acid amide (stearic acid amide) do not have a peak at the position described above. Accordingly, it is possible to determine that the peak positioned at the vicinity of bonding energy 286 eV of the C1s spectra acquired in Example 1 is derived from 2,3-dihydroxynaphthalene and a polyurethane resin. Then, when an amount of contribution of 2,3-dihydroxynaphthalene and a polyurethane resin of the C—H peak of the C1s spectra acquired in Example 1 was calculated from the peak area ratio calculated as described above, the amount of contribution thereof was approximately 10%. From this result, it is possible to determine that a large amount (approximately 90%) of the C—H peak of the C1s spectra acquired in Example 1 is derived from fatty acid (stearic acid) and fatty acid amide (stearic acid amide). From this result, it was confirmed that the surface part C—H derived C concentration can be an index of the presence amount of fatty acid and fatty acid amide.

An aspect of the invention can be effective in technical fields of magnetic tapes such as back-up tapes.

What is claimed is:

1. A magnetic tape comprising:
a non-magnetic support; and
a magnetic layer including ferromagnetic powder and a binder on the non-magnetic support,
wherein the ferromagnetic powder is ferromagnetic hexagonal ferrite powder having an activation volume equal to or smaller than 1,600 nm$^3$,
the magnetic layer includes one or more components selected from the group consisting of fatty acid and fatty acid amide, and an abrasive,
a C—H derived C concentration calculated from a C—H peak area ratio of C1s spectra obtained by X-ray photoelectron spectroscopic analysis performed on the surface of the magnetic layer at a photoelectron take-off angle of 10 degrees is equal to or greater than 45 atom %, and
a tilt cos θ of the ferromagnetic hexagonal ferrite powder with respect to the surface of the magnetic layer acquired by cross section observation performed by using a scanning transmission electron microscope is 0.85 to 1.00.

2. The magnetic tape according to claim 1, wherein the C—H derived C concentration is 45 atom % to 80 atom %.

3. The magnetic tape according to claim 1, wherein the C—H derived C concentration is 50 atom % to 80 atom %.

4. The magnetic tape according to claim 1, wherein the activation volume of the ferromagnetic hexagonal ferrite powder is 800 nm$^3$ to 1,600 nm$^3$.

5. The magnetic tape according to claim 2, wherein the activation volume of the ferromagnetic hexagonal ferrite powder is 800 nm$^3$ to 1,600 nm3.

6. The magnetic tape according to claim 3, wherein the activation volume of the ferromagnetic hexagonal ferrite powder is 800 nm$^3$ to 1,600 nm$^3$.

7. The magnetic tape according to claim 1, wherein the abrasive includes alumina powder.

8. The magnetic tape according to claim 1, wherein the magnetic layer further includes a polyester chain-containing compound having a weight-average molecular weight of 1,000 to 80,000.

9. The magnetic tape according to claim 2, wherein the magnetic layer further includes a polyester chain-containing compound having a weight-average molecular weight of 1,000 to 80,000.

10. The magnetic tape according to claim 3, wherein the magnetic layer further includes a polyester chain-containing compound having a weight-average molecular weight of 1,000 to 80,000.

11. The magnetic tape according to claim 4, wherein the magnetic layer further includes a polyester chain-containing compound having a weight-average molecular weight of 1,000 to 80,000.

12. The magnetic tape according to claim 5, wherein the magnetic layer further includes a polyester chain-containing compound having a weight-average molecular weight of 1,000 to 80,000.

13. The magnetic tape according to claim 6, wherein the magnetic layer further includes a polyester chain-containing compound having a weight-average molecular weight of 1,000 to 80,000.

14. The magnetic tape according to claim 7, wherein the magnetic layer further includes a polyester chain-containing compound having a weight-average molecular weight of 1,000 to 80,000.

15. The magnetic tape according to claim 1, further comprising:
a non-magnetic layer including non-magnetic powder and a binder between the non-magnetic support and the magnetic layer.

16. The magnetic tape according to claim 15, wherein magnetic layer and the non-magnetic layer respectively include one or more components selected from the group consisting of fatty acid and fatty acid amide.

* * * * *